United States Patent [19]

Wilkinson et al.

[11] 4,456,808

[45] Jun. 26, 1984

[54] MICROPROCESSOR CONTROL OF WELDING APPARATUS

[75] Inventors: Harold C. Wilkinson, Medford, N.J.; Charles E. Gum, North Wales, Pa.; Rodney C. Howe, Haddon Heights, N.J.; Dean P. Macinskas, Souderton, Pa.; Charles C. Pease; Robert J. Raycher, both of Vincentown, N.J.; Ronald Rosen; Francis J. Williams, both of Chalfont, Pa.

[73] Assignee: KSM Fastening Systems Inc., Moorestown, N.J.

[21] Appl. No.: 355,195

[22] Filed: Mar. 5, 1982

Related U.S. Application Data

[63] Continuation-in-part of Ser. No. 241,072, Mar. 6, 1981, abandoned.

[51] Int. Cl.³ .............................................. B23K 9/20
[52] U.S. Cl. ................................ 219/98; 219/130.32; 364/477
[58] Field of Search .................... 219/98, 99, 130.33, 219/130.32; 364/477

[56] References Cited

U.S. PATENT DOCUMENTS 4,241,285 12/1980 Golonka, Sr. et al. ............... 219/98
4,315,129 2/1982 Wilkinson et al. .................... 219/99

OTHER PUBLICATIONS

A. J. Weissberger, "Microprocessors Simplify Industrial Control", *Electronic Design 22*, 10/25/1975, pp. 96-99.

*Primary Examiner*—C. C. Shaw
*Attorney, Agent, or Firm*—Duffield & Lehrer

[57] ABSTRACT

Stick and stud welding apparatus which utilizes a microprocessor and related RAMs, ROMs and peripheral interface devices to control the welding parameters. The ideal desired weld current and weld cycles in the case of stud welding can be selected depending upon the mode of operation and/or stud conditions. The program for the microprocessor instructs the microprocessor to periodically compare the actual welding current to the ideal current, compute the difference and alter the phase firing time of an SCR bridge to compensate or adjust the welding current to the ideal current. In the case of stud welding mode, the program further instructs the microprocessor to reference the selected number of cycles, compute the total energy delivered across the stud and workpiece gap from actual current, welding terminal voltage and time and enlarge the number of actual weld cycles to a given percentage of that initially selected to provide a total energy input to the stud as selected. In the stud mode, the pilot arc current and cycles may likewise be selected and controlled. Such parameters as pilot arc current, pilot arc cycles, main welding current, main welding current cycles, total energy, welding terminal voltage and error occurrence are displayed visually by means of lights and/or written printout.

10 Claims, 38 Drawing Figures

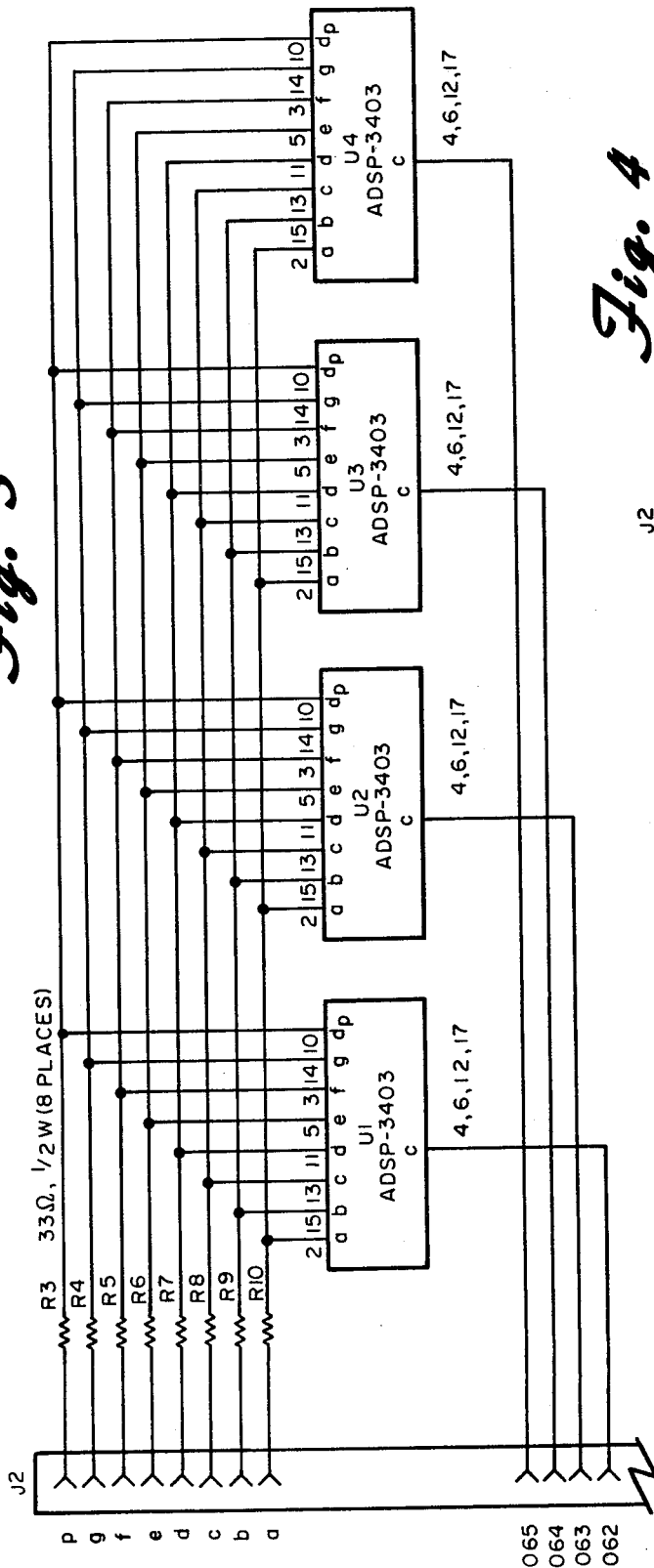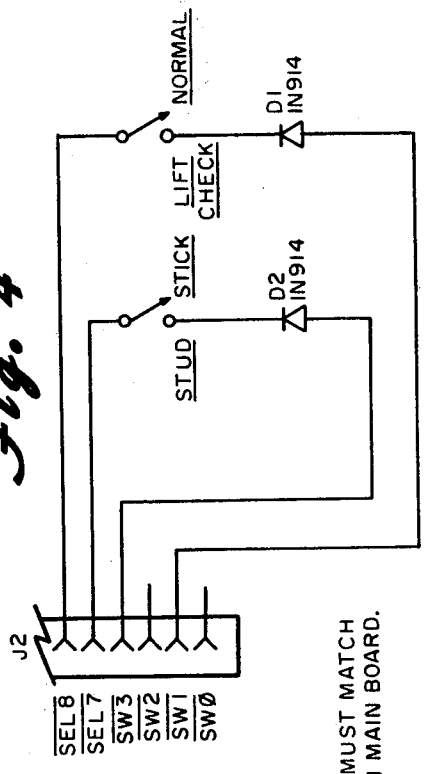

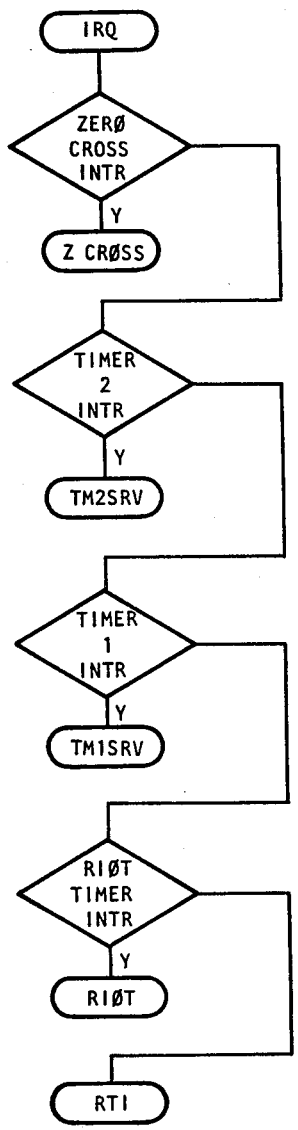
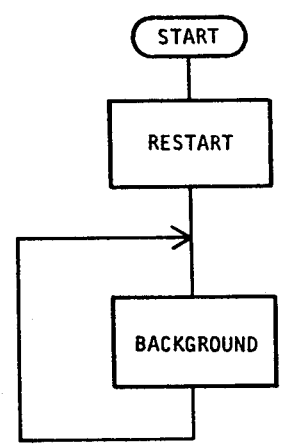
Fig. 14

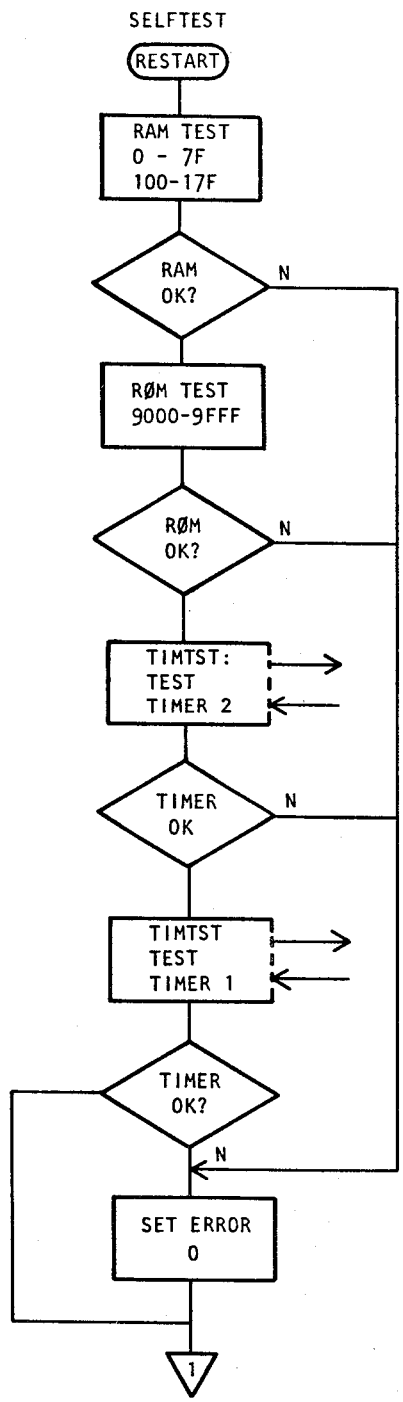
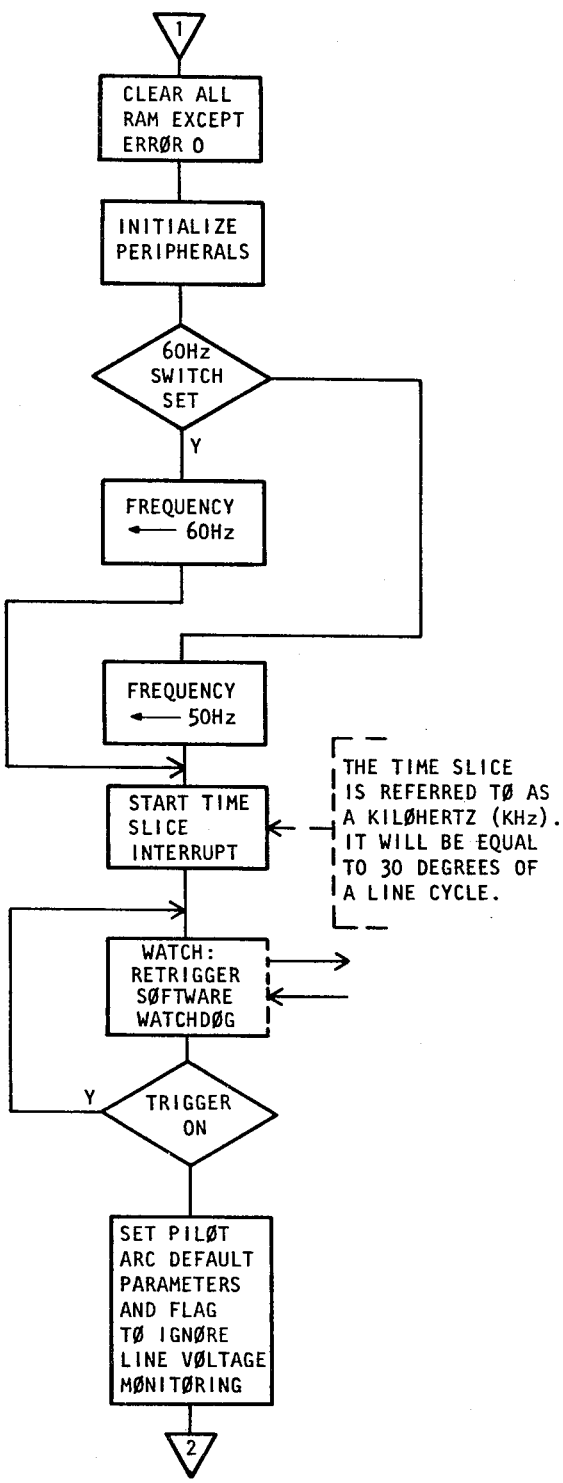
Fig. 15

Fig. 17
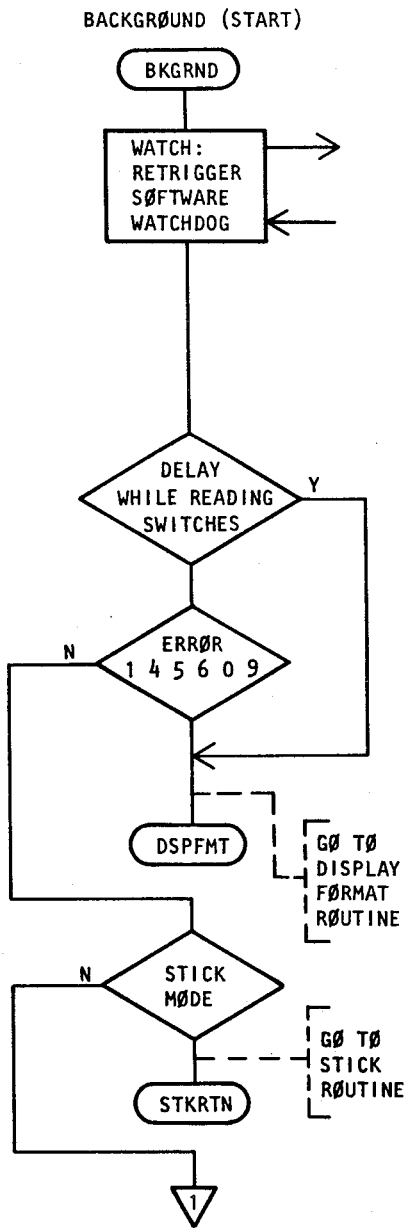
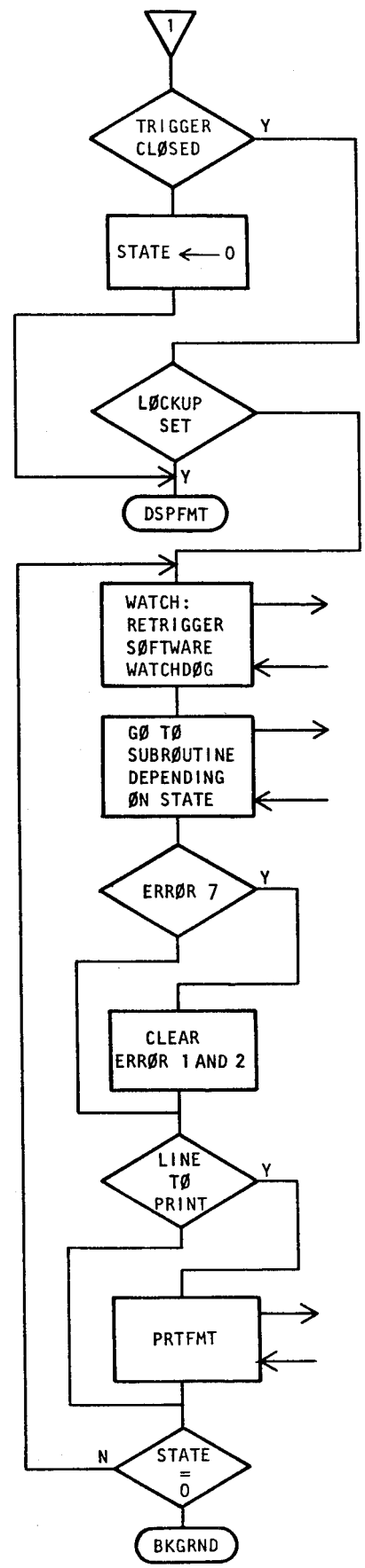

TIMER 2 INTERRUPT
SERVICE ROUTINE
(ONE-SHOT TIMER)

(RECEIVES CONTROL FROM
THE INTERRUPT POLL.)

Fig. 31
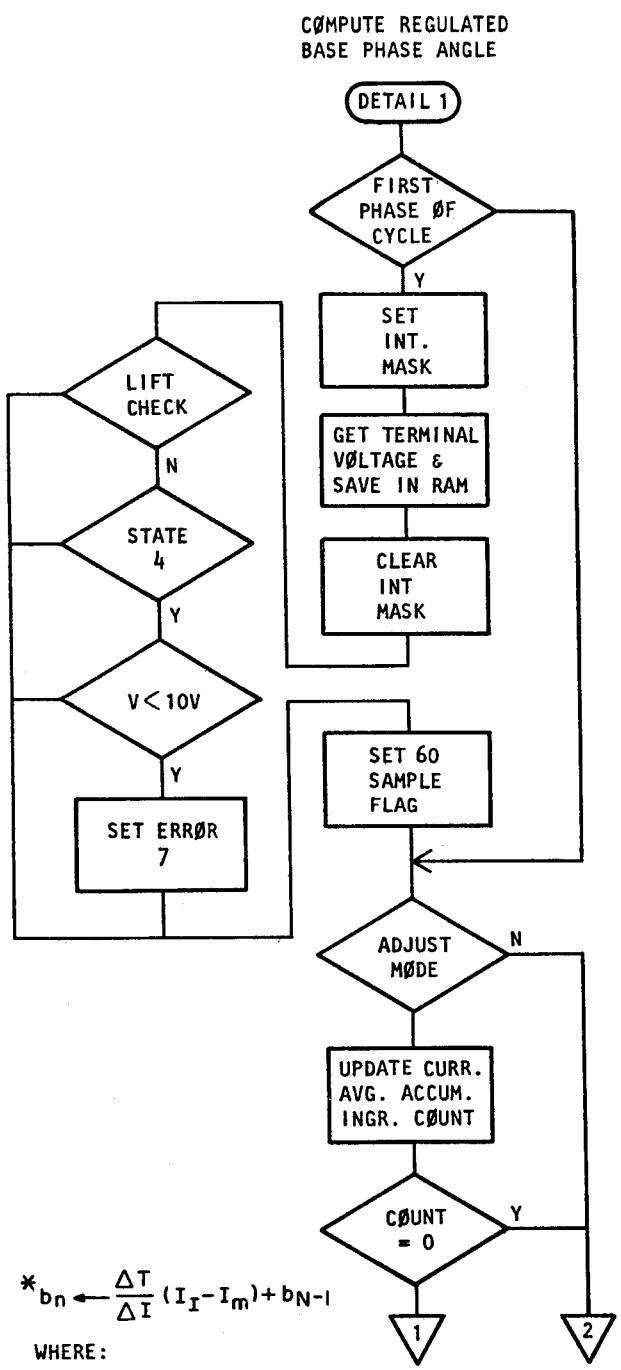
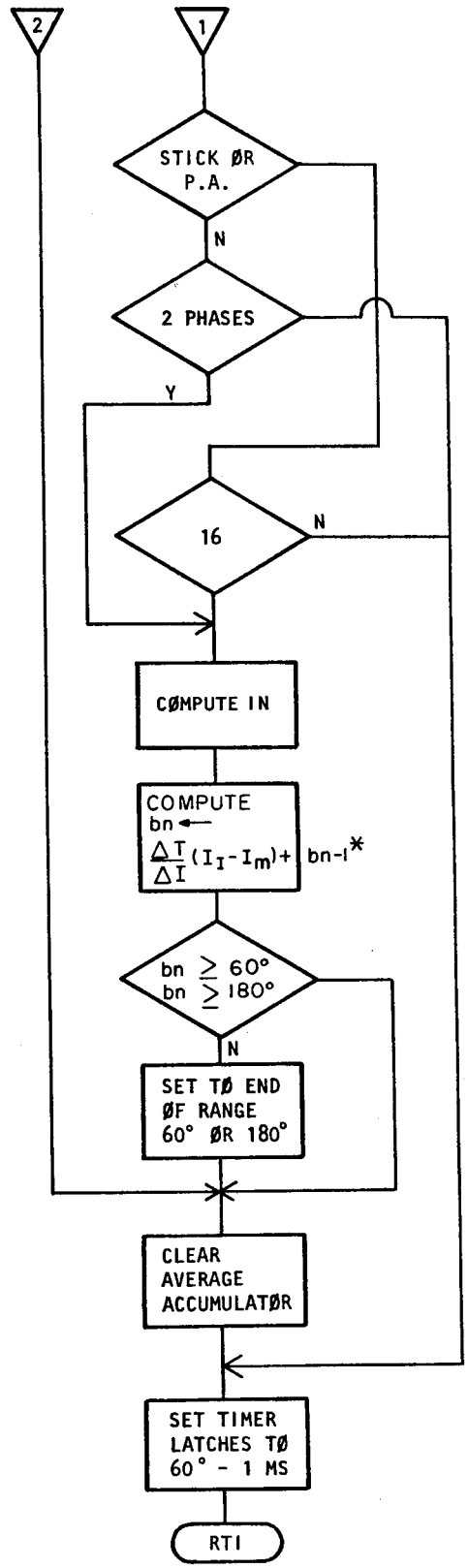
$$*b_n \leftarrow \frac{\Delta T}{\Delta I}(I_I - I_m) + b_{N-1}$$
WHERE:
- $b_n$   IS THE NTH BASE PHASE ANGLE
- $\frac{\Delta T}{\Delta I}$   IS THE CHANGE IN PHASE ANGLE FOR A 10 AMP. CHANGE IN CURRENT
- $I_I$   IS THE IDEAL CURRENT (DIALED IN OR PILOT ARC)
- $I_m$   IS THE AVERAGE CURRENT FOR THE PREVIOUS 2 OR 16 PHASES
- $N-1$   IS THE PREVIOUS BASE PHASE ANGLE THAT WAS USED

MICROPROCESSOR CONTROL OF WELDING APPARATUS

This is a continuation-in-part of application Ser. No. 241,072, filed Mar. 6, 1981, now abandoned.

DESCRIPTION

1. Technical Field

The present invention applies to welding apparatus and, more specifically, to means and apparatus for controlling welding current in a stick and/or stud welding apparatus utilizing a microprocessor and associated peripheral devices.

2. Background Art

In stick welding apparatus, it is extremely important that the welding current be regulated within very close approximation of an ideal current for any given specific welding application. Likewise, in stud welding apparatus, it is important not only that the weld current for a given size of stud be maintained extremely close to a given desired current but it is also important that the total energy generated by the arc very closely equal an ideal predetermined value. The total energy in stud welding is the product of the weld current, voltage and time that the weld current is on.

Historically in the very early beginning of welding of the type of stick welding and stud welding, welding current was controlled by such devices as a saturable reactor. Variation in the input to the reactor windings would control output from the transformer and thus the welding current. In the case of stud welding, this unregulated but variable current applied over a given time was the only means of controlling total energy. Additionally, such devices were used as a fixed power supply together with a plurality of different resistors in series with the power supply, one of which would be chosen by plugging into an output terminal associated with that resistor as the means of selecting output current. This latter method while selectible was unregulated during the welding operation whether in stick mode or in stud mode in which a timed function for initiating and terminating the weld was also utilized.

In subsequent welding apparatus and particularly stud welding apparatus, attempts were made to regulate the total welding energy. Devices of this type would utilize a rectified AC input and a variable timer to initiate and terminate the welding cycle. A transformer winding associated with the power supply could provide a signal indicative of the welding current which would be applied to an R-C network which would adjust the variable timer in accordance with the level of welding current to terminate the welding cycle in some approximation of when the desired total energy had been reached.

In more modern and improved stick and stud welding controllers, an analog approach to welding current regulation has been utilized. In these devices, an AC power supply is utilized through an SCR bridge to provide the welding current. Devices such as operational amplifiers operating in conjunction with means to generate a reference signal indicative of the level of welding current and a reference indicative of the desired current level are utilized to control phase firing of the SCRs in an effort to achieve the desired welding current level. Welding current controllers of this type used in arc stud welding operate only for a fixed time and do not have the capability of total weld energy computation.

The prior art devices including the analog devices have many disadvantages and drawbacks. The analog devices, while an improvement over the devices preceding them, are not as accurate as desired. Analog devices are temperature sensitive and this is one of the major problems affecting their accuracy. Additionally, wide variations in range are difficult to compensate for and handle in analog devices. In arc stud welding, current ranges are from as low as 50 amps to as high as 2,000 amps. Accuracy in controlling the exact total energy in the weld and particularly in stud welding is becoming extremely important. In such industries as the nuclear power industry it is critical.

The welding controllers of the prior art also are generally inflexible. None of the arc stud welding controllers heretofore known have any appreciable regulation or control of the pilot arc. The controllers heretofore essentially only regulate current and do not attempt to compute and, in the case of stud welding, control the total energy input to the stud welding operation. The prior art controllers likewise have no capability of altering or generally varying the welding current wave form to different significant values at given predetermined points throughout the welding cycle.

Other matters of inflexibility concerning analog controllers and other controllers heretofore known is their inability to store the parameters affecting a weld in a given weld cycle such as output current, number of cycles, voltage, total energy and the like. Additionally, none of the controllers heretofore known provide any visual readout of all of these parameters nor do they provide a permanent record such as a printout of these various parameters. In the case of such industries as the nuclear power energy, a printout of each weld is extremely desirable.

The welding controllers heretofore known for stick and particularly for stud welding and especially the analog controllers are not cost effective. To modify or add to those devices heretofore known to provide all of the features described above would be extremely difficult, cumbersome and expensive if not totally unfeasible.

DISCLOSURE OF INVENTION

It is an object of the present invention to overcome the disadvantages of the stick and stud welding controllers as hereinbefore described.

It is a further object of the present invention to provide a stick and stud welding controller providing great accuracy and flexibility by the utilization of a microprocessor system which, through appropriate interface devices, senses the actual welding cycle parameters and appropriately computes and alters the weld cycle in accordance with desired and preselected ideal parameters.

The stick and stud welding controller of the present invention carries out the foregoing objects by the utilization of a microprocessor system which includes, inter alia, ROM memory, RAM memory, and peripheral interface adapters communicating with various input and output devices as hereafter described. The main welding current is supplied by means of a three phase input current which is regulated through a phase fired SCR bridge to provide the output welding current.

Welding current is sensed by means of welding current transformers associated with the output of the SCR bridge. The welding current signals together with the welding terminal voltage and phase rotation are provided to the microprocessor system as digital representations of these variables or parameters by means of an analog to digital converter.

The welding controller system is capable of controlling welding current for stick welding and for stud welding. The system includes two sets of thumbwheels into which the number of weld cycles can be selected and placed as well as the welding current for both the pilot arc and main welding current or, in the case of stick welding, the welding current alone. The welding controller also includes a switch for selecting the stick or stud welding mode as well as switches to permit the variables set in the thumbwheels to be registered either as main welding current parameters or pilot arc parameters. Additionally, a visual display is provided together with a display select switch to select the various parameters desired to be displayed. A mechanical printer is also provided which prints out all of the welding parameters calculated and stored by the microprocessor. Appropriate input output devices are employed to facilitate interfacing of the foregoing devices to and from the microprocessor system.

In the stick mode of operation, the stick mode switch is set and the appropriate welding current level selected in the current thumbwheels. This information is automatically stored in the memory of the microprocessor system. During welding the microprocessor continuously monitors the welding current and compares this current to the ideal current set in the thumbwheels. The difference between the actual and ideal current is calculated and used in conjunction with a lookup table to calculate the change in phase angle firing of the SCRs necessary to bring the actual welding current into conformity with the ideal welding current selected.

The welding current controller, when in the stud welding mode, will have set in the thumbwheels the desired number of cycles for the pilot arc and the desired current for the pilot arc. The pilot arc switch is selected which will then store these values into the microprocessor system's memory. Thereafter, the desired or ideal welding current cycles and welding current current value is selected and stored in the memory of the microprocessor system.

Upon initiation of the welding cycle, the microprocessor system will select an initial SCR phase angle firing from memory for the pilot arc. Thereafter, the actual pilot arc current will be computed and compared to the pilot arc current selected and the necessary phase angle correction computed and applied to the SCRs to bring the pilot arc current into regulation equal to that selected. The microprocessor system will reference the desired number of pilot arc cycles and continue the pilot arc for that number of cycles. Near the completion of the pilot arc sequence, the current level in the pilot arc is sensed to determine if it is at a necessary minimum. If it is not, the pilot arc sequence is aborted and reinitiated a specified number of times. Otherwise, the main welding current sequence is then initiated.

The regulation of the main welding current is the same as the pilot arc. At the end of the main welding current cycle, the microprocessor will have computed and stored the various welding parameters such as current, number of cycles, welding voltage, total energy, and will also have computed such values as the percent of deviation of the number of actual cycles required to achieve the total energy versus the desired number of cycles. Based upon these calculations, various error signals will be displayed and, depending upon the nature of the error signal, the condition of the equipment altered from displaying the error signal to total shutdown of the equipment.

At the end of the weld cycle, the operator may choose and have displayed on an illuminated display any of the parameters calculated and stored in the microprocessor system such as the welding terminal voltage, welding current, total energy, number of weld cycles, both for the pilot arc welding sequence and the main welding sequence. Additionally, a mechanical printer is interfaced with the welding controller which, when in the stud welding mode, will for each weld print out all of the foregoing parameters for a permanent record.

Other objects and advantages of the present invention will become apparent to those skilled in the art from the detailed description thereof which follows in conjunction with the drawings.

BRIEF DESCRIPTION OF DRAWINGS

FIGS. 3–13 are schematic diagrams of the components set forth in the block diagram of FIGS. 1 and 2 together with the interconnections between the respective components and the logic devices therebetween;

FIGS. 14–37 are logic flow diagrams upon which the microprocessor program is based for the particular main routine, subroutine or interrupt service routine as labeled on the flow chart.

BEST MODE FOR CARRYING OUT THE INVENTION

I. Functional Block Diagram FIGS. 1 and 2

Figure 2A:
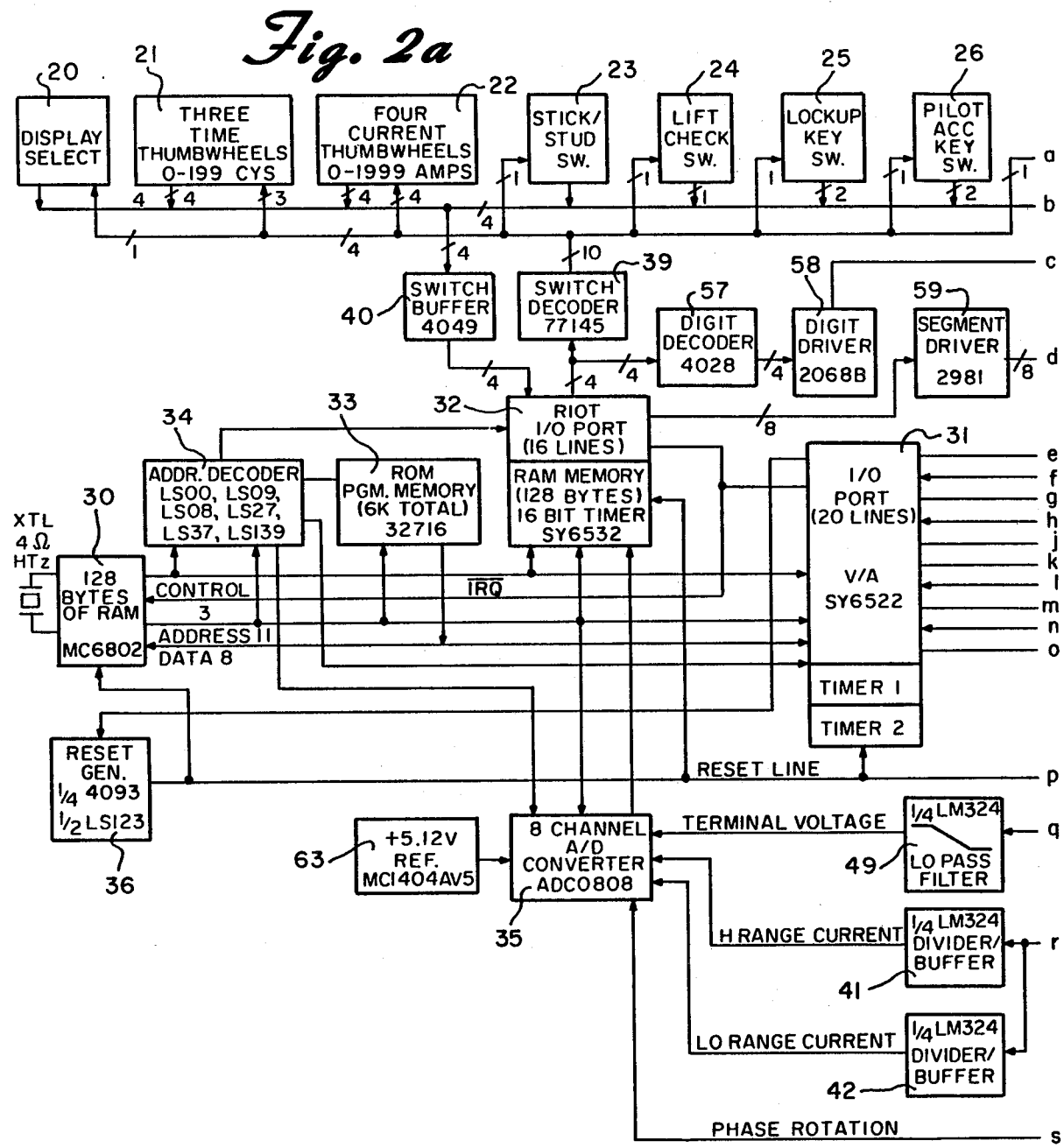
FIGS. 1 and 2, when consolidated, provide a complete block diagram of the stick/stud welding controller of the present invention.
Figure 1:
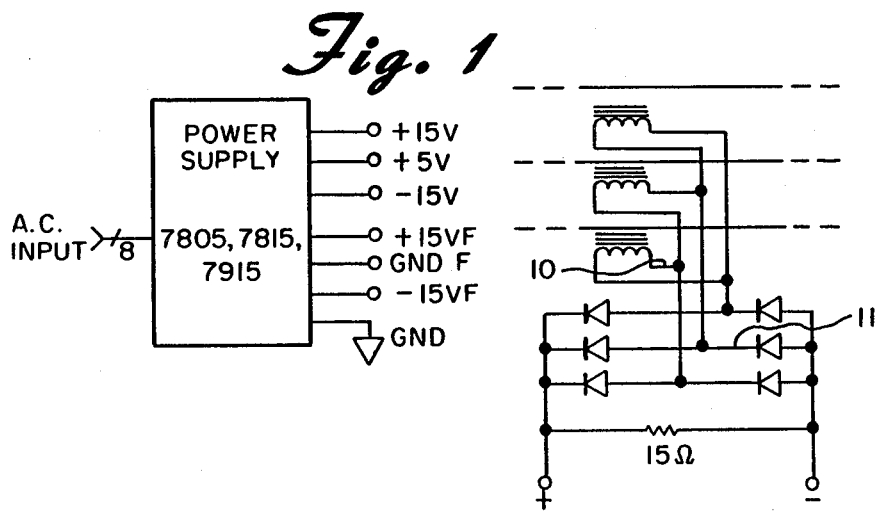
Figure 2B:
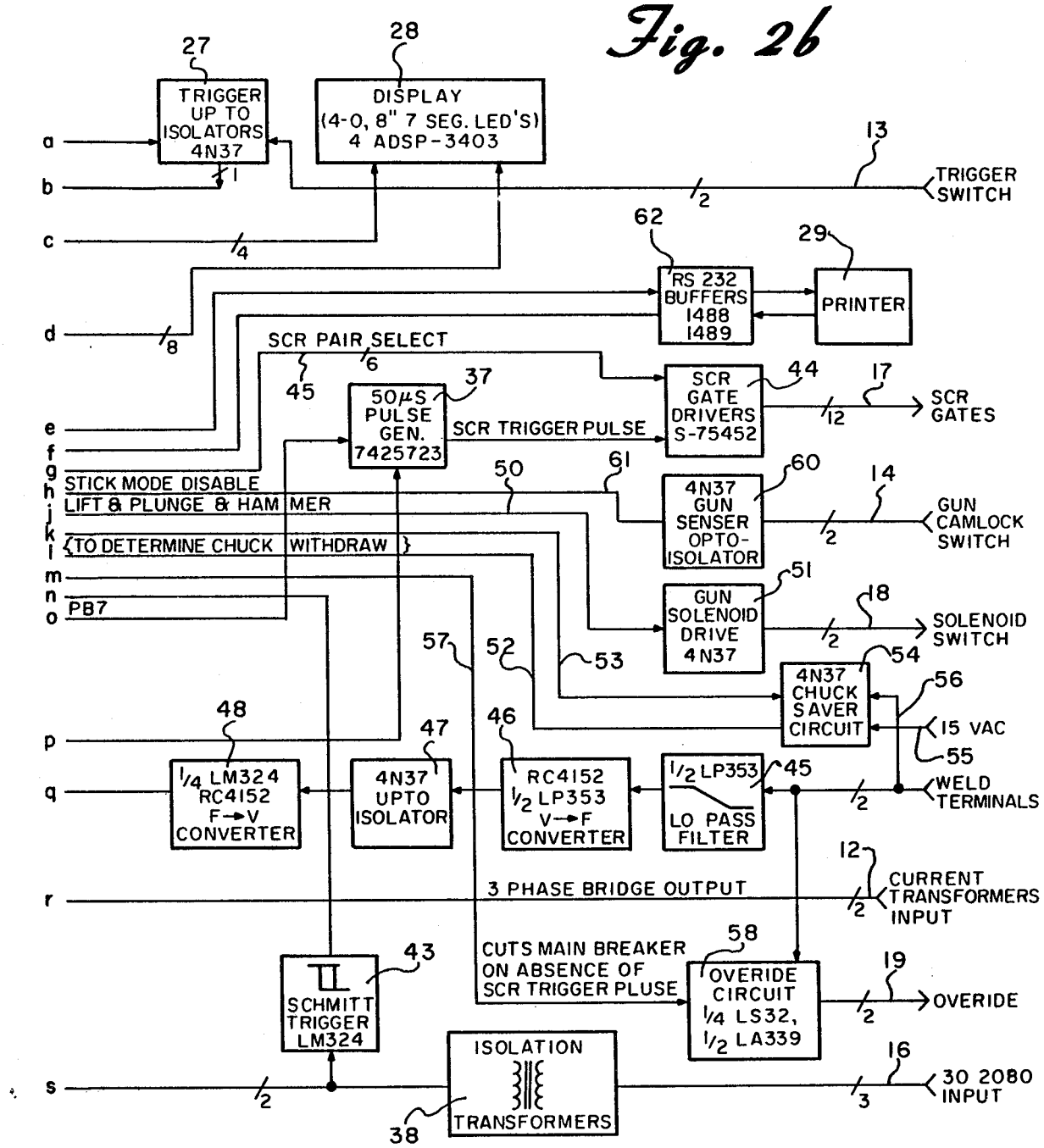

A functional block diagram of the stick/stud welding controller of the present invention is shown in FIGS. 1 and 2 of the drawings. A table of components is set out in section V entitled "Charts" and reference to the table can be made for the component designation and manufacturer of the various components in the block diagram to be described hereinafter.

FIGS. 1 and 2 illustrate only the functional block diagram of the microprocessor system and the input output peripheral devices. The remainder of the welding system which is controlled by the invention and which is of a conventional nature has not been shown inasmuch as it is not believed necessary to an understanding of the invention. The components in the remainder of the stud welding system include such standard configurations of component assemblies as the stud welding gun and its included lift solenoid and trigger, a secondary power supply and control circuitry for operation of the gun solenoid and associated equipment and a three phase power supply including the associated transformers and a six SCR bridge together with associated welding cables and welding cable line inductor. This equipment to which the present invention applies is of a standard and conventional nature as heretofore known.

Referring to FIGS. 1 and 2, and particularly the insert appearing in FIG. 1, each of the three output lines from the welding transformer includes a current transformer 10 which is tied into a bridge 11 to provide a signal which will be representative of the current flowing in each of the phases of the transformer. This input signal is applied to the welding controller of the present invention as shown in FIGS. 1 and 2 by means of the two input lines 12 shown on the right-hand side of FIG. 2. Other inputs from the standard welding components to the welding controller and as shown on the right-hand side of FIG. 2 and whose function will be described in more detail hereinafter, are the line pair 13 indicating closing of the trigger switch; line pair 14 indicating the welding cable for the stud welding gun is inserted in the proper receptacle for stud welding, line pair 15 across the weld terminals providing the controller with weld terminal voltage and three lines 16 connected across the three phase input to the welding power supply.

As shown in FIG. 2, outputs from the welding controller of the present invention to the standard welding components heretofore described include twelve lines 17 constituting six line pairs to each of the SCR gates for phase firing. Additionally, a gun solenoid energize-deenergize line pair 18 serves to energize and deenergize the gun solenoid. Lastly, an override line pair 19 is wired to the main welding power supply circuit breaker to deenergize the breaker totally shutting down the welding power supply and welding controller upon energization of the line pair all as will be described hereinafter.

Shown at the upper portion of FIGS. 1 and 2 of the drawings are several peripherals to which the microprocessing system of the present invention communicates. These peripherals include a display select thumbwheel 20 which will output a binary coded decimal signal indicative of the nature of information to be displayed in an illuminated display 28 which consists of four seven segment light emitting diodes. The peripherals include a three thumbwheel selector 21 into which the number of cycles may be selected for either pilot arc or welding current and a four thumbwheel selector 22 into which the pilot arc current or main welding current can be selected. These selectors 21 and 22 likewise provide a binary coded decimal output.

A selector switch 23 is provided which provides a binary output indicative of the selection of either stick or stud mode. A lift check switch 24 is provided which provides an output signal indicative of having chosen the mode for checking the lift of the gun solenoid or not as the case may be.

A lockup key switch 25 is provided which is a switch operable by a key under control of the operator and/or supervisor as desired. The switch provides three separate binary outputs depending upon the position setting. The three outputs are for "access"; "set" and "lockup".

A second switch entitled pilot arc key switch 26 is provided which likewise utilizes the same key as for the lockup key switch and may be in the possession of the operator or the supervisor as desired. The pilot arc key switch provides a two state output one for "access" and one for "set".

The lockup key switch and the pilot arc key switch, as will be described in more detail hereinafter, provides binary signals which are utilized in the logic of the microprocessor system to set and store the pilot arc and weld current parameters for both the number of cycles and current. When both switches are in the "access" mode, then the settings set the thumbwheels 21 and 22 for number of cycles and current respectively will be stored as the parameters for the pilot arc. When the pilot arc switch is moved to "set" and the lockup key switch is set to "access", then the settings in the thumbwheels 21 and 22 will set the number of cycles and main welding current parameters which will be stored in the processing system. In this configuration, whenever the thumbwheels 21 and 22 are changed, the parameters will automatically be changed in memory for the number of cycles and current for the main welding cycles.

When the lockup key switch is moved to the "set" position, those values in the thumbwheels 21 and 22 will be set in memory and subsequent changing of these wheels will not affect the setting theretofore stored. Lastly, when the key switch for the lockup key switch 25 is in the "lockup" position, the logic will permit the welding controller to disenable the controller upon the occurrence of certain error conditions as hereinafter described.

A trigger optical isolator 27 is provided which senses the closing of the trigger at the stud welding gun and provides an output signal for the microprocessor system which is optically isolated from the stud welding gun itself. Lastly, a mechanical printer 29 which provides a paper tape printout of the parameters measured and calculated during the weld cycle is provided to provide the operators with a permanent record of each weld.

Figure 5:
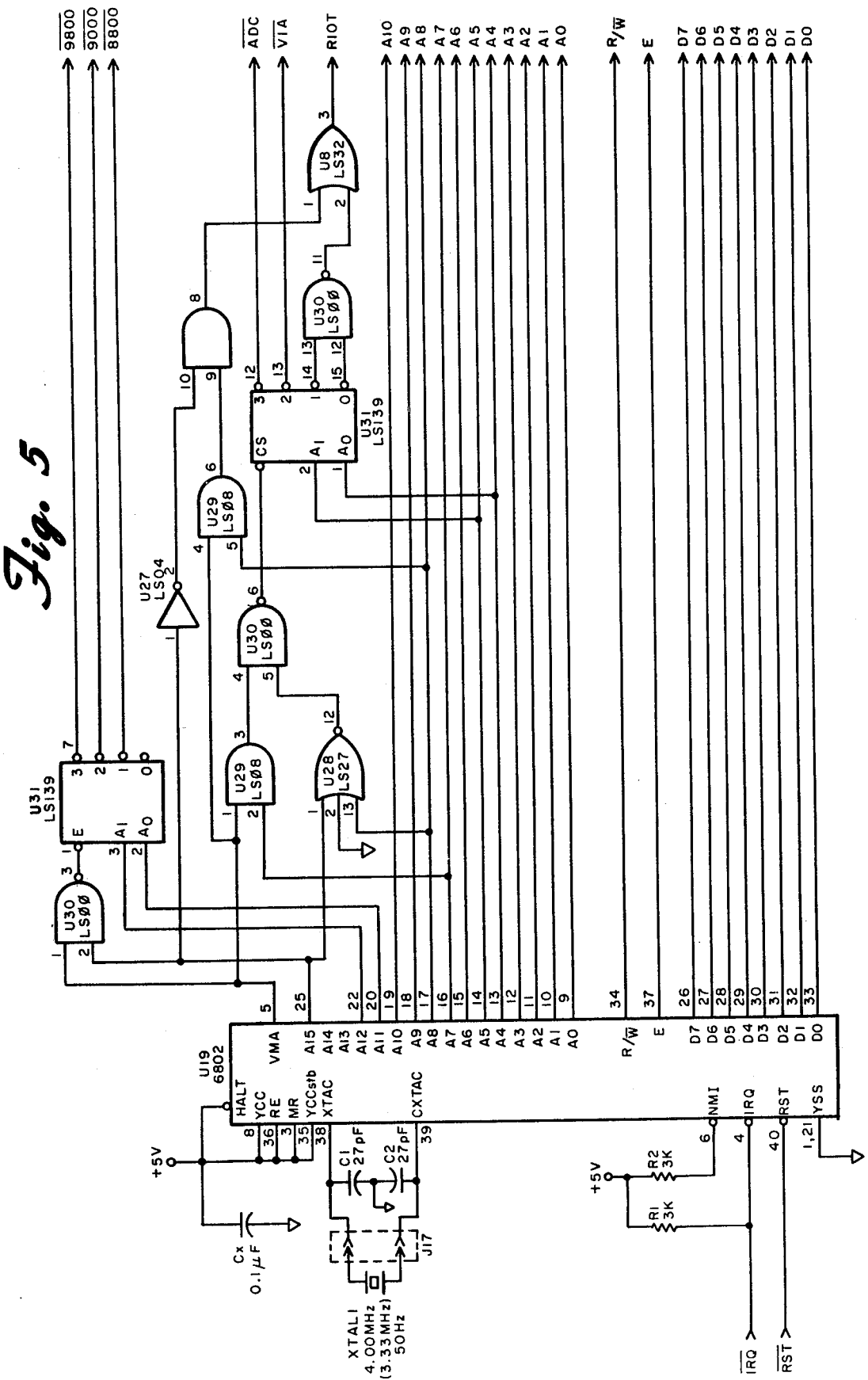

The welding controller includes a microprocessor 30 which basically includes eight data lines, sixteen address lines of which eleven are used in the present configuration, and interrupt request line and control lines of which three are used in the configuration of the present invention. Reference should be made to FIG. 5 for a more detailed microprocessor pin connection detail. The microprocessor utilized is a Motorola 6802 microprocessor.

Figure 9:
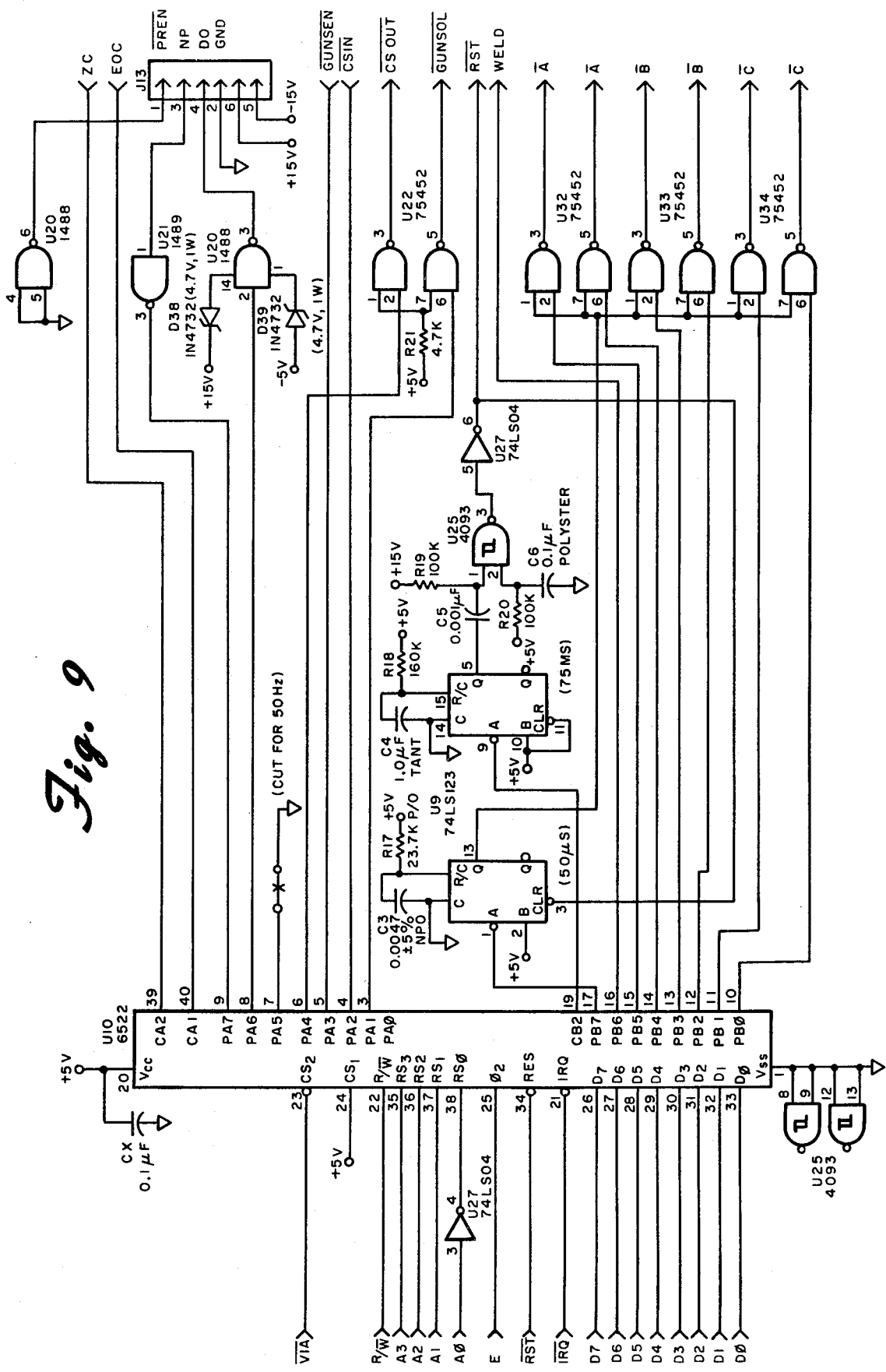

The microprocessor communicates with a versatile interface adapter (VIA) 31 which is manufactured by Synertek as number SY6522. The VIA includes two 8-bit bidirectional I/O ports, two 16-bit programmable timer/counters and serial data port, among other features. The VIA is the device through which the microprocessor communicates with the welding components heretofore described and as will be described in more detail hereinafter. Reference should be made to FIG. 9 for the pin detail connections for the VIA.

Figure 7:
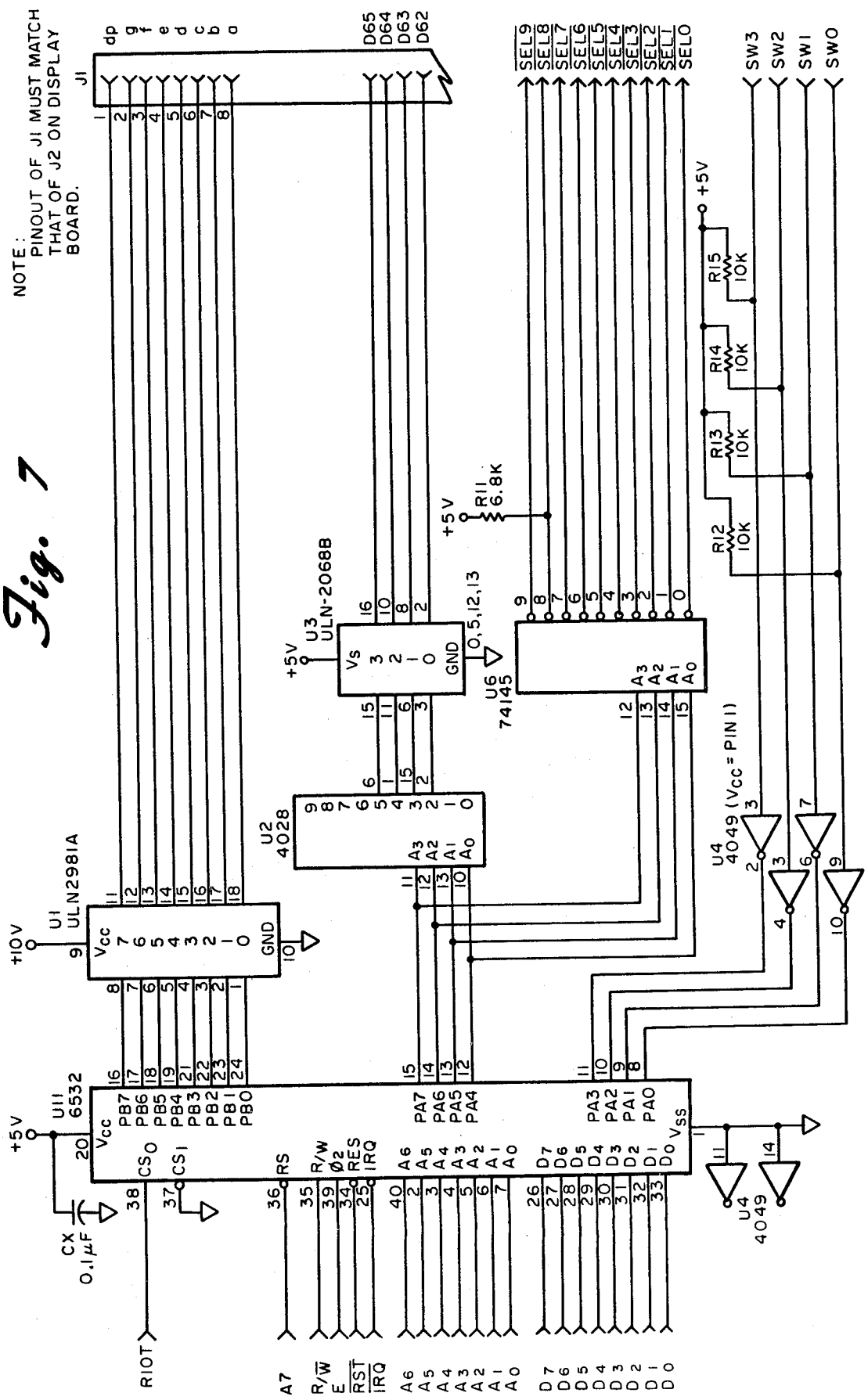
Figure 8:
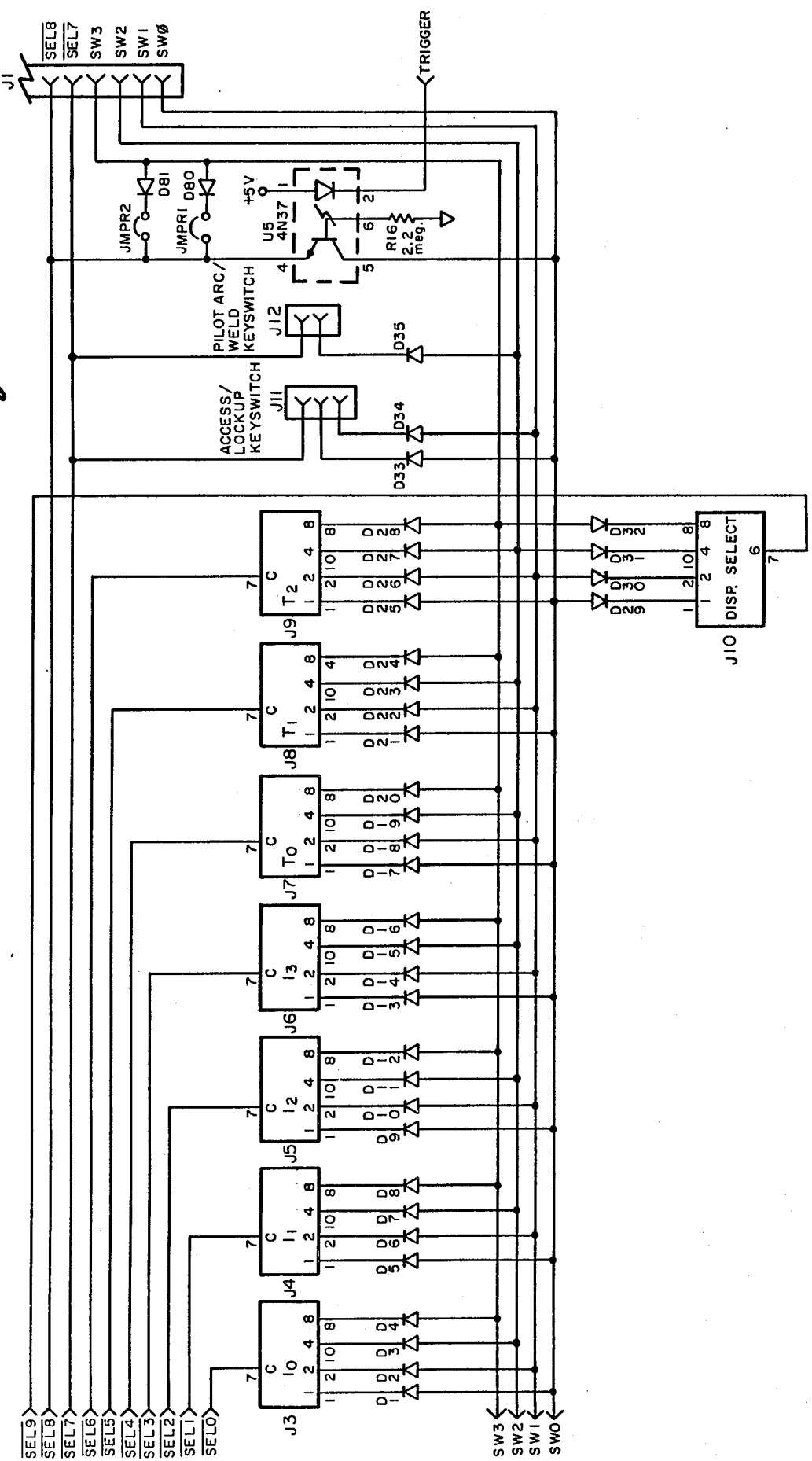

The microprocessor 30 also communicates with a combination RAM, I/O, timer array (RIOT) 32. The RIOT is manufactured by Synertek as model No. SY6532. This device is comprised of a 128×8 static RAM, two software controlled 8-bit bidirectional data ports allowing direct interfacing between the microprocessor unit and peripheral devices, a software programmable interval timer and interrupt circuit capabilities. The pin connection details for the RIOT device 32 are shown in FIG. 7 of the drawings.

Figure 6:
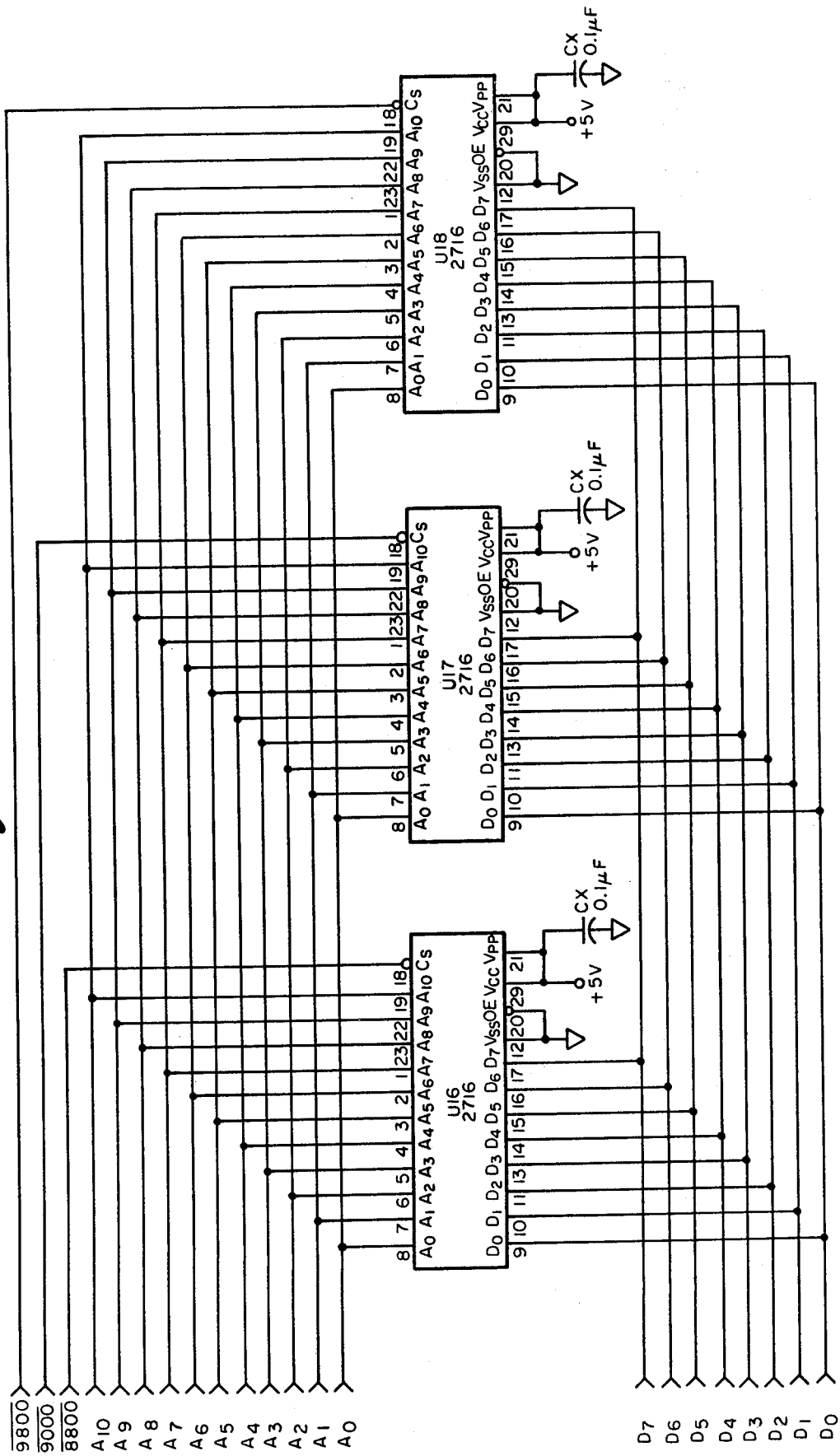

The microprocessor 30 receives its instructions from ROM memory 33. The ROM memory consists of six K of memory made up of three number 2716 ROM memory devices. The memory device pin connection details are shown in FIG. 6 of the drawings.

The microprocessor 30 also communicates through an address decoder array 34 to the RIOT 32 and to an analog to digital converter 35 to be described hereinafter as well as the VIA 31. The details of the address decoder array components and logic are shown in FIG. 5 of the drawings to which reference can be made for further detail.

Figure 10:
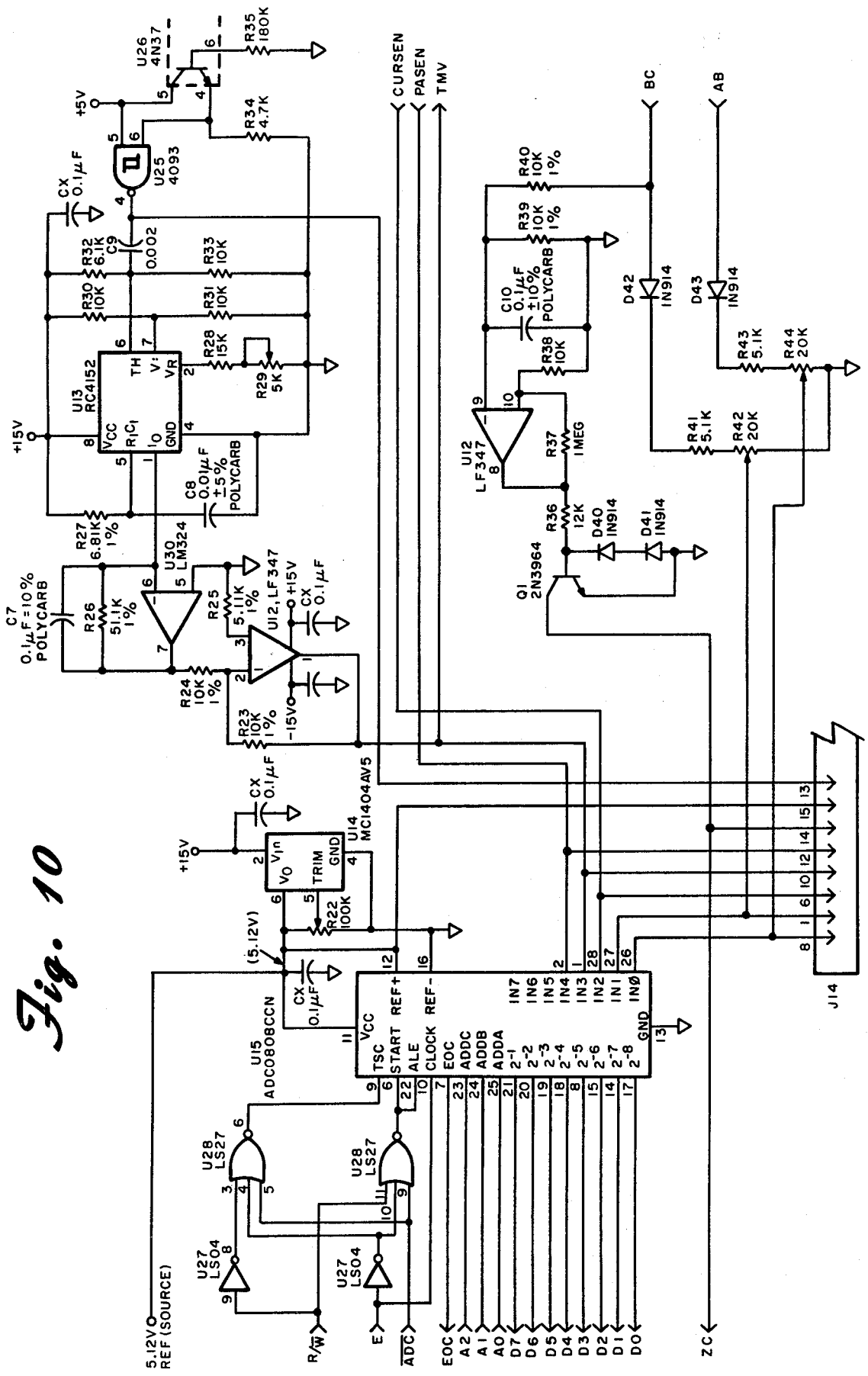
Figure 11:
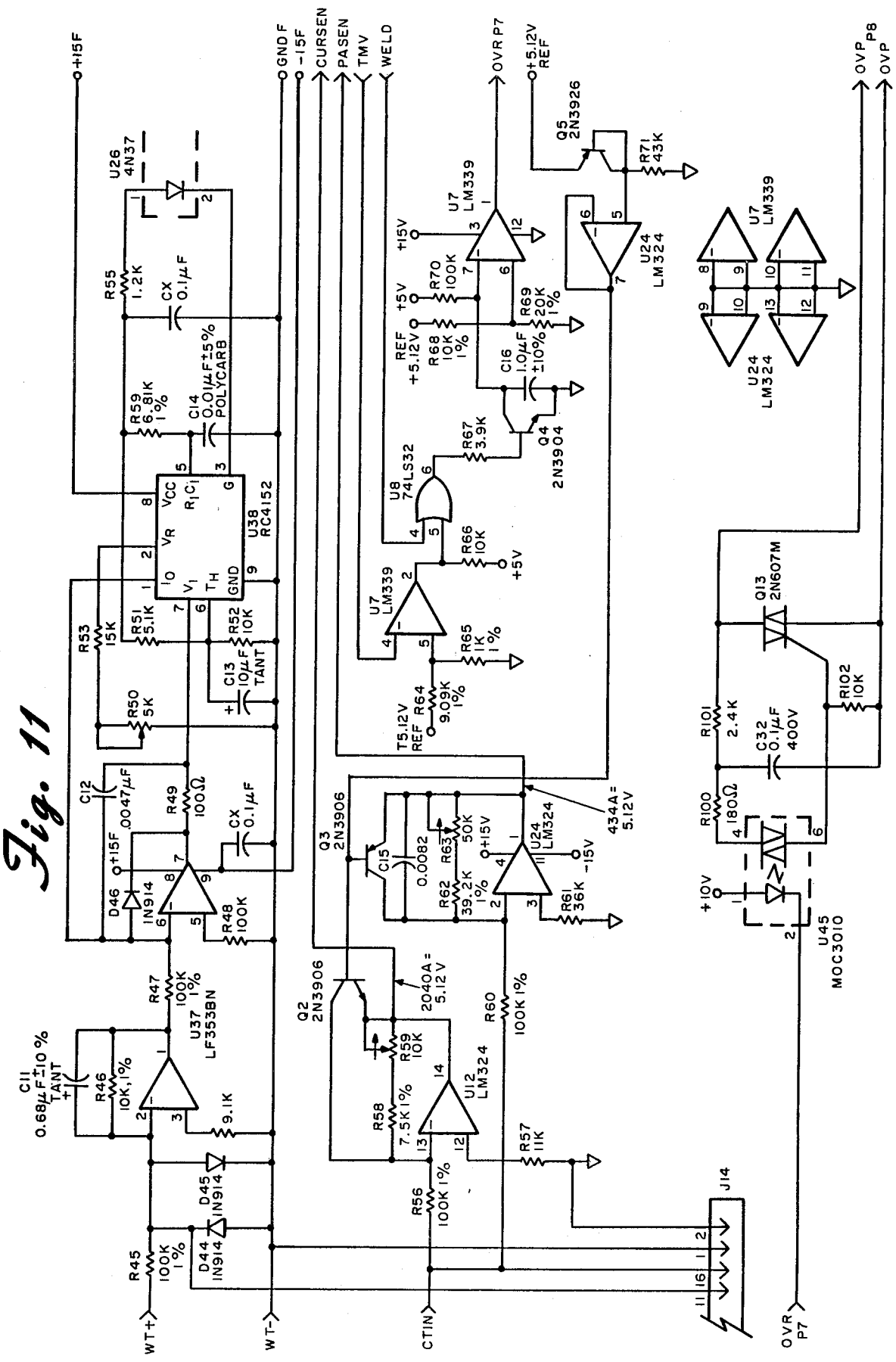
Figure 12:
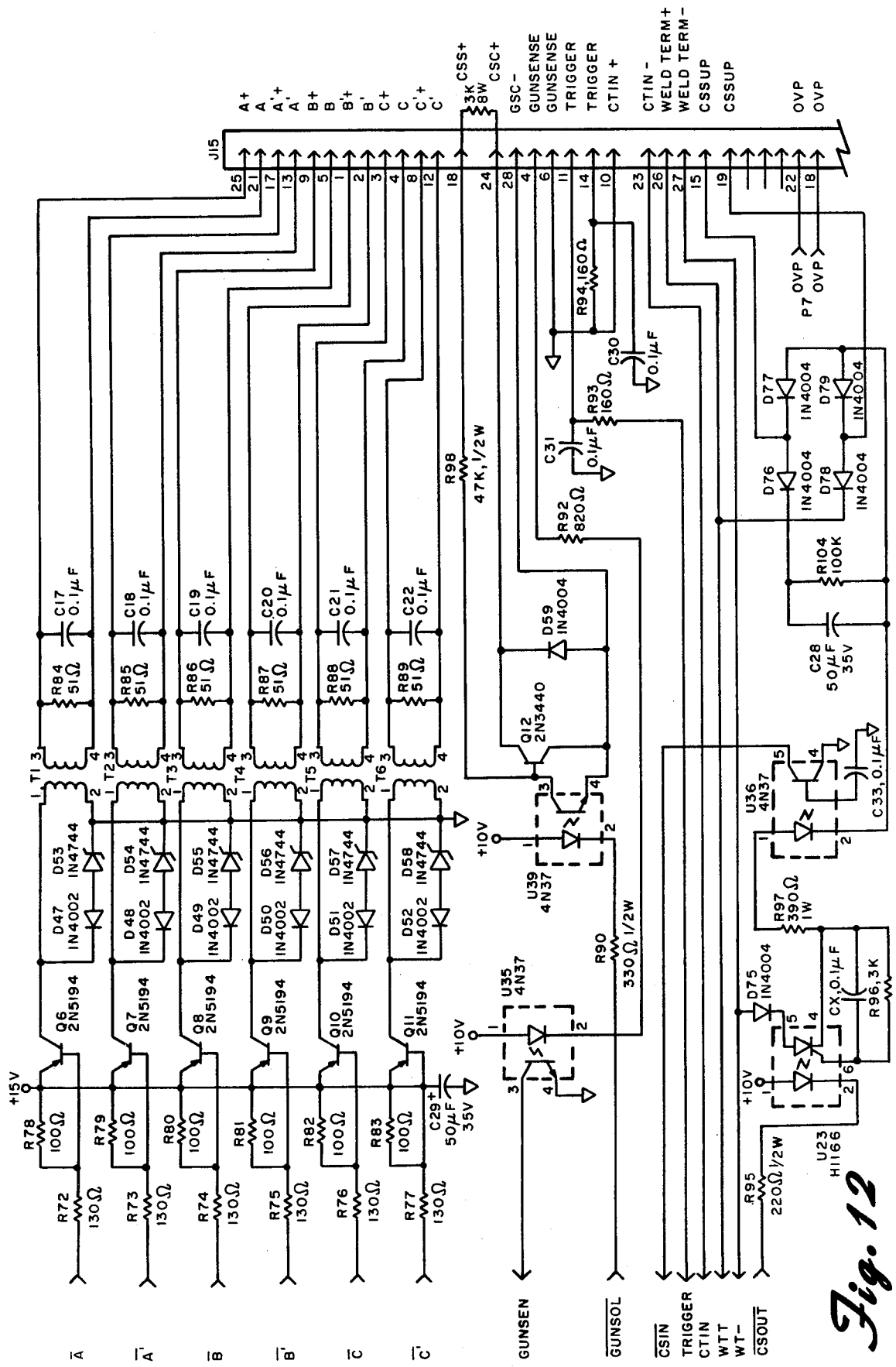
Figure 13:
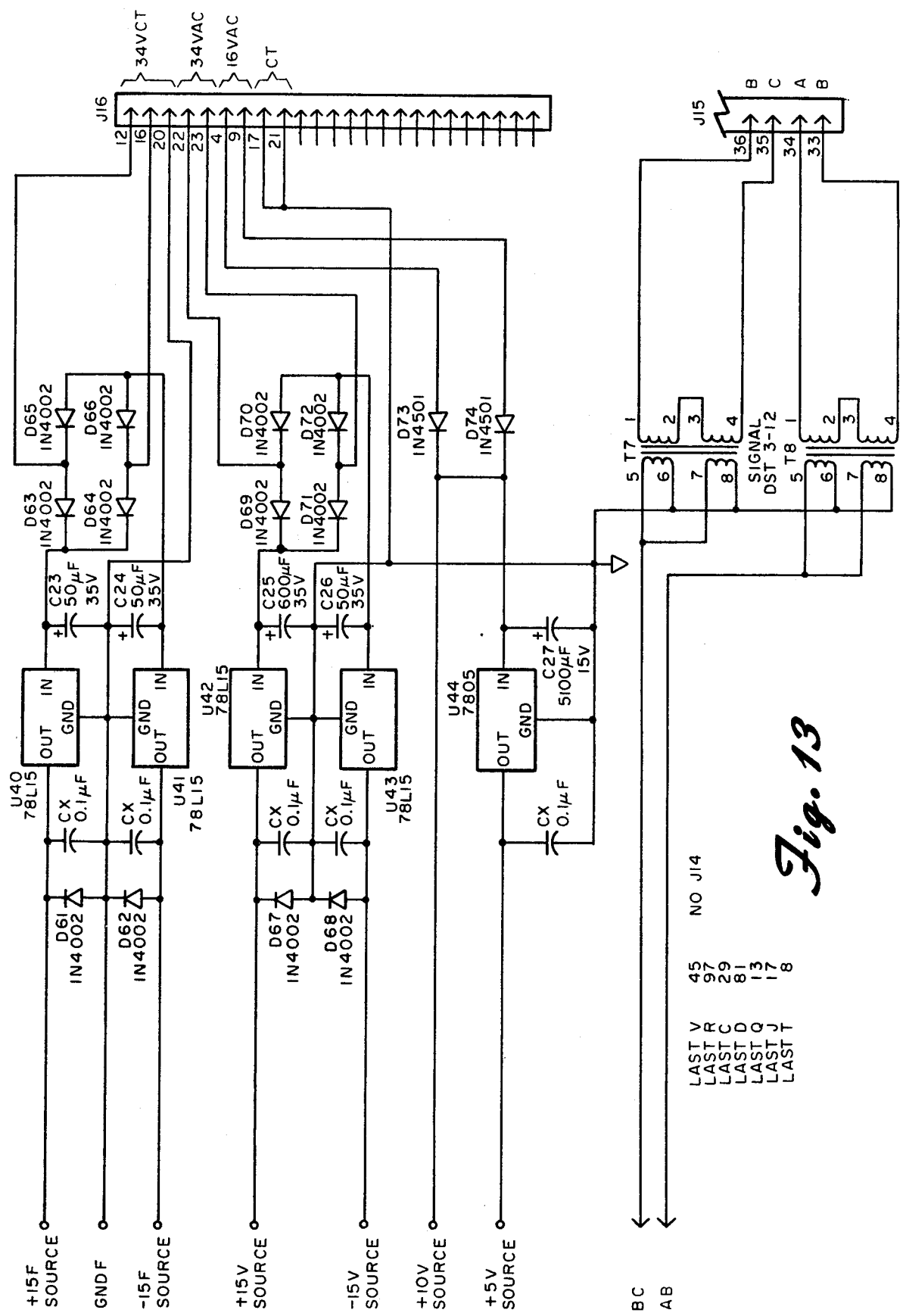

An analog to digital converter 35 is provided which passes analog data converted to digital upon the data bus for manipulation by the microprocessor 30. The analog to digital converter 35 is directly addressed by the microprocessor upon the address lines and also through the address decoder 34 as heretofore described. The details of the analog to digital converter pin connections are shown in detail in FIG. 10 of the drawings.

The overall function or operation of the stud welding controller of the present invention shown in FIGS. 1 and 2 is best described and understood by describing a typical stud welding cycle beginning from startup. The main power switch (not shown) to the transformers, associated gun control circuitry and the microprocessor control assembly is turned on to power up the equipment. Upon power up, a reset generator 36 resets the microprocessor 30, the VIA 31, 50 microsecond pulse generator 37 and the RIOT timer 32 to initialize the microprocessor assembly. The program passes through a restart routine which by means of the three input lines 13 through an isolation transformer 38 and A/D converter 35 will determine phase rotation and store that rotation in memory for future reference.

The RIOT timer 32 will be cycling through an interrupt routine to continuously read the status of the various switches, thumbwheels, trigger optical isolator and refresh the display in a sequence programmed into memory. At this time the stick/stud switch 23 will be placed in the stud mode. During the RIOT interrupt routine, the RIOT timer 32 through switch decoder 39 will read the status of switch 23 and that information passed back through the RIOT timer and stored in memory by means of switch buffer 40. Likewise, at this time the lockup key switch 25 and pilot arc switch 26 can be set to access mode and the appropriate number of cycles and pilot arc current selected into thumbwheels 21 and 22 respectively which readings will be read and stored in memory. Thereafter, the pilot arc switch 26 will be returned to set position and then the thumbwheels 21 and 22 may be set for the main welding current cycles and current. If desired, the lockup key switch 25 may then be returned to set or lockup as previously described. The values in the thumbwheels 21 and 22 for the main welding current cycles and current will have been stored in memory as the RIOT timer reads these thumbwheels during its interrupt routine.

If a lift check is desired, the lift check switch 24 may be set to the lift check position. This switch status will be stored in memory and if the trigger is actuated, the stud welding controller will go through an entire stud welding sequence except that the pilot arc and main welding current will not be turned on.

Upon initiation of the welding cycle, the trigger is closed and this will be sensed by line pair 13 at the trigger optical isolator 27. The closing of the key switch will be read by the RIOT interrupt routine and this will be passed through the RIOT timer to memory. During the background routine to be described in more detail hereinafter in the discussion of the flow charts, the setting of the bit representing closing of the trigger will be sensed and the stud welding routine begun.

The first thing occurring in the sequence is to turn on the pilot arc current and begin lifting of the stud. The output of the three phase bridge on line pair 12 is passed through divider buffers 41 or 42 representing a high current range and a low current range respectively to the A/D converter 35. The microprocessor through the A/D converter will read the pilot arc current range from either the high current range lines or low current range lines depending on the level of current. As will be described in detail hereinafter, under the section pertaining to flow charts, the microprocessor will then sense whether the pilot arc current is sufficient to constitute a good contact and pilot arc. If not, the pilot arc current will be turned off and the stud allowed to plunge against the workpiece in a hammer fashion sufficient times to bring the pilot arc current above a predetermined level or until a predetermined number of hammer cycles have occurred after which the entire sequence will be shut down.

Firing of the SCRs is under the control of the VIA 31. As will be discussed in detail hereinafter under the section pertaining to flow charts for the program, the microprocessor will sense the closing of the trigger switch and which, in combination with a signal from Schmitt trigger 43 representing a zero cross of one of the three phases providing an initializing reference, will activate timer 2 in the VIA. Upon timer 2 timing out, a timer 2 interrupt routine is initiated which by means of the program brings line PB7 low to the 50 microsecond pulse generator 37 which provides a trigger pulse to SCR gate driver 44. At the same time, timer 1 is started and, upon timing out, starts timer 1 routine, which will be described in detail hereafter, which selects the SCR pair to be fired and which via line 45 to the SCR gate driver 44 provides the remainder of the information necessary to place the firing signal upon the appropriate pair of SCR lines 17 to fire the appropriate phase of the SCR bridge.

During the entire cycle the terminal voltage across the welding terminals is determined. This determination is made by utilization of a low pass filter 45 whose output passes to a voltage to frequency converter 46 for isolation and then through an optical isolator 47 and in turn back to a frequency to voltage converter 48 and ultimately through a low pass filter 49 to the A/D converter 35. The microprocessor in its routine will read the terminal voltage from the A/D converter and store it for future computations.

Simultaneously with the initiation of the pilot arc welding current, the microprocessor addresses and passes data to the VIA to create a signal upon line 50 to a gun solenoid drive interfacing device 51. The gun solenoid drive interface 51 creates the necessary driving current to lift and drop the gun solenoid.

As will be described in detail hereinafter in respect to the flow charts, once sufficient pilot arc current has been established, the microprocessor then continues on with the pilot arc welding sequence. After a predetermined number of pilot arc cycles has occurred, the microprocessor will read the actual pilot arc current from the A/D converter 35 and compare this current to the ideal pilot arc current which has been stored in memory. Appropriate calculations will be made in the timer 1 service interrupt routine to be described in detail hereinafter to vary the parameters for firing the SCRs in each phase to appropriately adjust the actual pilot arc current to meet the ideal pilot arc current. After the predetermined number of pilot arc cycles stored in memory has been achieved, the microprocessor program passes into the main welding cycle.

During the main welding cycle and after a predetermined number of cycles have occurred, the microprocessor will reset and control the VIA for setting of timers and firing of the SCRs as described in respect to the pilot arc current. Additionally, during the timer 1 routine, calculations will be made respecting the actual weld cycle current during each phase which will be added to an average and the average compared to the ideal weld current stored in memory. Appropriate calculations will be made, as hereinafter described in regard to the flow diagrams, to adjust the firing parameters of the SCRs to bring the main welding current in conformity with the ideal welding current. Additionally, by utilization of the terminal voltage parameters together with the actual welding current and the number of cycles of current which have passed, the microprocessor will compute the actual weld energy. This will be compared to the ideal total weld energy desired and if required, appropriate adjustments will be made to extend the number of main welding cycles to a given percentage to bring the total weld energy into conformance with the ideal total weld energy. At the end of the weld cycle, the total weld energy and other parameters will be compared to the ideal weld parameters and different error codes set up depending on the degree to which the ideal parameters were achieved.

During the main welding sequence, a counter will control the time at which the microprocessor through the VIA directs the gun solenoid drive interface 51 to drop the gun solenoid. Additionally and as will be described in detail hereinafter, the weld sequence is set for hot plunge and the welding energy will be maintained on for approximately six cycles after contact of the stud with the molten pool of metal. These latter six cycles are not taken into the calculations performed by the microprocessor for total energy.

The stud welding controller and microprocessor routine includes a safety feature known as the chuck saver circuit which will prevent retriggering of the stud welding gun until the stud welding gun chuck has been withdrawn from the stud. This is to prevent the obvious burning of the chuck against the stud. This is accomplished by means of control lines 52 and 53 into and out of the VIA and a chuck saver interface 54. A 15 volt input 55 to the chuck saver together with a connecting line 56 to the welding terminals provides a signal indicative that the stud and chuck are still engaged. This is sensed in the appropriate part of the microprocessor routine through the VIA and an appropriate bit set to prevent retriggering until the connection between stud and workpiece has been broken.

An override protection circuit 58 is provided which, upon the occurrence of certain conditions, will pull the main breaker cutting power from the welding apparatus. This condition occurs whenever the voltage upon the welding terminals is greater than 10 volts and line 57 to the override circuit 58 is inactive indicating an absence of welding, i.e. no closed trigger and SCR trigger pulses. The override circuit 58 is a protection against accidental energizing of the stud which could occur under such conditions as a broken-down or shorted SCR.

The stud welding controller assembly VIA line 61 and a gun sensor optical isolator 60 is able to determine whether an error has been made in that the stud welding gun cable or stick welding cable is inserted into the wrong receptacle. The receptacle on the welding apparatus for the stud welding gun includes a cam lock which provides a signal when a welding cable has been engaged with the terminal for the stud welding gun. The microprocessor will check the stick/stud switch and compare this to the status of the cam lock switch as reflected through the gun sensor optical isolator 60 and determine the mismatch. If there is a mismatch, an appropriate error sigal will be generated and the equipment rendered inoperative until the proper match is completed.

At the end of the welding cycle, the microprocessor will have stored in memory the parameters of pilot arc welding current, number of pilot arc weld cycles, main welding current, voltage and number of cycles and also the computation of the total weld energy. The RIOT timer routine will service the display select 20 and appropriately retrieve from memory and display in display 28 by means of digit decoder 57, digit driver 58 and segment driver 59 the selected information in the display. Additionally, upon the occurrence of any error, the RIOT timer routine will alternately display the error number together with the parameter selected in the display select.

In the stick welding mode, the stud welding controller microprocessor assembly will automatically go to the routine for controlling of welding current bypassing the pilot arc and hammer routines as will be described hereinafter in greater detail. During the stick welding cycle, an initial number of cycles will be ignored to provide for arc stabilization. Thereafter, the timer 1 routine will ascertain the phase current and average the phase current with sixteen prior phases and compare the current to that stored in memory from the current thumbwheel 22. Appropriate calculations will be made by the microprocessor to direct the VIA to control the SCR firing to bring the stick welding current into conformity with that selected. As will be described in detail hereinafter as respects the flow charts, at any time the welding current drops below a predetermined value indicating extinguishment of the arc or imminent extinguishment, then the welding controller will shut down the welding sequence. At the end of welding, the only display that will occur will be the average weld current that was calculated.

II. Schematic Diagrams

Set out in the drawings in FIGS. 3-13 are the schematic diagrams heretofore referred to and which present the detailed wiring to and from the various components of the microprocessor assembly illustrated in block diagrams of FIGS. 1 and 2. Additionally, these schematics illustrate the pin designations for each of the various components and also the logic incorporated between the various devices. It is not believed necessary that a detailed explanation of the schematics is necessary in view of the explanation of the function of each of the blocks as shown in FIGS. 1 and 2 which can be readily identified in each of the schematics set forth in FIGS. 3-13.

III. Flow Charts

A. In General

Set out in FIGS. 14-37 of the drawings are the flow charts which depict the steps which the computer program executes in the data processing carried forth in the subject invention. Following hereinafter is a flow chart table or listing depicting the different routines and subroutines involved. A brief summary or description of the function of each of the routines or subroutines will be undertaken in the subsections which follow. A greater definitive understanding of any particular routine or subroutine may be had by a thorough review of the specific routine itself taken in conjunction with the assembled program which follows in section V hereinafter.

For a basic understanding of the interrelationship of the restart routine, background routines and interrupt routines with one another, reference should be made to FIG. 14 of the drawings. As will be explained more fully hereinafter, the restart routine includes a self-check which, if successfully completed, moves into the background routine. The background routine, as may be seen from FIG. 14, is a continuous loop back to itself which processes various states such as pilot arc and main welding current unless there is an interrupt to the microprocessor of the nature shown on the left-hand side of FIG. 14.

| Flow Chart Table | FIGS. |
|---|---|
| (1) Restart routine | 15 & 16 |
| (2) Background | |
| (a) Start | 17 |
| (b) State 0 initialization for weld | 18 |
| (c) State 1 pilot arc initialization | 18 |
| (d) State 2 end of pilot arc | 19 |
| (e) State 3 dummy state | 19 |
| (f) State 4 main weld sequence | 20 & 21 |
| (g) State 5 hot plunge | 21 |
| (h) UPDCYC | 23 |
| (i) State 6 end of stud weld | 22 |
| (j) State 7 hammer termination | 22 |
| (k) STKRTN stick weld | 24 |
| (l) DSPFMT display format | 25 & 26 |
| (3) Interrupts | |
| (a) Zero cross-service interrupt | 27 & 28 |
| (b) Timer 2 service interrupt | 29 |
| (c) Timer 1 service interrupt | 30 |
| (1) Detail 1 - compute regulated base phase angle | 31 |
| (2) Detail 2 - sample Avg, get next SCR pair | 32 |
| (3) Detail 3 - compute adjustment | 33 |
| (4) Detail 4 - compute change | 34 |
| (5) Detail 5 - store change in timers | 34 & 35 |
| (d) RIOT timer | 36 & 37 |

Figure 16:
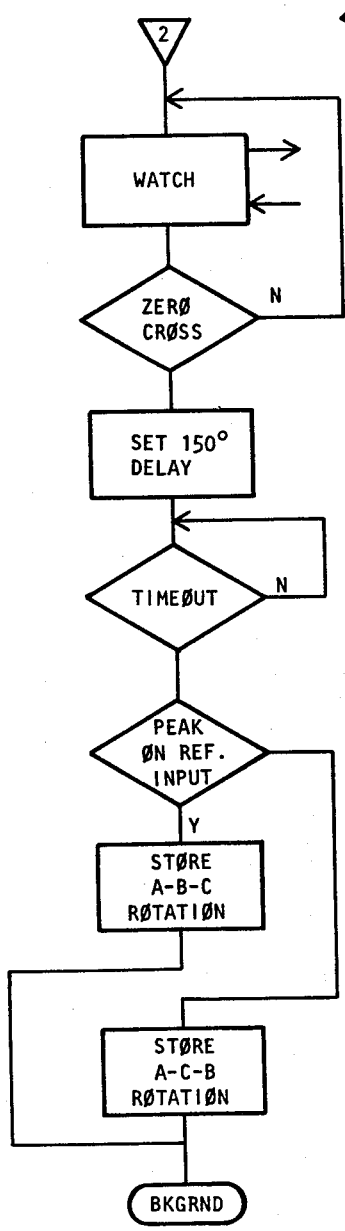

B. SUMMARY OF FLOW CHARTS (1) Restart:

The restart routine is shown in FIGS. 15 and 16 of the drawings. In general, the restart routine checks all of the operable components such as the ROM, RAM, checks for line voltage frequency and initializes the peripherals such as the VIA and RIOT. Additionally, pilot arc parameters permanently stored in the memory are set in the event that the operator has not set alternate parameters. Further yet, the phase rotation of the incoming power is sensed and set. If all tests are successfully completed, the restart routine moves on the background routine.

(2) Background:

(a) Start: The start routine is shown in FIG. 17 of the drawings. The start routine is one of many consecutive routines in the primary background loop through which the microprocessor will continue until the presence of an interrupt. During the start phase of the background routine and as shown in FIG. 17, the program is checking the setting of all switches and determining the presence of errors. Additionally, the major determination is made as to whether the program is to continue in the stud welding mode or through the stick routine (STKRTN). Any faults or errors are displayed through the display format.

If the trigger is not closed, the program sets the state to zero and goes to display format. If the trigger switch is closed, the background start routine goes to a subroutine known as "watch". The watch subroutine sets the reset generator to zero or initial timing to avoid timing out of the reset generator that would reset the entire system upon timing out. The reset generator is a built-in safety precaution which provides a reset signal after a predetermined time, the expiration of which would indicate such factors as the processor being unable to continue the proper execution of its program. Following the exercise of the watch subroutine and while in stud welding mode, the program proceeds to a state subroutine depending upon the state set. There are eight states, as will be hereinafter explained. The program will execute a given state and return from subroutine. If the program has set the next state to other than zero, the program will return to subroutine "watch" and then the next state subroutine. Otherwise, the program will return to background start.

Figure 18:
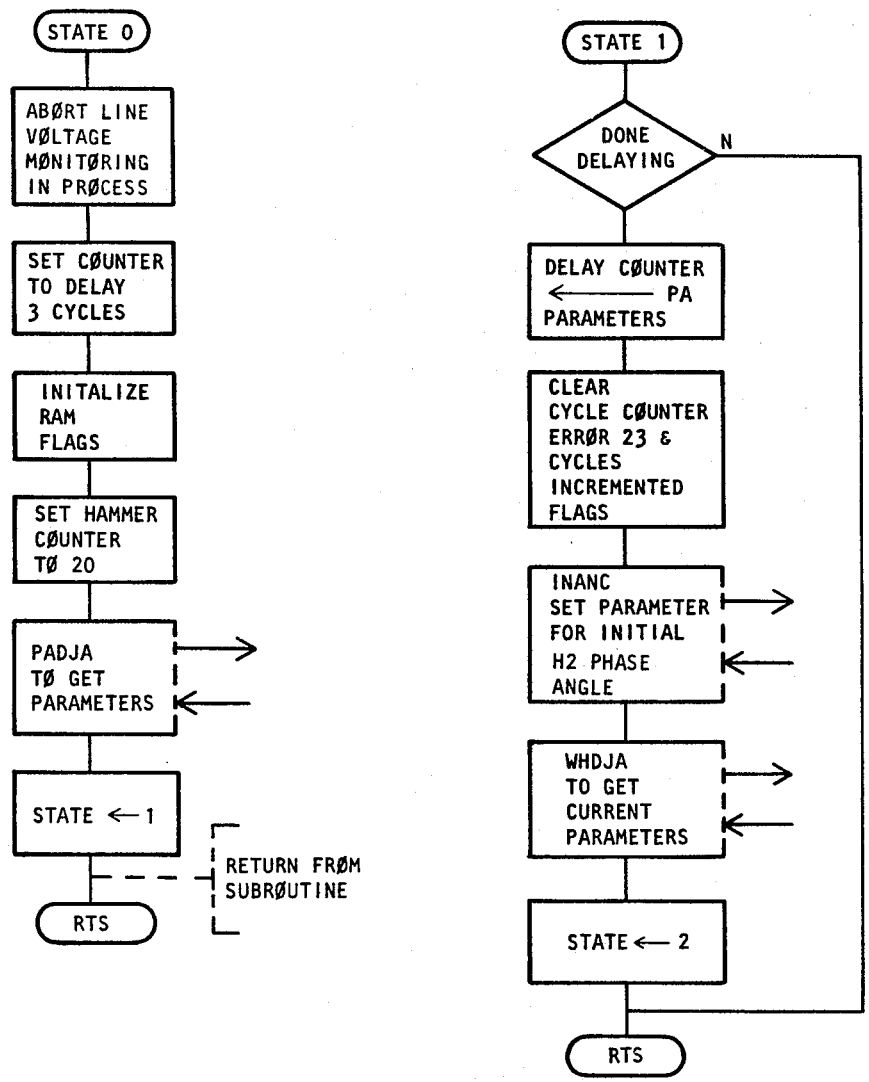

(b) State 0 (initialization for weld): The state 0 or initialization for stud weld subroutine is shown in FIG. 18 of the drawings. During this subroutine, such functions as initializing all RAM flags is accomplished and the hammer circuit counter is set to 40. Additionally, the ROM table is consulted together with the weld current settings and an initial SCR firing angle computed for beginning of the welding current. Thereafter, the state counter is incremented by 1 and the program advanced to the next state which, in this case, would be state 1.

(c) State 1 (pilot arc initialization): The state 1 or pilot arc initialization subroutine is shown in FIG. 18 of the drawings. In this subroutine, the pilot arc parameters of pilot arc current and number of cycles are set. Thereafter, the program moves to state 2.

Figure 19:
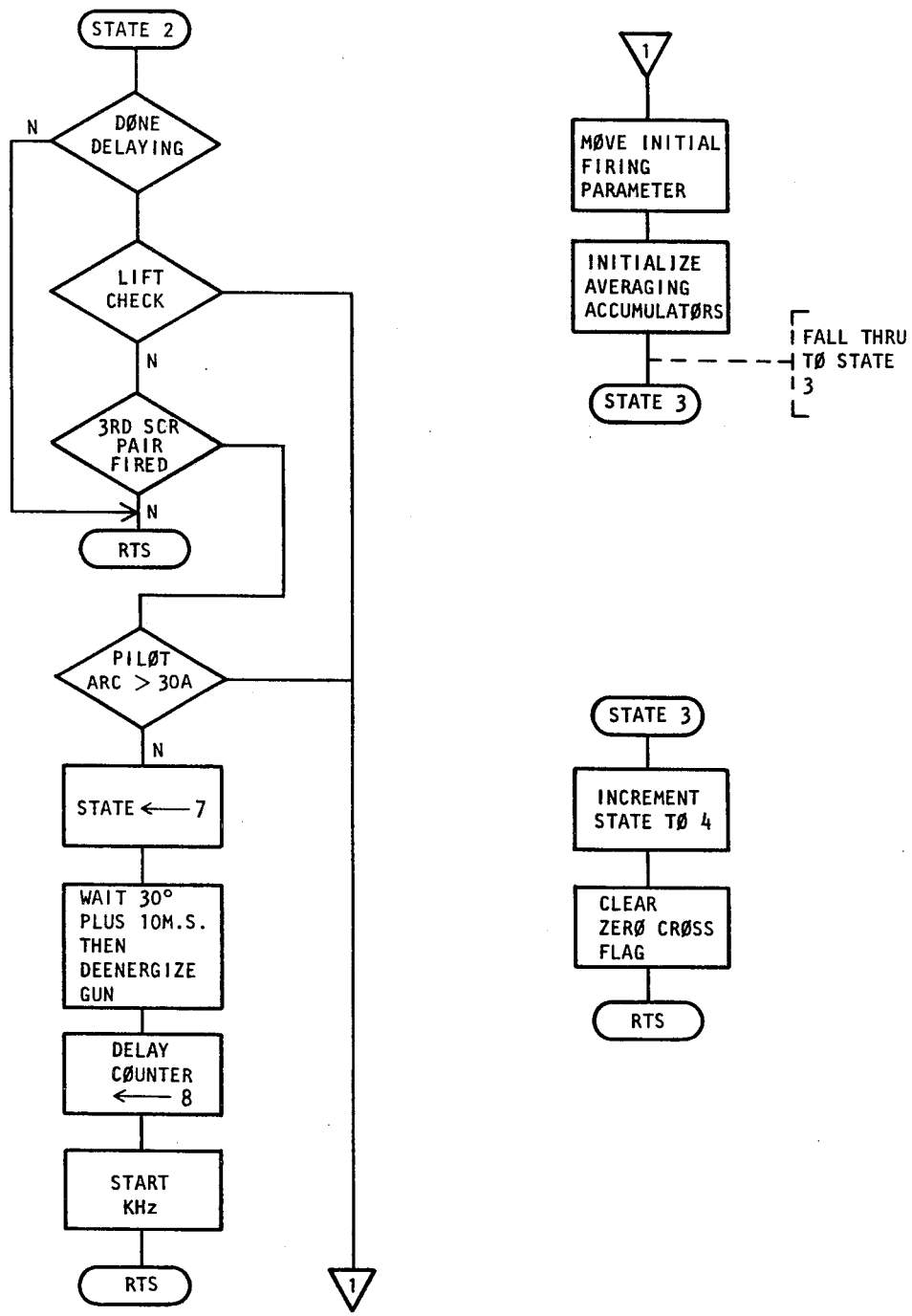

(d) State 2 (end of pilot arc): The state 2 subroutine or end of pilot arc routine is shown in FIG. 19 of the drawings. If the switches are in the lift check mode, the program progresses on through the remainder of the sequence utilized in a complete welding cycle. If lift check is not enabled, then the program will see if the pilot arc cycle has reached the required number of cycles stabilizing the current and, if not, will return from subroutine. Otherwise it will loop back until the third SCR pair has been fired. Once the third SCR pair firing has been sensed, the program continues to determine if the pilot arc is greater than 30 amps and, if so, continues through the program placing in appropriate memory the initial firing parameters and initializing averaging accumulators preparatory to main welding current calculations. If the pilot arc current was less than 30 amps indicating a fault condition, state 7 is set and the program proceeds through the functions as shown in FIG. 19 to the return from subroutine and state 7. State 7 is the hammer circuit operation routine, which, upon completion, initially returns to state 0 as will be illustrated in the discussion of state 7.

(e) State 3 (dummy state): State 3 shown on FIG. 19 is a dummy state which essentially increments the state counter to state 4 and moves ahead into the program.

Figure 20:
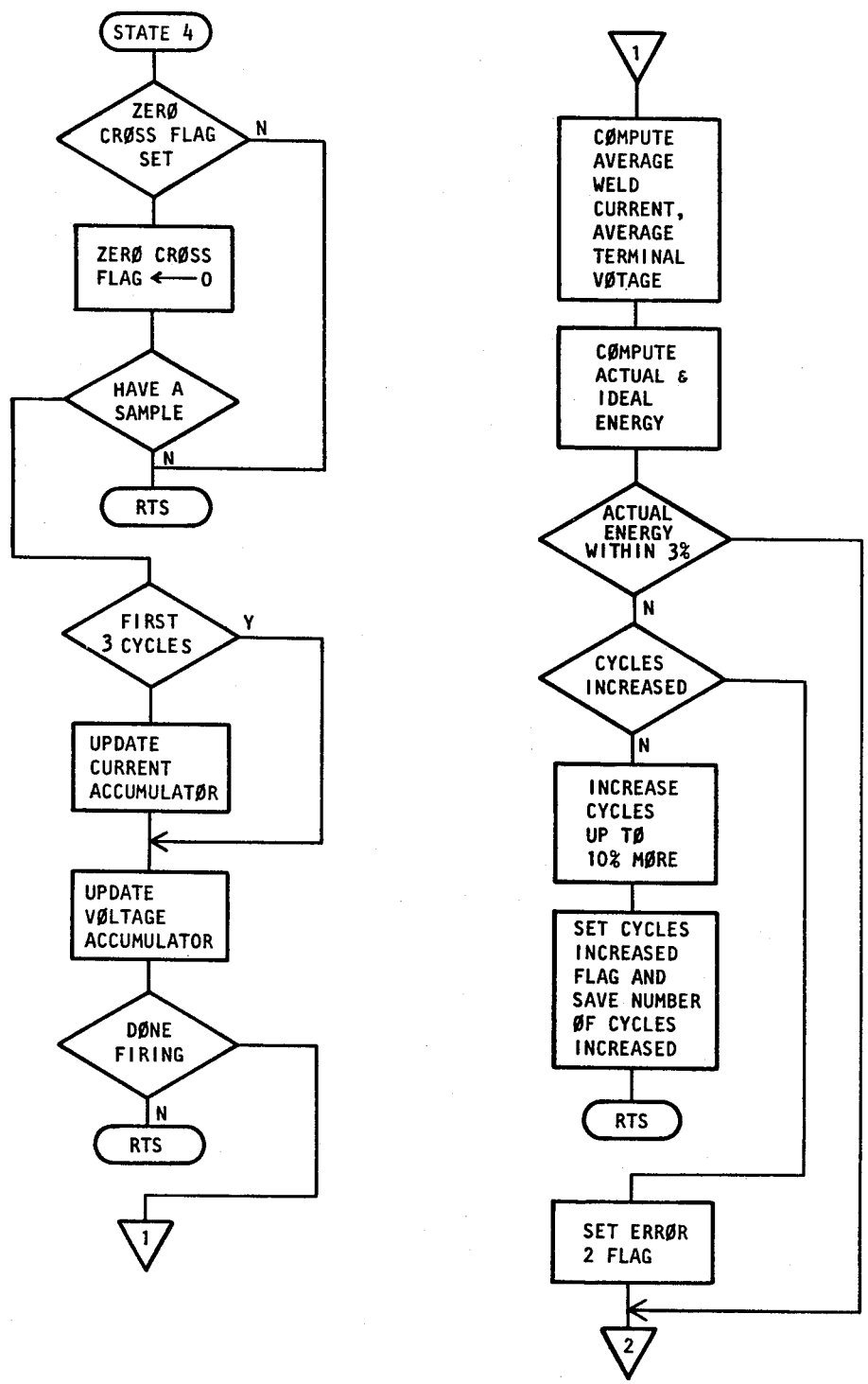
Figure 21:
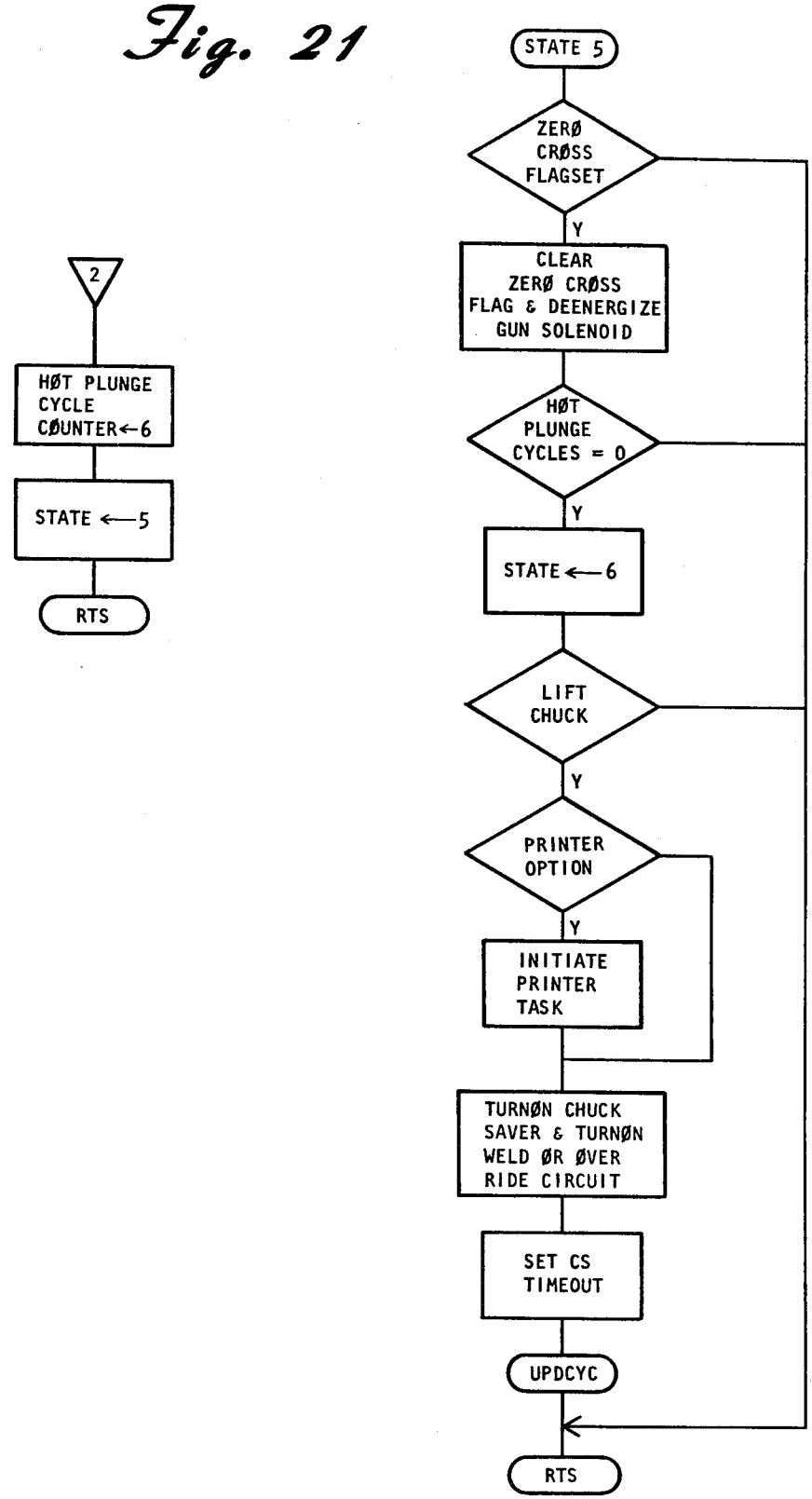

(f) State 4 (main welding sequence): The main welding sequence set forth in state 4 is shown in FIGS. 20 and 21 of the drawings. In the initial part of state 4, the program seeks to determine whether or not the service interrupts are firing the SCR's and computing the current and voltage. When this begins, the program progresses through updating the current accumulator and voltage accumulator once per cycle until firing is done. Thereafter, the main weld sequence program computes the average weld current and average terminal voltage and further computes the actual energy. Next, the actual energy is compared to the ideal energy and if within three percent of the ideal energy, moves through the program setting the hot plunge cycle counter to 6 to permit the hot plunge following deenergization of the gun solenoid to continue for a period of 6 cycles. The state counter then is incremented to 5.

At the end of the weld, the energy is checked. If it is less than 97% of the ideal welding current, the number of cycles is increased by the percentage that the energy was low up to 10%. When these additional cycles are completed, the energy is checked again. If it is still less than 97%, then an error 2 flag is set. In any case, the weld is terminated after the second check.

(g) State 5 (hot plunge): State 5 for the hot plunge subroutine is shown in FIG. 21. This subroutine waits for setting of the zero cross flag and, when set, clears the zero cross flag, deenergizes the gun solenoid and then proceeds to loop until the hot plunge cycles equal 0 whereupon the state counter is set to 6. Thereafter in the routine the lift check flag is checked and if set, returns from subroutine, and state 6. If the lift check flag is not set, the routine then checks for the presence of a printer option and, if present, initializes the printing routine (not shown) and thereafter, turns off the weld override circuit while immediately thereafter turning on the chuck saver output. After a predetermined time, the chuck saver output, which applies a gating pulse to an SCR, is terminated. The SCR continues conducting until disengagement of the stud with the workpiece. As long as the SCR is conducting, the program will not continue past the point of waiting for the stud to be disengaged. The routine then proceeds into the subroutine of UPDCYC to be described immediately following.

Figure 23:
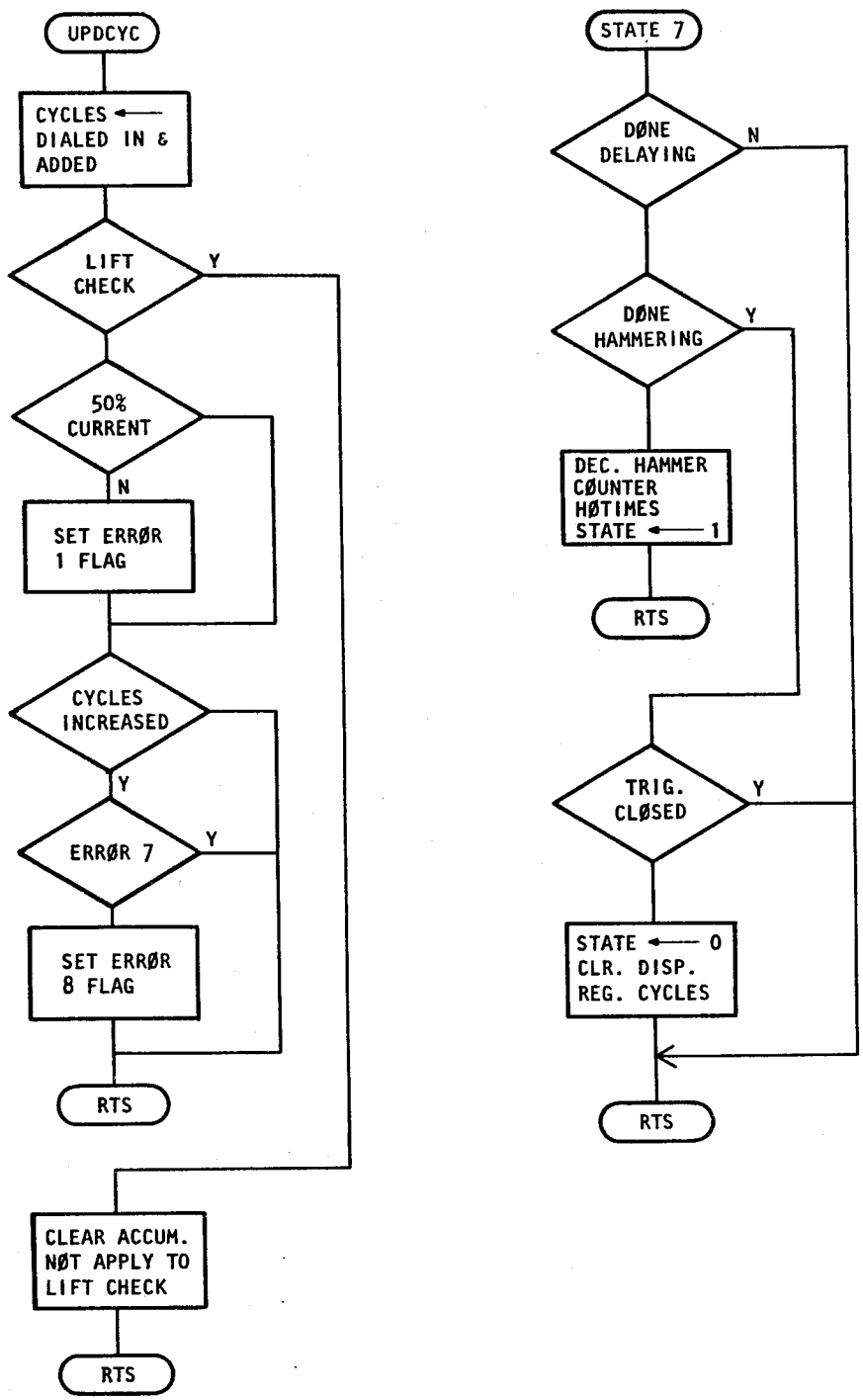

(h) UPDCYC routine (update cycles): The UPDCYC update cycle subroutine is shown in FIG. 23. In this subroutine the dialed in number of weld cycles plus any incremented cycles are added together and placed in memory for future reference. Thereafter, the routine checks to see if the lift check bit is set and, if so, proceeds on to clearing all accumulators not associated with the lift check and returns from subroutine. If the lift check bit is not set, then the determination is made if fifty percent of current was achieved and, if so, this determination coupled with cycles increased will set an error 3 flag providing that an error 7 flag has not been set. If fifty percent current was not achieved, then an error 1 flag would be set. As respects the determination of parameters for each of the error flags, attention is directed to the error code chart under section V following.

Figure 22:
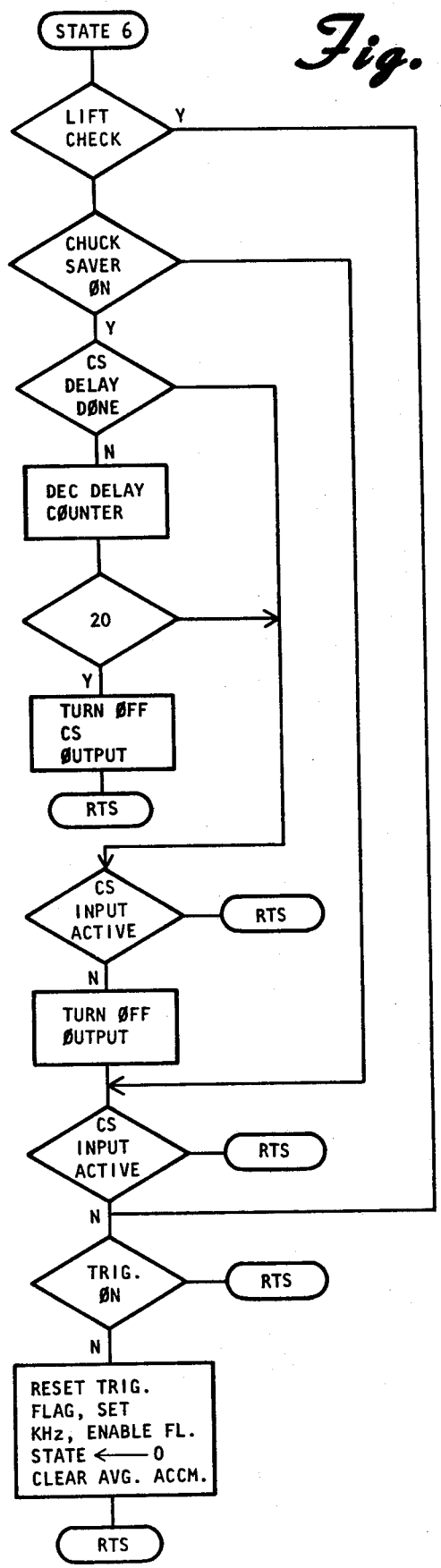

(i) State 6 (end of stud weld): The state 6 subroutine or end of stud weld routine is shown in FIG. 22. Again the lift check bit is checked and, if present, the program proceeds to determine whether the trigger has been released. If not, the program loops back until the trigger is released and thereafter resets the trigger flag to permit repeat of the trigger cycle. If the lift check bit is not set, the remaining flow paths in state 6 essentially determine whether the chuck saver input signal has terminated and if not, delays until such has occurred. The routine further determines whether the output signal across the stud and workpiece has terminated and, if not, delays until such happens and ultimately when the output signal has ceased, indicating that the chuck has been pulled from the stud, turns off the chuck saver output signal and thereafter, returns from subroutine. The termination of state 6 will set the state counter to 0 returning to the main background loop.

(j) State 7 (hammer termination): State 7 or the hammer termination subroutine is shown in FIG. 23. State 7 is reached through one branch of state 2 shown in FIG. 19 wherein the pilot arc current is less than 30 amps indicating the need of the hammer action. The subroutine checks for the passage of an initial delay period following deenergizing of the pilot arc which occurs in state 2. Following the delay period, the routine proceeds to decrement the hammer counter by 1 each loop and resets the state counter to 1 to return through states 1 and 2. In these states the gun solenoid is energized and deenergized creating a hammer action until either the pilot arc senses greater than 30 amps as shown in state 2 upon which the normal welding procedure continues or a count of 20 hammer actions has been reached at which point "done hammering" will have been determined as yes and the routine branched to determine whether the trigger is closed. If the trigger is closed, the routine will loop until the trigger is open. Once the trigger is opened the state counter will be set to 0 and routine returned to state 0 at which, upon closing of the trigger, another attempted weld cycle could be commenced.

Figure 24:
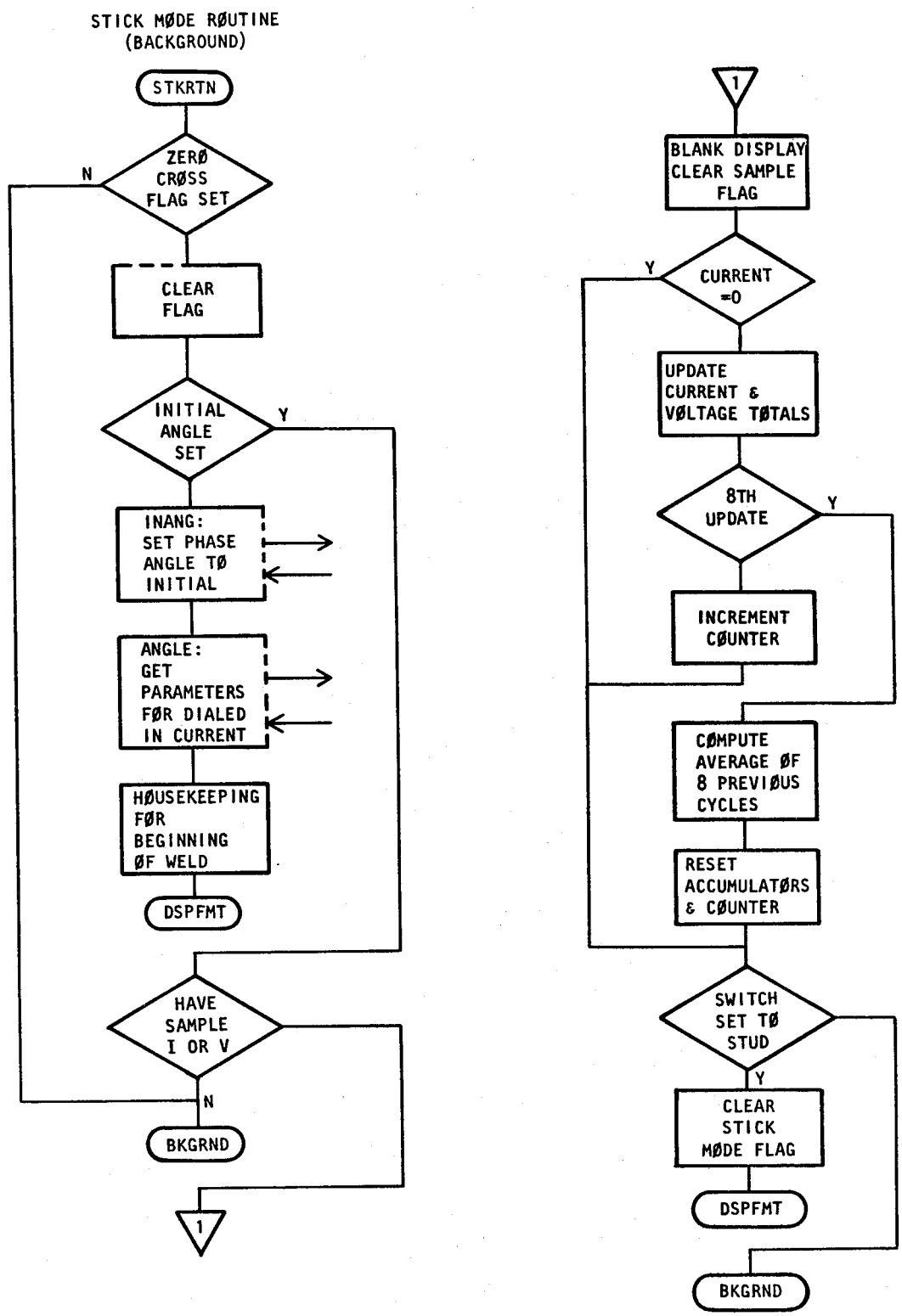

(k) STKRTN routine (stick weld routine): The STKRTN or stick weld routine is shown in FIG. 24. In the stick routine, the routine will continuously loop until a zero cross flag has been set. Thereafter, the flag is cleared and a determination made whether the initial phase angle has been set. If not, the INANG routine is called which goes to a ROM table to set the initial phase angle and the ANGLE routine is undertaken to get current parameters. A housekeeping routine in the nature of clearing the accumulators, etc. is undertaken. The routine then passes into the display format (DSPFMT) routine which will be described hereinafter and after which having passed through will return to the beginning of background and ultimately loop back to the stick routine to the point of determination of zero cross flag.

Having determined that the initial angle is set, the routine branches through determination of a sample having been received and will loop until such has been received. After determination of the sample, the display will be blank and the sample flag cleared. A determination will be made if the current equals 0 or if the current has not continued through 8 phases, whereupon then the routine will continue back around to background. Once the eighth update phase has been sensed, the averages of the voltage and current in the eight previous cycles are computed and the accumulators and counters reset to again recompute a following eight cycles.

In the event the stick/stud switch has been changed to stud during the routine, this will be determined and the stick mode flag cleared and the routine passed into display format routine. The display format routine, as to be described hereinafter, will convert the display select thumbwheel setting from binary coded decimal to binary and set up the display buffers in accordance with the type of information desired to be displayed and as set in the thumbwheel.

Figure 25:
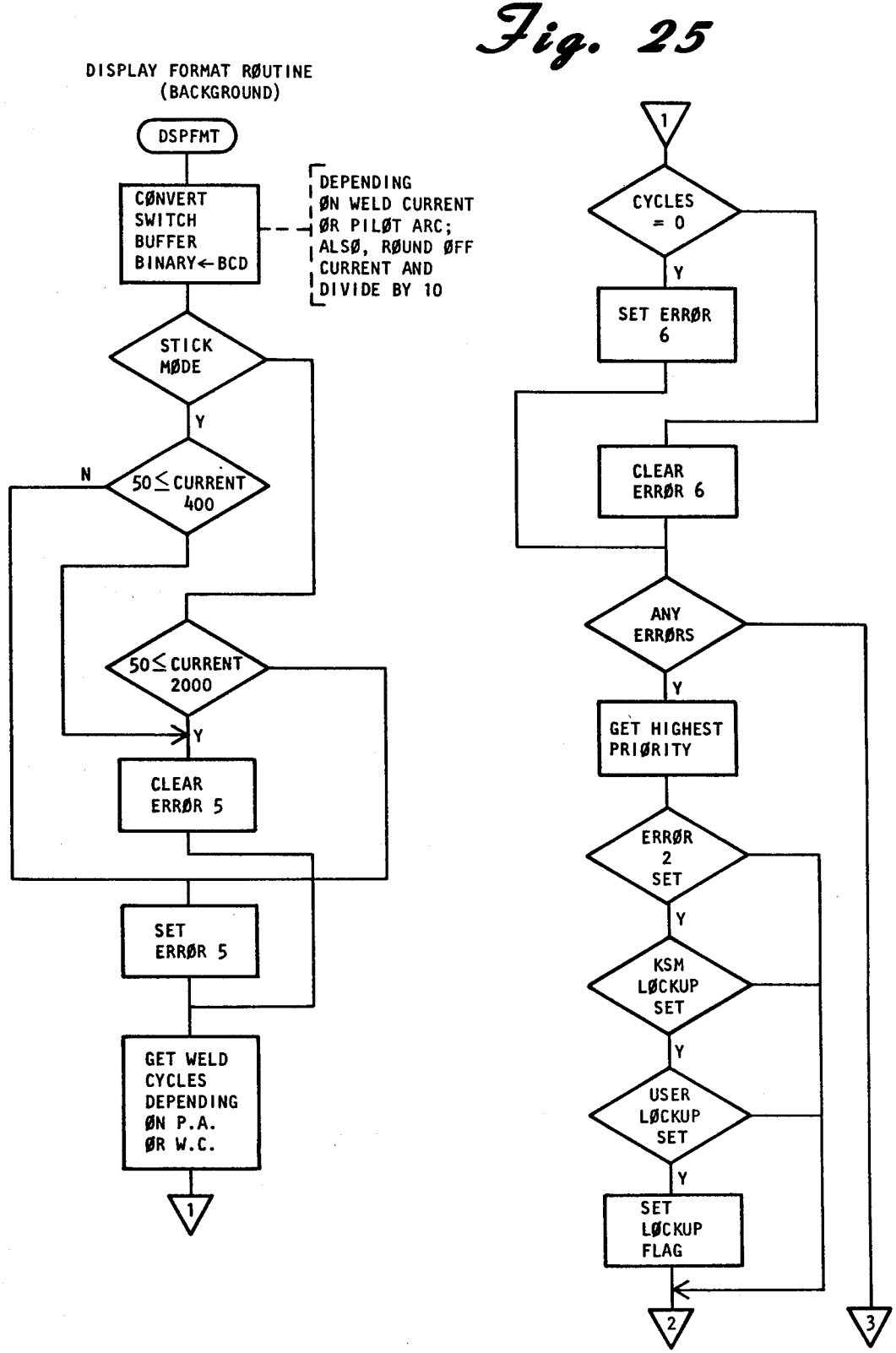
Figure 26:
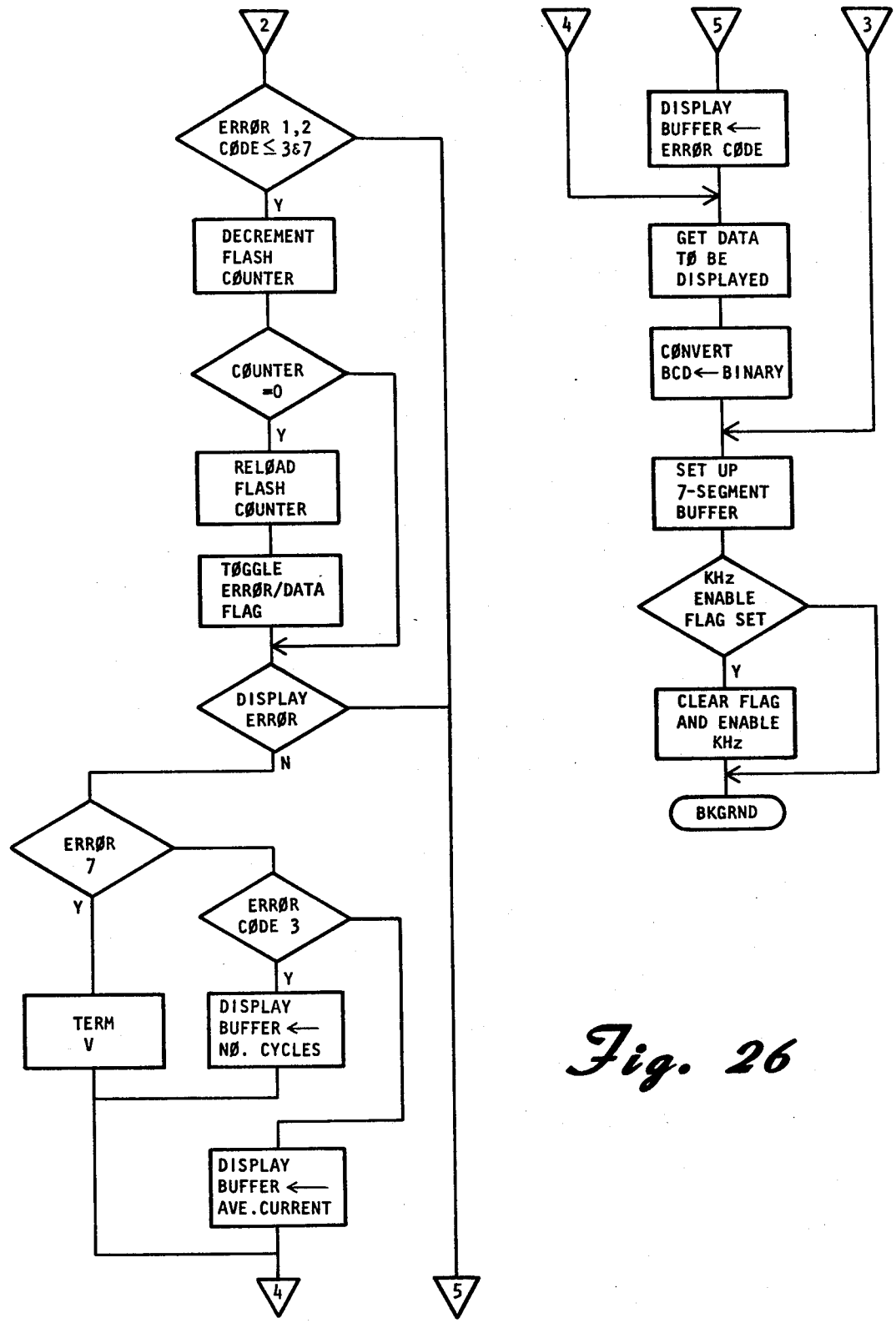

(l) DSPFMT routine (display format routine): The DSPFMT or display format routine is shown in FIGS. 25 and 26 of the drawings. This routine is undertaken at many points in the various states and routines described hereinbefore. Essentially, the display format routine checks for thumbwheel parameters, checks and displays errors and selects errors upon a priority and also converts the display thumbwheel selector from binary coded decimal to binary in order to set up the display buffers to display the type of information desired to be displayed, i.e. current, voltage, cycles, watt seconds, pilot arc current, pilot arc cycles and output current voltage.

In the initial part of the routine, depending on whether the switch has been set for stick or stud welding, a determination is made whether the thumbwheels are set within parameters, i.e. stick welding greater than 50 amps and less than 400 and stud welding greater than 50 amps and less than 2,000. If not within the parameters, an error 5 signal is generated. Additionally, the cycle thumbwheel is checked to determine if within parameters, i.e. a setting of greater than 0 and, if not, an error 6 signal is set. If there are no errors, the routine proceeds to set up the seven segment buffer which corresponds to the seven segments of the front panel light emitting diode displays, and checks to see if the enable KHz flag is set and, if so, clears the enable flag and enables the KHz interrupt and, in any event, returns to background.

In the event of the occurrence of one or more errors, the routine determines from a priority table the highest priority error. Error codes 1, 2, 3 and 7 and the associated data with the error code will be alternately displayed in the display. A flash counter is decremented to set a toggle error/data flag which is interpreted in the routine at the "display error" question point to create alternate branches (5) or (4) for the alternation of data and error respectively.

Figure 27:
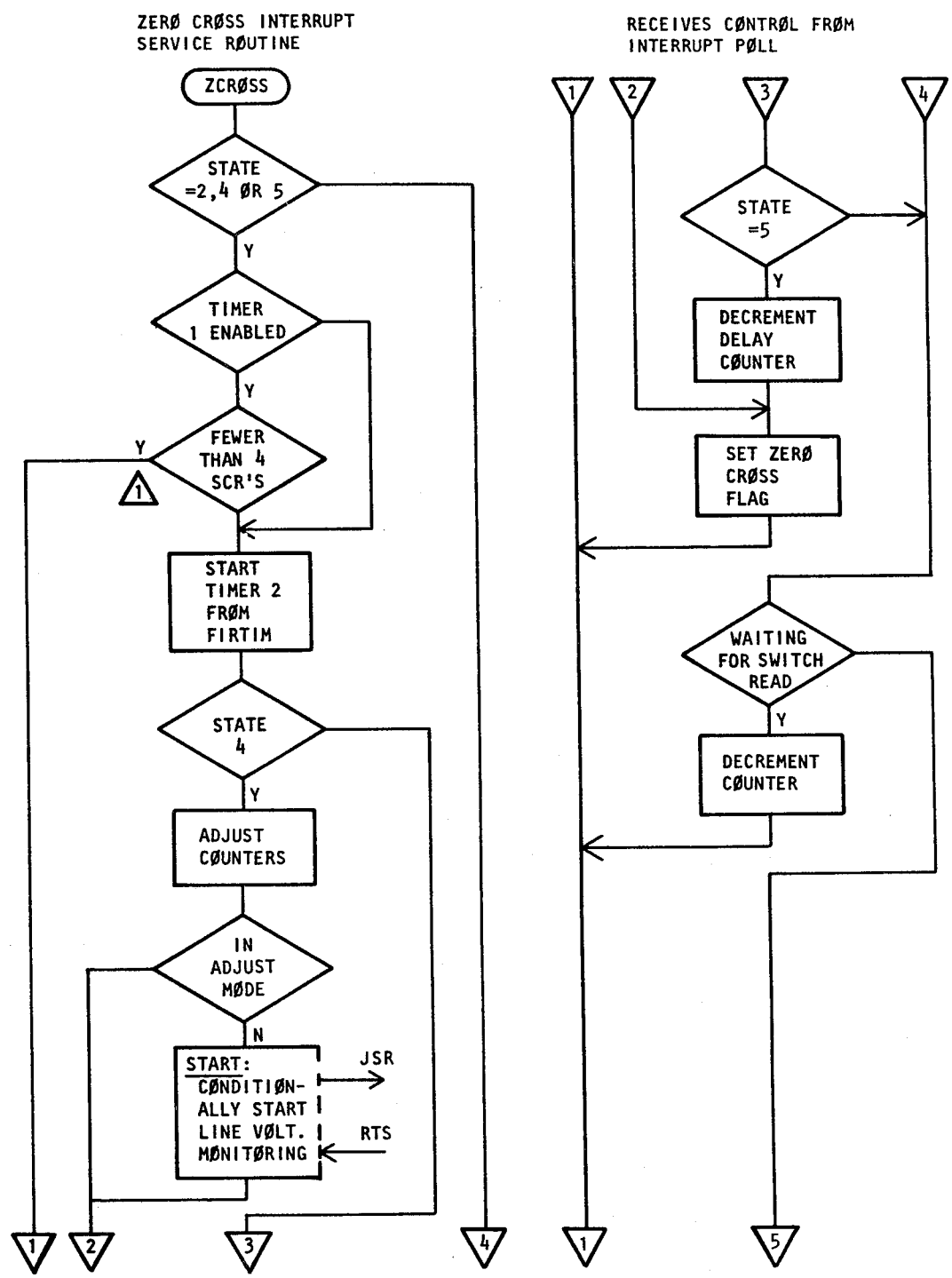
Figure 28:
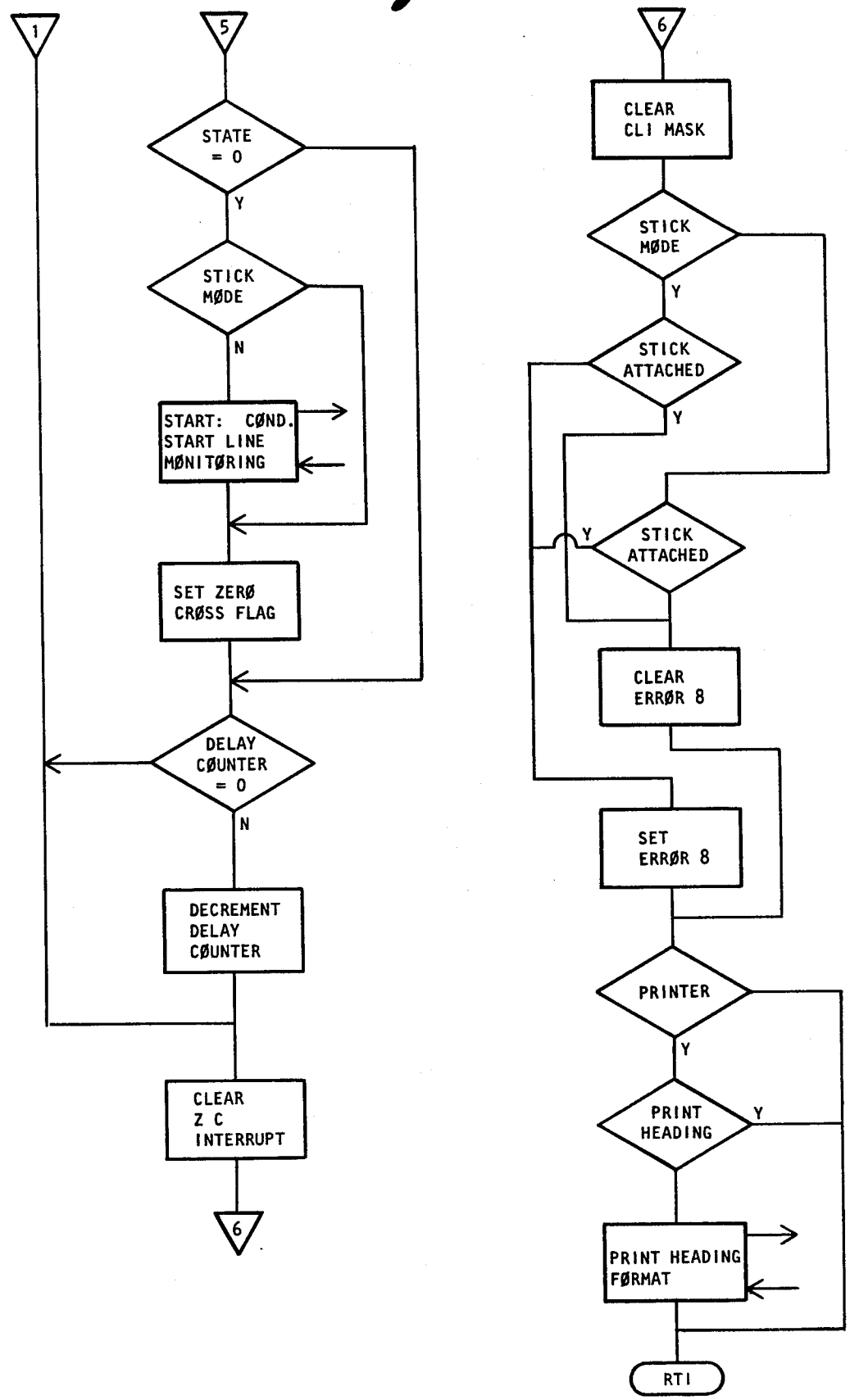

(3) Interrupts:

(a) Zero cross interrupt service routine: The zero cross interrupt service routine is shown in FIGS. 27 and 28. In summary, this interrupt routine determines whether or not the background routines are in state 2 (pilot arc state), state 4 (main weld sequence) or state 5 (hot plunge) during which current regulation, computation and measurement is to take place or in the remaining states in which no such computations, adjustments or the like takes place. Looking to FIGS. 27 and 28 and assuming that the background is in a state other than state 2, 4 or 5, the routine proceeds to the decision of "waiting for switch read" which delay is occurring in the background (start) which, if still delaying, will decrement the counter for 20 zero crosses to provide time for reading of all of the conditioned switches. If not waiting for reading of the switches, the program proceeds to determine whether the background routine is in state 0. If in state 0, the determination is made if in stick mode and, if not in stick mode which means in stud mode, then the subroutine of conditionally checking line voltage is undertaken and the zero cross flag is set. The routine checks to see if the delay counter utilized in the various states has been set to 0 and, if not, decrements that counter and in subsequent passes through the zero cross routine, will continue to decrement the delay counter until the 0 condition exists. Thereafter, the zero cross interrupt is cleared followed by clearing of the interrupt mask. The clear interrupt enables any pending interrupt from other sources to occur from this point on because none of the following events are time critical and a pending interrupt might be time critical.

The next portion of the zero cross routine continuing from point 6 is to determine a safety feature to prevent confusion of the stud cable and stick cable being reversed and placed in the wrong terminal. If such condition occurs, an error 8 flag is set; otherwise it is cleared.

The remainder of the routine deals with the printer option. If a printer option is included in the apparatus, a check is made one time to see whether the print heading is then made available in the printer buffer for access in the printer. Thereafter, other prints of the data will occur through portions of the KHz interrupt service routine.

In the zero cross routine and in the condition of a 2, 4 or 5 state (the stick routine through housekeeping has a state 4 value set for this routine purpose) and if timer 1 (to be discussed hereinafter) has not been enabled, then timer 2 will be started. Timer 2 routine, to be described hereinafter, generally starts the SCR firing and computations respecting firing adjustments to regulate current. If timer 1 is enabled, as hereinafter described, a test will be made as to whether fewer than 4 SCRs have fired indicating a spurious zero cross under such conditions. If so, the routine is essentially terminated through path 1.

Following initiation of timer 2, the zero cross routine determines whether or not a state 5 condition exists via path 3 and, if so, the state 5 counters (hot plunge) are decremented and the zero cross flag set to ultimately count out the required cycles or time for the hot plunge state 5 routine.

If the zero cross routine occurs during a state 2 condition via path 3 onto path 4, the routine will essentially proceed as heretofore described decrementing the delay counter for the pilot arc state 2 mode.

If the zero cross service routine is occurring during state 4, then the cycle counter is in the state 4 main welding sequence state and will be decremented each time the zero cross interrupt routine occurs. Additionally, the determination will be made whether or not the state 4 is in the adjustment mode which occurs in the stud welding mode. If so, the routine sets the zero cross flag and moves on out of the routine as heretofore described. If in the nonadjusting mode, meaning that the state 4 flag has been set in the stick mode, then the routine will conditionally start line voltage monitoring and pass on out of the routine in the same manner.

Figure 29:
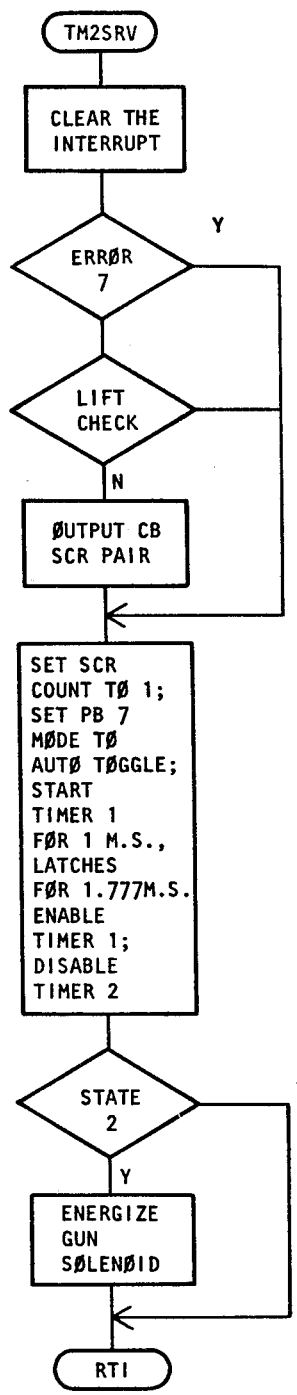

(b) Timer 2 interrupt service routine: The timer 2 interrupt service routine is shown in FIG. 29 of the drawings. It is to be recalled that timer 2 was started in the early portion of the zero cross routine and set for a predetermined time that was fetched from memory (FIRTIM). This initial setting of timer 2 at the beginning of the welding cycle is a number dependent on the ideal current desired and determining the initial base phase angle used and thereafter a value is calculated in the timer 1 routine as will be described hereinafter. Upon initiation of the timer 2 interrupt routine, upon timing out of timer 2, the routine interrupt flag is cleared and, if not in the lift check mode or an error 7 flag present, the first SCR pair is fired.

The routine initializes the SCR count to keep control of the pairs fired. Additionally, line PB7 to the 50 microsecond pulse generator is set. The versatile interface adapter (VIA) is set to the auto toggle mode for the PB7 output to the 50 microsecond pulse generator firing the SCRs. The VIA has the capability of toggling line PB7 alternately high and low for a time duration between the toggling controlled by the time set in timer 1 and the latches of timer 1. The PB7 output is toggled low for one millisecond and the timer 1 latch set for 1.777 milliseconds which totals a time period equal to the time estimated for the beginning of the next phase. This toggling action will continue throughout the remaining phases under the timer 1 interrupt service routine to be described hereinafter and in conjunction with the timing diagram of FIG. 38. Additionally, timer 1 is started and timer 2 is disabled.

At the final termination of the timer 2 interrupt service routine, the routine checks to see if the background program is in pilot arc state 2 and if so, energizes the gun solenoid lifting the stud and beginning the initiation of pilot arc.

Figure 38:
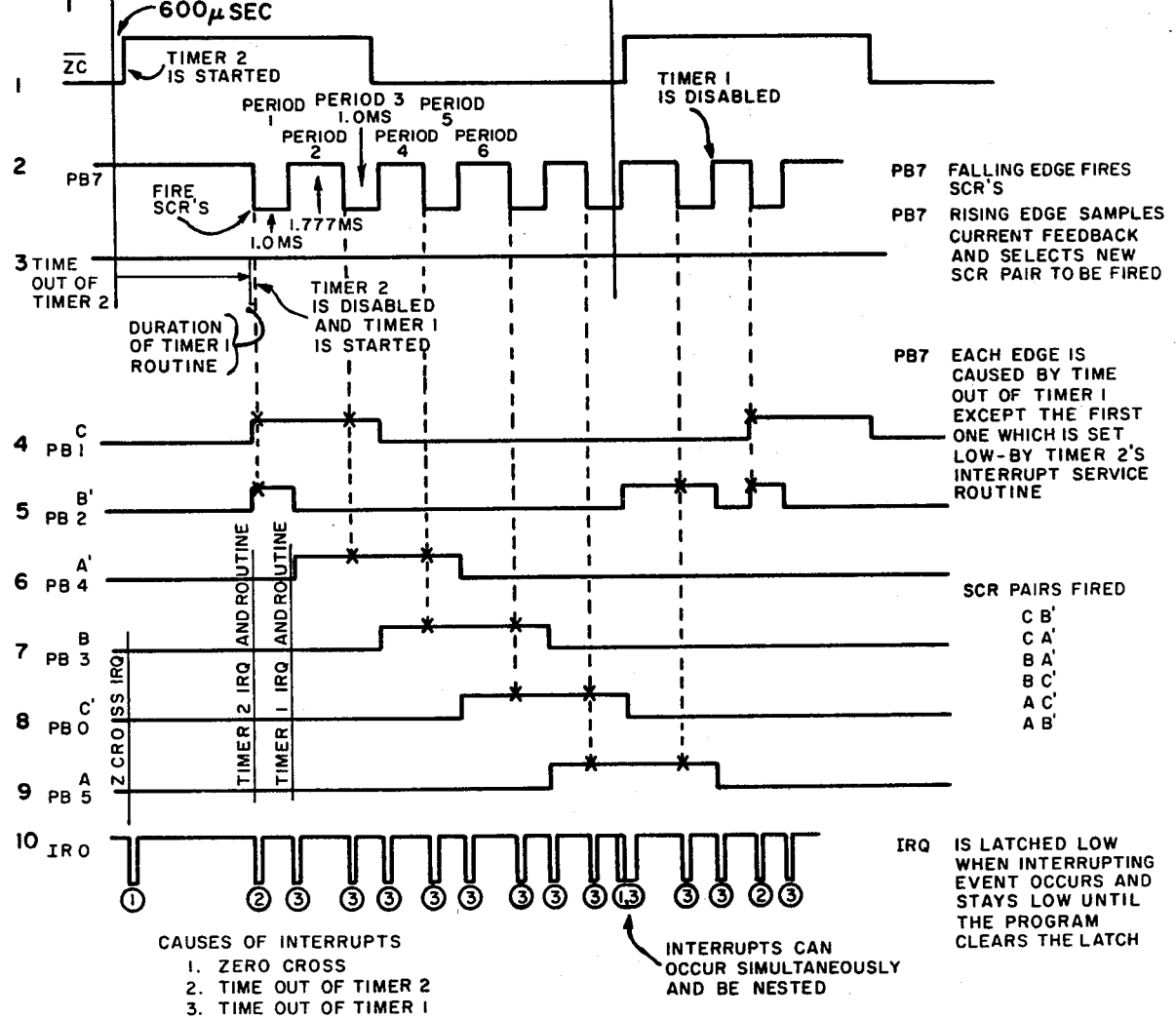
FIG. 38 is a timing diagram illustrating the relationship of the weld cycles to the phase angle firing timing and adjustments.

(c) Timer 1 interrupt service routine: Before proceeding with the flow diagrams depicting the program involved in the timer 1 interrupt service routine, reference should be made to the timing diagram of FIG. 38 which will facilitate an understanding of the flow diagrams. Referring to FIG. 38, there is illustrated at the top portion of the drawing the typical three phase wave form as seen by the SCRs in the SCR bridge.

All of the timing diagrams in FIG. 38 are referenced to the zero cross line. It is to be recalled that the zero cross interrupt service routine begins when the difference between a selected pair of phases of the three phase power supply is equal to zero. The Schmitt trigger shown in FIG. 2 of the drawings which generated the zero cross interrupt has an internal hardware delay of 600 microseconds following the true zero cross before the interrupt is generated. As discussed in the zero cross interrupt service routine, and as a part of that routine, timer 2 is conditionally started upon the occurrence of the zero cross interrupt service routine. Thus, since there is the 600 microsecond delay following true zero cross, timer 2 is started 600 microseconds from true zero cross as shown in FIG. 38. Each time a zero cross occurs, and as shown in FIG. 38, timer 2 is again conditionally restarted.

As previously discussed in the zero cross itimer 2 (FIRTIM). Timer 2 must time out for the amount set in the timer and adjusted in the timer 1 interrupt service routine before an interrupt occurs. When the interrupt occurs upon timer 2 timing out, as shown on line 3 of FIG. 38, then the timer 2 interrupt service routine begins.

The timer 2 interrupt service routine occurs within the time required to execute the instructions set forth in the timer 2 interrupt service routine shown in FIG. 29. Essentially during this interrupt service routine, and as previously discussed, the SCR output pair C-B' is chosen, the SCR count is set to 1 and line PB7 is set to low as shown on line 2 firing the SCRs for the first pair.

Additionally during the timer 2 interrupt service routine and as previously discussed, the VIA timer 1 is set to automatic toggle which will toggle automatically between high and low states each time timer 1 counts down to zero. Perhaps a note regarding the operation of the VIA is in order here. When the VIA timer 1 counts down to zero, it is automatically reloaded from the timer 1 latches, which should have previously been initialized. Also, in the PB7 toggle mode when timer 1 is loaded from any source, PB7 is automatically toggled. The typical sequence during regulation is: (a) on falling edge interrupt, reload latches for 1.777 ms.; (b) on rising edge interrupt, disable toggle mode, read timer, adjust time, write to timer, enable toggle mode and reload latches for 1.0 ms. Initially, in the timer 2 interrupt service routine, timer 1 which is toggling line PB7 is set for 1.0 milliseconds and the latch is set for 1.777 milliseconds which will be the time until the next toggle to the high state. Simultaneously, timer 1 is initiated to begin its time out and timer 2 is disabled. Upon timer 1 timing out, an interrupt signal is generated as shown on line 10 of FIG. 38 thus initiating the timer 1 interrupt service routine. At this point, the timing will have proceeded 1.0 milliseconds past the firing of the initial SCR pair and PB7 line (line 2 of FIG. 38) will be on the rising edge.

As will be described in detail hereinafter during the timer 1 interrupt service routine, the current will be sampled during the rising edge of PB7 and this value stored. During the initiation of the welding cycle as shown in FIG. 38, there will have been no prior calculations of the firing angle and timer 1 will automatically time for 1.777 milliseconds before PB7 falls firing the next SCR pair C-A' as shown on lines 4 and 6. During period 3, as shown on line 2 and which during the low state is a fixed 1.0 milliseconds, timer 1 interrupt service routine will compute the regulated base phase angle which, as described hereinafter, will be continuously recomputed utilizing the previous base angle during each 1.0 millisecond period until the next zero cross at which the last regulated base phase angle will then be the time set into timer 2 during the zero cross interrupt. Also, during regulation, any active timer will be adjusted based on the current sampled on the rising edge of PB7 associated timer 1 interrupt. In this manner the firing of the initial pair of SCRs will be readjusted based on the current conditions which had existed in the prior cycle, i.e. actual current versus ideal.

Upon the occurrence of the next rising edge of PB7 or period 4 as shown on line 2 of FIG. 38, the timer 1 interrupt service routine will sample the actual current, compare it to the ideal current and recompute the adjustment to the phase adjustment angle necessary to be placed in timer 1 to adjust the theretofore 1.777 milliseconds necessary to achieve the ideal current. The manner in which this computation is made will be explained in the discussion of the timer 1 interrupt service routine flow charts which follow.

The recomputation of the base phase angle again occurs in period 5 and the computation of the adjustment to timer 1 time occurs in period 6 and this continues on until the next zero cross. Upon the next zero cross, the zero cross interrupt service routine is commenced and the cycle is repeated until ultimately the number of cycles and/or readjusted number of cycles for the welding current is achieved and the welding current discontinued in the case of the stud welding controller being in the stud welding mode.

As will be pointed out hereinafter in the discussion of the timer 1 interrupt service routine, the foregoing descriptions of events occurring will be altered if the stud welding controller is operating in the pilot arc state if in the stud welding mode or in the stick welding mode. Essentially in the pilot arc state of the stud welding mode or stick mode, the calculations used to compute the regulated base phase angle and the phase adjustment angle use an average of a rolling 16 phases as in the case of the main welding current computations in the stud welding mode.

Figure 30:
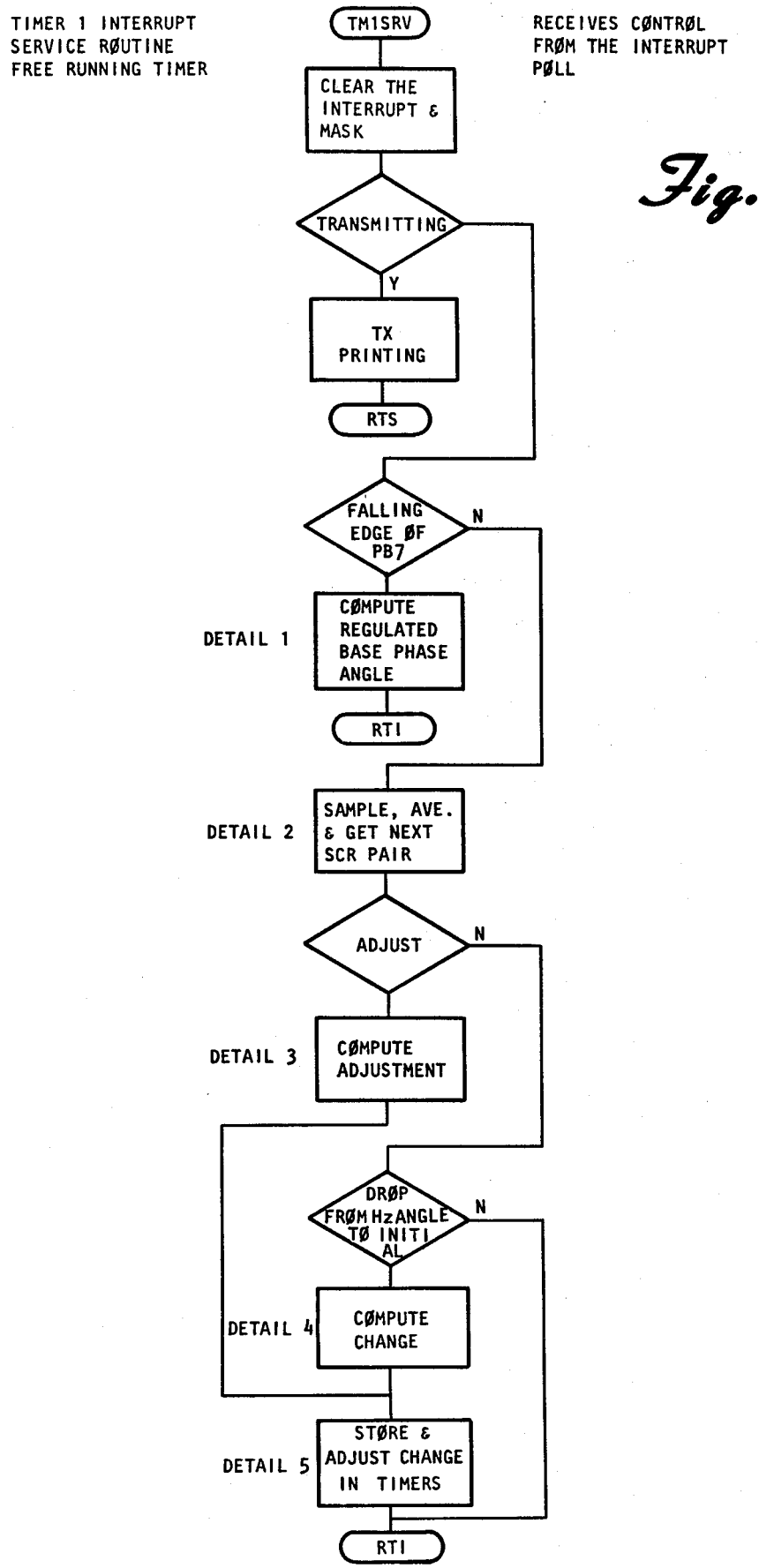

Attention will now be directed to FIG. 30 which is the broad outline of the timer 1 interrupt service routine. At the beginning of the timer 1 interrupt service routine, the interrupt mask is cleared and the decision is made as to whether or not the microprocessor system is transmitting data to the mechanical printer. If so, the routine loops until the printing is done. This occurs in the initial startup of the equipment and every 55th line thereafter, during which the printer prints an appropriate heading. If printing is not occurring, then the routine determines whether or not PB7 is rising or falling upon the occurrence of an interrupt from timer 1 which is generated upon either the rising or falling edge of PB7.

For the purposes of the description of the timer 1 interrupt service routine, it will be assumed that the interrupt is from a falling edge PB7. In this case the routine will compute the regulated base phase angle and return from the interrupt. If the timer interrupted the zero cross routine, the control will return to that routine, not background. The manner in which the regulated base phase angle is computed will be described in the description of the flow charts pertaining to detail 1 which follows hereinafter.

Assuming for purposes of explanation that the timer 1 interrupt occurs upon the rising edge of PB7, then the routine will take the current sample, compute the average of the required number of samples (2 or 16 as heretofore described) and select the next SCR pair. This occurs in the routine set forth in detail 2 in FIG. 32 which will be described in detail hereinafter.

Following the selection of the next SCR pair, etc., the decision is made whether or not an adjustment to the phase angle firing should be made. This decision will be no in the beginning of pilot arc and in stick mode until current, meaning an arc has been initiated, is sensed. The appropriate flags are set elsewhere which will control this decision. An example of such would be in the pilot arc state during the very initial few phases.

Assuming for purposes of explanation that the decision is made that adjustments are to be computed. The routine then passes to the compute adjustment routine which is set forth in detail 3 as will be described in detail 3 hereinafter. The amount of adjustment to the regulated phase angle, i.e. the time set in timer 1 is computed based upon the electrical current conditions existing in the prior phases.

Following the computation of the required adjustment, the adjustment is applied to the count read from the timer and restored in the timer so that the appropriate adjustment is made to the timing of timer 1 to adjust the timing out of timer 1 and the creation of the timer 1 interrupt on the falling edge PB7 to fire the next pair of SCRs. Detail 5 is shown in FIG. 34 and a subroutine of detail 5 is shown in FIG. 35 respecting the adjustment of the timer.

Assuming for the purposes of explanation of the timer 1 interrupt service routine that the appropriate flags are set to not require adjustment of the adjusted phase angle, then the decision is made whether an initial high angle set in the background for the pilot arc state and stick welding modes is to be maintained or dropped. The pilot arc state requires two phases to be fired and the stick mode requires sensing of a current level sufficient to indicate an arc has been initialized before the flag permitting dropping from high angle to initial angle is set thus permitting a decision at this point to be yes. If the decision is no indicating that two conditions have not been met, then the routine exits the timer 1 interrupt service routine and returns from the interrupt until the sufficient conditions have occurred for the decision to be yes to drop from the high angle to initial.

Figure 34:
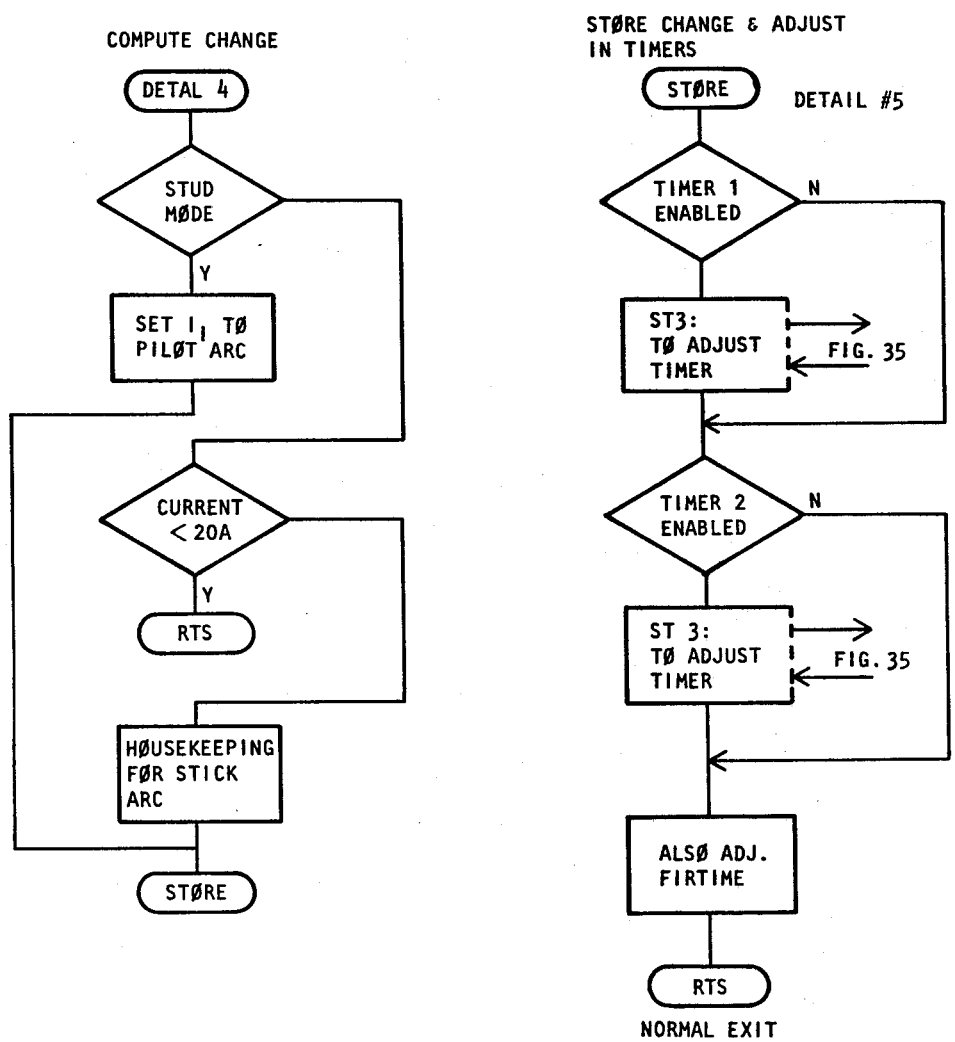
Figure 35:
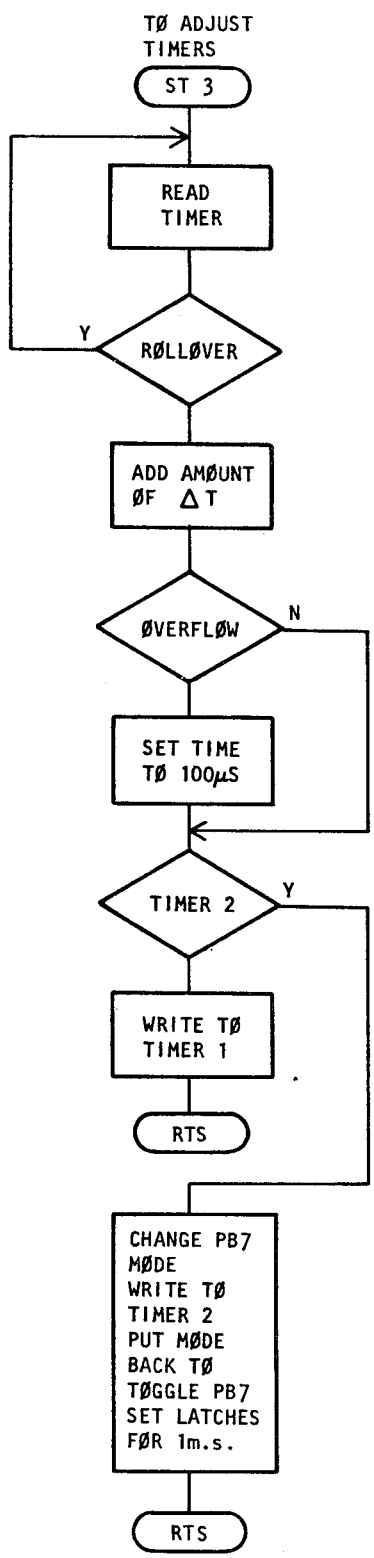

When the decision is made to drop to initial angle, then the routine enters the subroutine of compute change shown in detail 4 in FIG. 34. The routine then moves into the store and adjust change in timers routine set forth in detail 5 which will likewise be discussed hereinafter.

Turning now to detail 1 shown in FIG. 31, a discussion will now be undertaken of the subroutine for computing the regulated base phase angle. The determination is made whether the system is in the first phase of a cycle and if yes, the terminal voltage is set in RAM and thereafter ignored. The routine then passes through a series of determinations to determine an error 7 condition which is a low terminal voltage in the main welding sequence. Thereafter, the sample received flag is set and the determination made whether or not adjustments are to be made. If not, the routine essentially passes out of the routine after clearing accumulators and setting latches.

When adjustments are to be made, the routine next updates the current average accumulator with the current sample previously received and increments the counter and passes on to a determination whether the cycle counter has timed out and, if not, continues with the computations. If computations are to be made, the determination is then made whether the controller is in the stick, pilot arc or main stud welding mode. The mode determines whether or not the average is to be based on two phases or 16 phases.

The microprocessor now makes the computations for the change in base phase angle in accordance with the calculations set forth in the flow diagram, explanations to the right side thereof and as further described in the chart on calculations set forth in section V charts. Additional determinations are made whether or not the calculations are out of range and if so, boundaries on the range are set to prevent loss of control. Thereafter, the average accumulators are cleared and the timer 1 latch is set for the 1.0 millisecond timing which will be utilized in timer 1 following the timing out of timer 1 and in the period following the falling edge of PB7.

Figure 32:
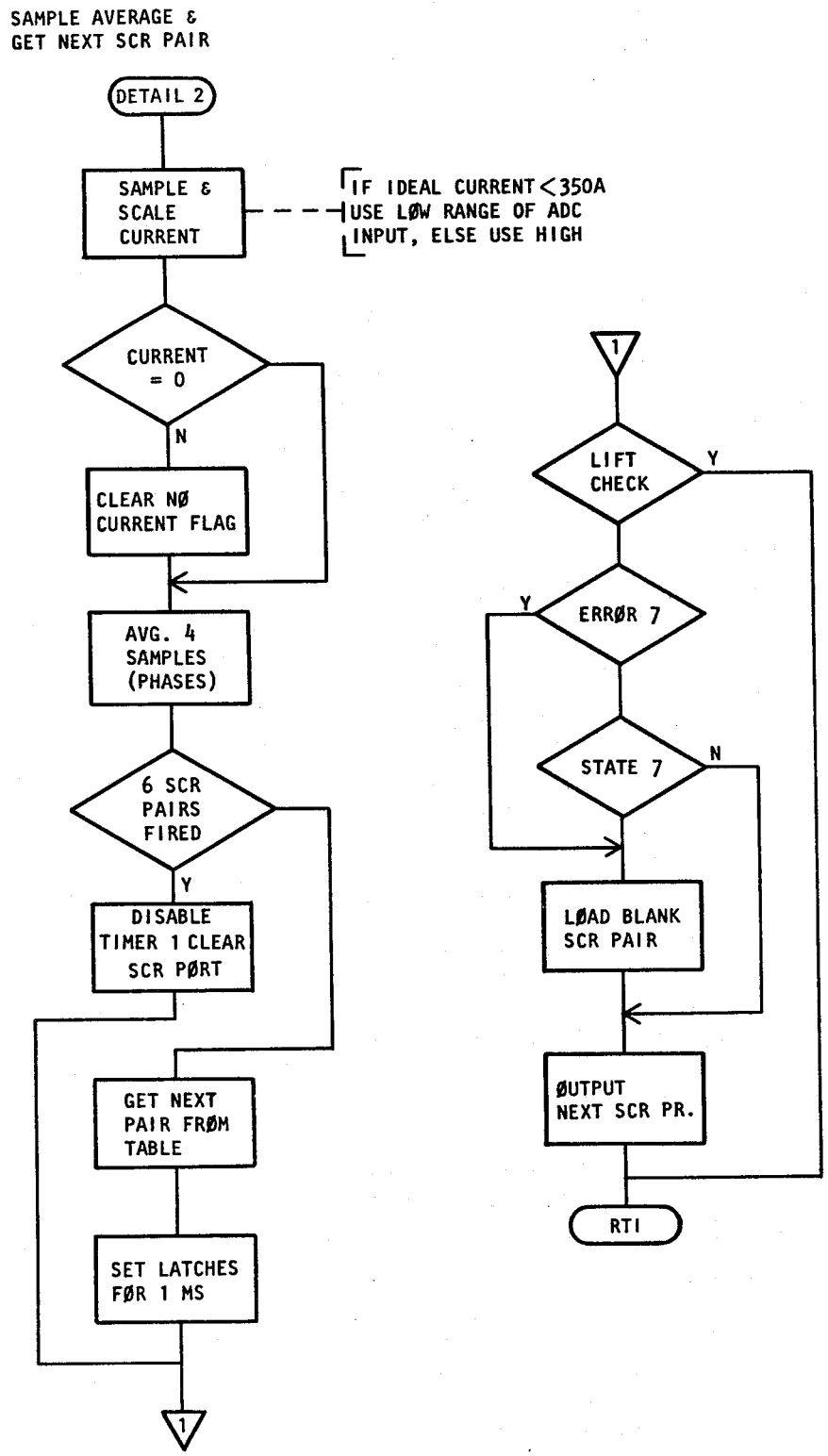

Turning now to detail 2 in FIG. 32, the current is sampled and scaled by means of the analog to digital converter and the determination made whether the current equals 0 and, if not, the no current flag is cleared. Thereafer, an average of the current samples in the four preceding phases is determined.

The decision is then made whether six pairs of SCRs have been fired which, if yes, indicates that no more SCRs should be fired in that cycle whereupon timer 1 is disabled and the SCR ports from the VIA are cleared. If less than 6 SCRs have been fired indicating that additional firings are to be done, then through the program the next pair to be chosen is identified which will follow the down edge of the PB7 pulse. Finally, the determinations are made whether in the lift check mode, state 7 or error 7 and the appropriate decision is made as shown in the flow diagram.

Figure 33:
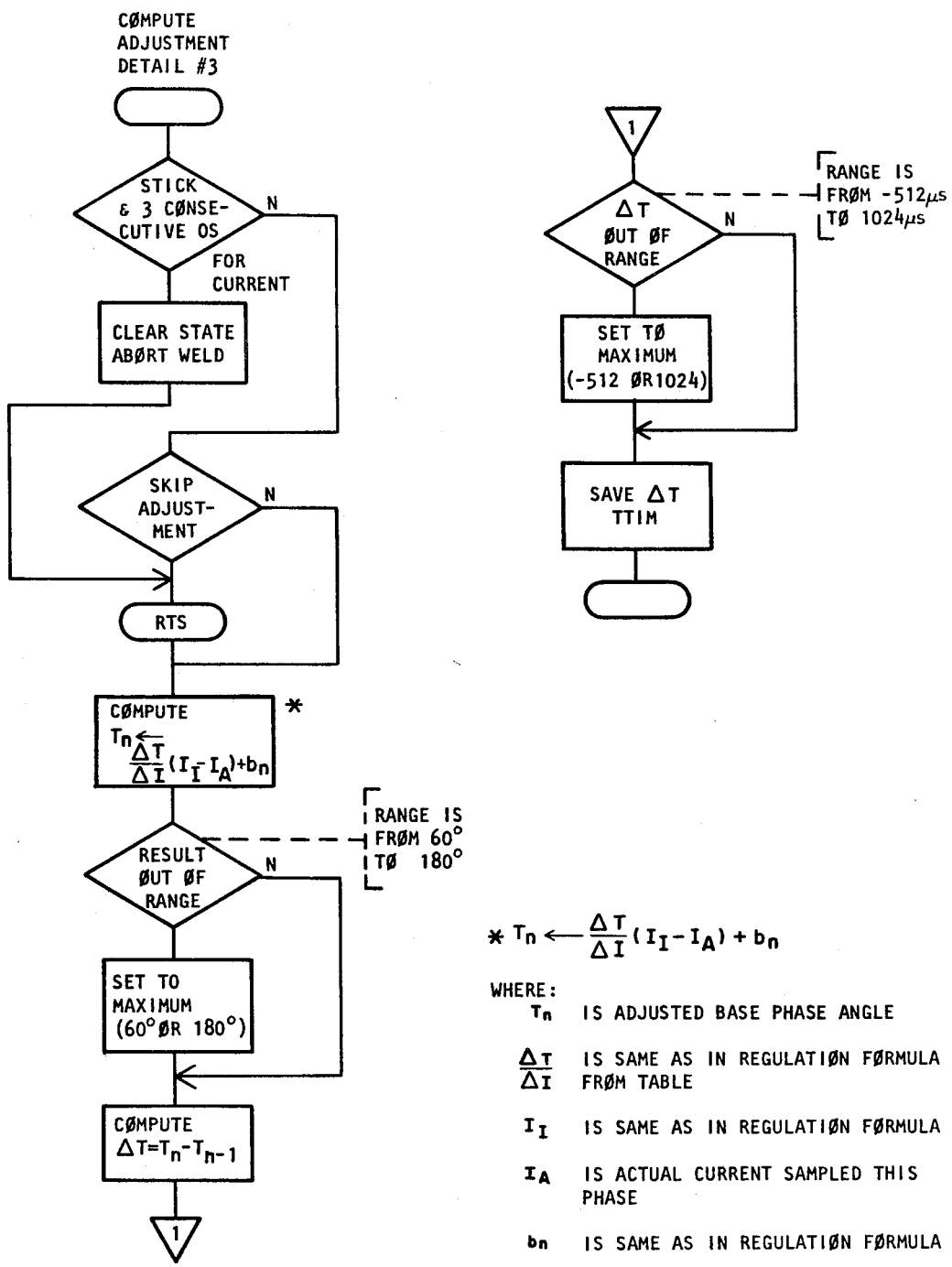

Detail 3 for computing adjustment of phase angle firing is shown in FIG. 33 of the drawings. Initially in this routine and if in the stick mode, the determination is made whether there are three consecutive 0 current readings indicating loss of arc and, if so, the state is cleared and the weld cycle aborted. If not, the decision is made whether adjustment is to be made and, if not, which would be the case of a flag set in background for the initial firing phase, then the routine is ended. If the skip adjustment flag is not set, the computations are made to adjust the adjusted phase angle in accordance with the equations and logic set forth in the flow diagram and the notes on the right-hand side thereof together with the calculations set forth in section V charts. Additionally, checks are made to whether or not the determinations or calculations are out of rage and if so, ranges are set for the phase adjustment to maintain control. The calculated result is saved at address TTIM and the subroutine returns back to the main routine as set forth in FIG. 30.

The compute change subroutine is shown in detail 4 in FIG. 34. In this routine, which is entered following a determination of whether the initial high angle is to be dropped, the decision is made whether in the stud welding mode or stick mode. This subroutine will be entered only if in the nonadjust mode and the determination was made that background was either in pilot arc or stick. Thus, if the stud mode decision is yes, then the background must be in the pilot arc stae and in that condition the pilot arc initial current $I_i$ is set in the appropriate register and the routine moved on to the store change in timers routine.

If background is in the stick mode, then the decision is made whether the current is less then 20 amps indicating an unstable or nonexistent arc. If yes, the routine is returned to background and no computations are made. If the current is greater than 20 amps in the stick mode, then the routine passes to the housekeeping for stick arc routine which resets various accumulators. Current adjustments will be provided as if in the stud welding mode.

The store and adjust change in timers routine of detail 5 is shown in FIGS. 34 and 35. Initial determination is made whether timer 1 is enabled in that it could have been disenabled under certain conditions such as the six SCR pairs having been fired. If timer 1 is enabled, then the subroutine to adjust timer is undertaken. This is shown in FIG. 35.

In the "to adjust timers" routine, the timer is first read to determine the elapsed time in the appropriate timer. Thereafter, the timer is looked to as to whether or not the timer is in the rollover condition and, if not, the amount of time computed in detail 3 is algebraically added to the timer amount. A check is made to see whether the recomputed time has exceeded the maximum and if so, the arbitrary 100 microseconds time is placed into the timer to immediately terminate the timing providing a falling edge of PB7. If not in overflow, then the actual computed time, after checking whether timer 2 is being adjusted, is written to timer 1 to control the time of firing the next SCRs which occurs on the falling edge of PB7 upon timing out of timer 1.

If this routine was called for the purpose of adjusting timer 2, then the logic is to change the mode of PB7, write to timer 2 the appropriate adjusted time, put the PB7 mode back to automatic toggling of PB7 and set the latches for 1 millisecond.

Returning back to FIG. 34, if timer 2 is enabled, then the previously described routine will occur to change timer 2, etc. If timer 2 is not enabled, then the "to adjust timer" routine is not passed through.

Following the accomplishment of the logic determining whether or not timer 1 is written to, and in any event, the base phase firing angle time (FIRTIM) is adjusted based upon the calculations which were done under detail 1. This is so that the base phase angle firing time is always available to the zero cross routine. Thereafter, the routine returns to the main routine shown in FIG. 30 which essentially is a return from interrupt.

Figure 36:
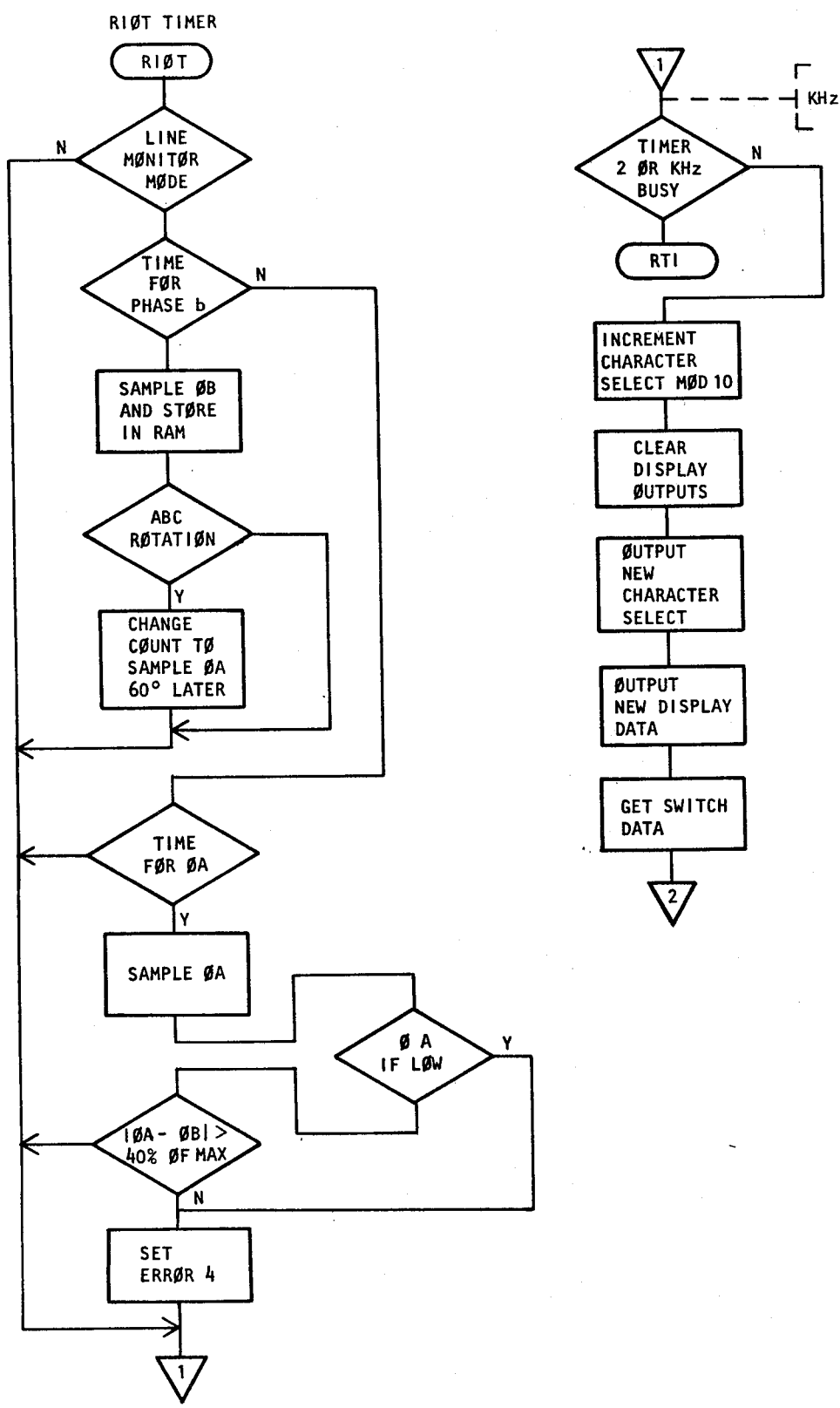
Figure 37:
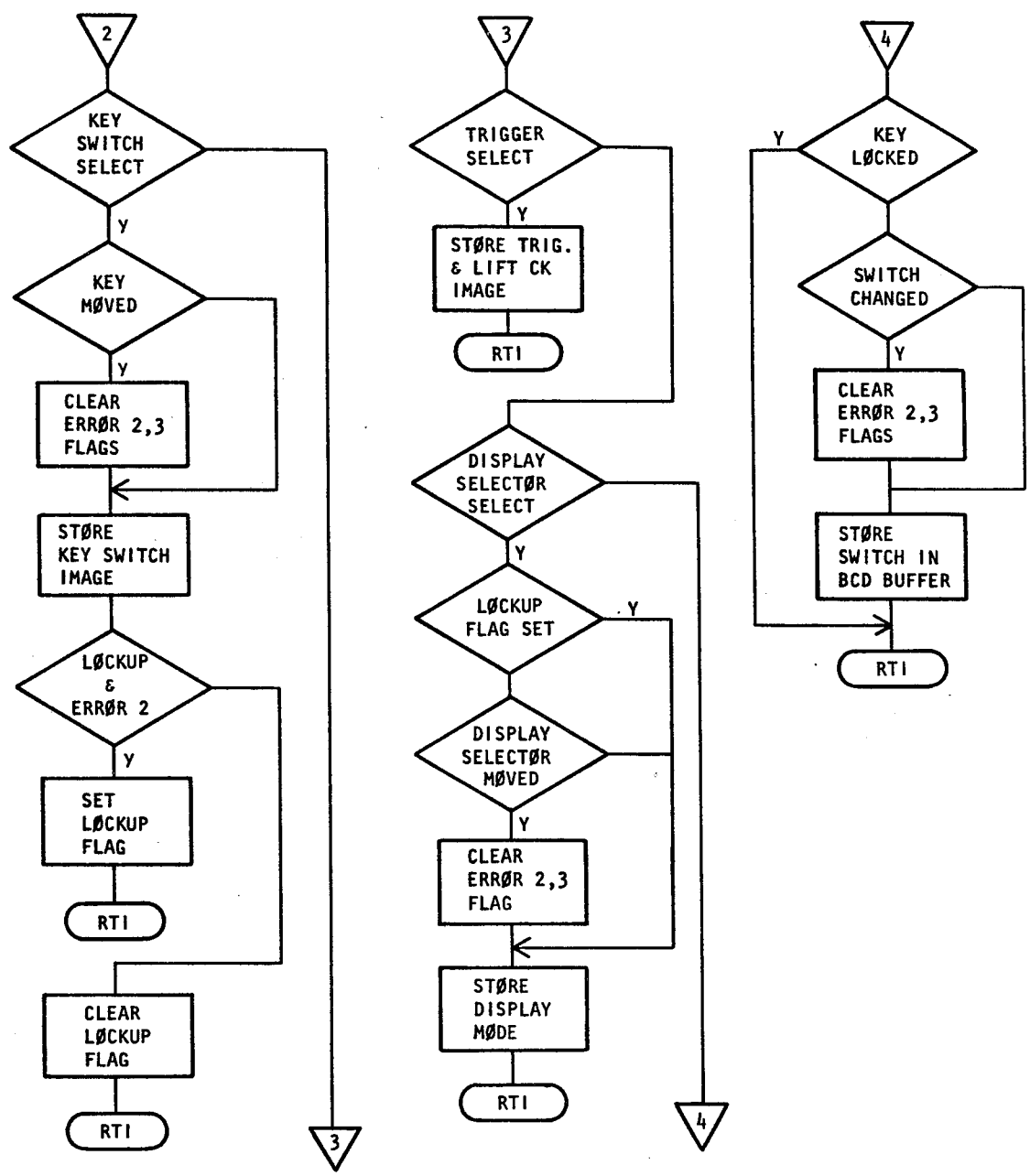

(d) RIOT timer interrupt service routine: The RIOT timer interrupt service routine is shown in FIGS. 36 and 37 of the drawings. That portion of the flow diagram shown on the left-hand side of FIG. 36 essentially determines a missing phase and creates an error 4 signal. In the reset routine in FIG. 16, an initial delay of 150° was set from zero cross to check a peak voltage occurring on a reference input to determine A, B, C or A, C, B rotation. The routine waits for the time to sample the B phase and then looks to RAM for a flag set for determination of whether A, B, C or A, C, B rotation. If A, C, B rotation, then the routine passes out and waits for the time for checking of a phase. On the other hand, if rotation was A, B, C, then the delay is changed to sample 60° later. The 150° delay in FIG. 16 pertains to determining of rotation only and occurs one time. The line voltage monitoring is done periodically once per minute in idle mode. The timing for line voltage monitoring is only indirectly related to rotation determination timing. This manipulation is simply made to set the sampling period that will be later used to sample phase "A" upon the occurrence of the time to sample phase "A".

Upon the occurrence of the time to sample phase "A", the comparison is first made if phase "A" is low and, if so, an error 4 code set. If phase "A" is not low, then a comparison is made between phase "A" and phase "B", which values have both been stored in RAM previously, to determine if they are within 40%. The interreaction of the three phases, one to another, will indicate the loss of either the "B" or "C" phase resulting in the differential between "A" and "B" phases being in excess of 40%. Upon this occurrence, an error 4 signal is set. If an error is indicated, then the testing frequency is increased to a higher rate. If no error is detected, then the error 4 is cleared.

Moving to the right-hand portion of FIGS. 36 and 37, the KHz routine broadly accomplishes the functions of reading all of the status switches and thumbwheels and provides the display refresh as well as the display select and the trigger switch logic. It is believed that the routines for servicing the switches, providing displays, etc., are sufficiently set forth in the flow charts of FIGS. 36 and 37 and need not be explained further.

IV. Assembled Program

Set forth immediately hereinafter is a copy of the assembled program in the assembly language for the Motorola 6802 microprocessor which carries out the logic functions of the flow charts heretofore described.

```
00001                    NAM     KSM16
00002                    Copywright 1981 Omark Industries, Inc., Portland, Oregon
00003                    *
00004                    *                All rights reserved
00005                    *
00006                           TTL     20 FEB 81
00007                    *  INCLUDES TRANSMIT TO PRINTER ROUTINE
00008                    *
00009                    *
00010                    *  PRIMARY FILE:   DISK 'KSM1'
```

```
00011                      * BACKUP FILE:    DISK 'RACIMEC'
00012                      *
00013A 0000                          ORG    $0000
00014A 0000    0001   A ERRO7   RMB    1        ;
00015A 0001    0001   A ERRO4   RMB    1        ;
00016A 0002    0001   A ERRO1   RMB    1        ; ERROR
00017A 0003    0001   A ERRO8   RMB    1        ; FLAGS
00018A 0004    0001   A ERRO2   RMB    1        ;
00019A 0005    0001   A ERRO5   RMB    1        ;
00020A 0006    0001   A ERRO6   RMB    1        ;
00021A 0007    0001   A ERRO3   RMB    1        ;
00022A 0008    0001   A STICK   RMB    1        STICK MODE = FF
00023A 0009    0001   A TRIGGR  RMB    1        TRIGGER CLOSED = FF
00024A 000A    0001   A STATE   RMB    1        MACHINE STATE
00025A 000B    0001   A LOCKUP  RMB    1        ERRO2 LOCKUP = FF
00026A 000C    0001   A DLYCTO  RMB    1        DELAY COUNTER (Z.C.)
00027A 000D    0001   A LFCHK   RMB    1        LIFT CHECK = FF
00028A 000E    0001   A TWCURB  RMB    1        DIALED CURRENT (BIN)
00029A 000F    0002   A TFT     RMB    2        BASE PHASE ANGLE FOR
00030                      * ADJUSTMENT ROUTINE, COMPUTED IN REGULATION ROU
00031A 0011    0001   A ZCFLAG  RMB    1        ZERO CROSS FLAG = FF
00032A 0012    0001   A TARTIM  RMB    1        TARGET TIME
00033A 0013    0001   A CYCLES  RMB    1        FIRED CYCLES
00034A 0014    0002   A TOTWC   RMB    2        TOTAL WELD ARC (RAW)
00035A 0016    0002   A TOTTV   RMB    2        TOTAL TERM VOLT (RAW)
00036A 0018    0001   A CURRNT  RMB    1        WELD CURRENT THIS CYCLE
00037A 0019    0004   A PROD    RMB    4        PRODUCT FOR MULTIPLY
00038A 001D    0004   A MPCAND  RMB    4        MULTIPLICAND
00039A 0021    0003   A QUO     RMB    3        QUOTIENT FOR DIVIDE
00040A 0024    0004   A DVND    RMB    4        DIVIDEND
00041A 0028    0001   A DVSR    RMB    1        DIVISOR
00042A 0029    0001   A DSPL    RMB    1        DISPLACEMENT
00043A 002A    0002   A FIRTIM  RMB    2        DELAY TIME IN USECS
00044A 002C    0002   A TEMPO   RMB    2        WORK AREA 0
00045A 002E    0001   A TEMP1   RMB    1        WORK AREA 1
00046A 002F    0002   A MPCN16  RMB    2        16-BIT MPY MPCAND
00047A 0031    0002   A MPYR16  RMB    2        16-BIT MPY MPYER
00048A 0033    0002   A AVEWC   RMB    2        AVERAGE WC
00049A 0035    0001   A AVETV   RMB    1        AVERAGE TV
00050A 0036    0002   A ENERGY  RMB    2        TOTAL ENERGY
00051A 0038    0001   A FREQ    RMB    1        LINE FREQUENCY (50 OR 60)
00052A 0039    0002   A IDENRG  RMB    2        IDEAL ENERGY
00053A 003B    0001   A TWCYCD  RMB    1        DIALED CYCLES (BIN)
00054A 003C    0001   A CYCPLS  RMB    1        CYCLES INCREASED = FF
00055A 003D    0001   A PAREAD  RMB    1        INTERPRET SWITCHES AS PA.
00056A 003E    0001   A SWREAD  RMB    1        RESTART DELAY COUNTER
00057A 003F    0001   A RIOTMD  RMB    1        RIOT MODE-PEAK = FF
00058A 0040    0001   A HAMRCT  RMB    1        HAMMER DOWN CTR
00059A 0041    0002   A TWTIMD  RMB    2        CYCLE TIME ON DIAL (BCD)
00060A 0043    0002   A TWCURD  RMB    2        CURRENT ON DIAL (BCD)
00061A 0045    0001   A PRIERR  RMB    1        HIGHEST PRIORITY ERROR
00062A 0046    0002   A DSPBUF  RMB    2        DISP BUFFER (BCD)
00063A 0048    0001   A FLSHCT  RMB    1        FLASH COUNTER
00064A 0049    0001   A FLSHFL  RMB    1        DISP ERROR = FF
00065A 004A    0004   A SEGBUF  RMB    4        SEVEN-SEG BUFFER
00066A 004E    0001   A DSPMOD  RMB    1        DISPLAY MODE
00067                      *    01 = WELD CURRENT
00068                      *    02 = TERMINAL VOLTAGE
00069                      *    03 = TOTAL ENERGY
00070                      *    04 = TIME
00071A 004F    0001   A PHASE   RMB    1        LV PHASE (A = FF, B = 0)
00072A 0050    0001   A PHSEA   RMB    1        PHASE A VOLTAGE (RAW)
00073A 0051    0001   A CHRSEL  RMB    1        CHAR SEL (TW, DISP)
00074A 0052    0001   A KEYSW   RMB    1        KEY SWITCH
00075A 0053    0001   A SCR     RMB    1        SCR PAIR #
00076A 0054    0001   A TMOUT   RMB    1        TIMER 1 TIMEOUT CTR
00077A 0055    0001   A AVECTR  RMB    1        COUNTS AVERAGES IN STICK
00078A 0056    0002   A ITOTAV  RMB    2        ACC. FOR AVGS. IN STICK
00079A 0058    0002   A VTOTAV  RMB    2        ACC. FOR AVGS. IN STICK
00080A 005A    0001   A TEMP2   RMB    1        TEMP WORK SPACE 2
00081A 005B    0001   A GTFLAG  RMB    1        ACT > IDEAL ENERGY=FF
00082A 005C    0001   A DRAIMG  RMB    1        RAM IMAGE OF VIADRA
```

```
00083A 005D    0001  A ROTAT  RMB  1       ROTATION A-B-C = FF
00084                 *                    A-C-B = 00
00085A 005E    0001  A TADJ   RMB  1       FLAG FOR SIGN DURING
00086                 *                    ADJUST ROOUTINE
00087A 005F    0001  A ADJ    RMB  1       ADJUST-ENABLE
00088A 0060    0001  A IDEAL  RMB  1       IDEAL CURRENT
00089A 0061    0001  A OAVETV RMB  1       AVETV DURING OPEN
00090A 0062    0001  A DELTAT RMB  1       GAIN FOR CURRENT LEVEL
00091A 0063    0001  A GOTSMP RMB  1       GOT SAMPLE (3RD TIMER)
00092A 0064    0001  A VOLT   RMB  1       VOLTS SAMPLED
00093A 0065    0002  A TTIM   RMB  2       T SUB N MINUS 1
00094A 0067    0002  A TEMP3  RMB  2       TIMER 1 SCRATCH
00095A 0069    0002  A TEMP4  RMB  2       STATE TABLE & TX FORMAT
00096                 * AND COMDLT SCRATCH (ALL BACKGROUND TASKS)
00097A 006B    0001  A ENABLE RMB  1       ENABLE-KHZ FLAG
00098A 006C    0001  A SKPADJ RMB  1       FLAG TO SKIP ADJUSTING NEX
00099A 006D    0001  A T1BUSY RMB  1       FLAG TO INDICATE TIMER 1 B
00100A 006E    0002  A REGAVE RMB  2       ACCUM. CURRENT FOR AVERAGE
00101A 0070    0001  A REG    RMB  1       ACTUAL CURR FROM ADC(SCALE
00102A 0071    0001  A REGCNT RMB  1       CNT OF SAMPLES FOR AVERAGE
00103A 0072    0001  A FACTOR RMB  1       FACTOR FOR 8X8 MULT ROUTIN
00104A 0073    0001  A NOCUR  RMB  1       COUNTS CONSECUTIVE O
00105                 * CURRENT SAMPLES FOR OPEN IN STICK MODE.
00106A 0074    0002  A TEE    RMB  2       STORES DELTA PHASE ANGLE
00107A 0076    0001  A RBUSY  RMB  1       BUSY FLAG SO KHZ NOT REENT
00108A 0077    0001  A PACURB RMB  1       LIKE TWCURB; FOR PILOT ARC
00109A 0078    0001  A PACYCB RMB  1       LIKE TWCYCB; FOR PILOT ARC
00110A 0079    0002  A TTFT   RMB  2       TEMP TFT DURING PILOT ARC
00111A 007B    0001  A TDELT  RMB  1       TEMP DELTAT DURING PILOT A
00112A 007C    0001  A ADDCYC RMB  1       COUNT OF CYCLES ADDED
00113A 007D    0002  A LMCTR  RMB  2       COUNT OF TIMER INTERRUPTS
00114A 007F    0001  A TXFLAG RMB  1       TX SEQUENCER FLAG
00115                 * FOR LINE VOLTAGE MONITORING
00116A 0100           ORG   $0100
00117          0100  A CABLK  EQU  *       BLOCK FOR CURRENT AVERAGES
00118A 0100    0002  A CACCUM RMB  2       ACCUMULATION FOR CURRENT A
00119A 0102    0001  A CACNT  RMB  1       COUNTER FOR CURRENT AVERAG
00120A 0103    0002  A TXPTR  RMB  2       BUFFER POINTER
00121A 0105    0028  A TXBUF  RMB  40      ASCII BUFFER
00122A 012D    0001  A PGFMT  RMB  1       PAGE FORMAT FLAG
00123A 012E    0001  A POWDWN RMB  1       POWER DOWN FLAG
00124A 012F    0001  A TPACBI RMB  1       TEMP OFFSET PA CUR BINARY
00125A 0130    0001  A TTWCBI RMB  1       TEMP OFFSET TW CUR BINARY
00126A 0131    0001  A OIDEAL RMB  1       ORIGINAL IDEAL CURRENT
00127A 0132    0002  A CSTIM  RMB  2       CHUCK SAVER ACTIVE TIME
00128A 0134    0001  A CHAR   RMB  1       PRESENT CHARACTER BEING TX
00129A 0135    0001  A EPROMP RMB  1       PRINTER EPROM THERE FLAG
00130                 *
00131                 *
00132          017F  A STACK  EQU  $17F    INITIAL VALUE FOR STACK PT
00133          0052  A DDRA   EQU  $52     VIA DDRA SETUP
00134          00FF  A DDRB   EQU  $FF     VIA DDRB SETUP
00135          00F0  A DDRC   EQU  $F0     RIOT DDRA SET UP
00136          00FF  A DDRD   EQU  $FF     RIOT DDRB SET UP
00137          00FD  A GS     EQU  %11111101 MASK TO TURN ON GS
00138          0004  A CS     EQU  %00000100 CHUCK SAVER
00139          0008  A PAIN   EQU  %00001000 PILOT ARC SENSE
00140                 *
00141                 *  ADC CHANNEL  SCALE(FF=)      FUNCTION
00142                 *       0       512 VOLTS     A-B LINE VOLTAGE
00143                 *       1       512 VOLTS     C-B LINE VOLTAGE
00144                 *       2       2040 AMPS STUD WELD CURRENT SENSE
00145                 *               434 AMPS STICK
00146                 *       3       212 VOLTS     TERMINAL VOLTAGE
00147                 *       4       100 VOLTS     PILOT ARC
00148                 *       5       UNUSED
00149                 *       6       UNUSED
00150                 *       7       UNUSED
00151          0066  A VSCALE EQU  102     VOLTAGE SCALING FACTOR
00152          0007  A KEYPAS EQU  7       KEY SELECT #
00153          0008  A TRGPAS EQU  8       TRIGGER SELECT #
00154          0009  A SELPAS EQU  9       DISP SELECTOR SELECT #
```

```
00155           0001  A KEYA   EQU    1          KEY BIT A
00156           0002  A KEYB   EQU    2          KEY BIT B
00157           0004  A PASEL  EQU    4          READ PA. SWITCH
00158           0008  A STKSW  EQU    8          STICK/STUD SW
00159           0001  A TRIG   EQU    1          TRIGGER BIT
00160           0002  A LFCKSW EQU    2          LIFT CHECK SW BIT
00161                 *
00162                 *    I/O ADDRESS EQUATES
00163                 *
00164           0080  A RIODRA EQU    $80        RIOT DATA REG A
00165           0081  A DDRAR  EQU    $81        RIOT DATA DIR REG A
00166           0082  A RIODRB EQU    $82        RIOT DATA REG B
00167           0083  A DDRBR  EQU    $83        RIOT DATA DIR REG B
00168           0085  A RIOIFR EQU    $85        RIOT INTR FLAG REG
00169           008C  A RIOTIM EQU    $8C        RIOT TIMER REG (READ)
00170           0095  A RIOTD  EQU    $95        DISABLE RIOT TIME INTR
00171           009D  A RIOT8I EQU    $9D        RIOT DIV-BY 8 REG
00172                 *                          INTR ENABLED
00173           009E  A RIO64I EQU    $9E        RIOT DIV-BY 64 REG
00174           00A0  A VIADRA EQU    $A0        VIA DATA REG A
00175           00A1  A VIADRB EQU    $A1        VIA DATA REG B
00176           00A2  A DDRAV  EQU    $A2        VIA DDRA
00177           00A3  A DDRBV  EQU    $A3        VIA DDRB
00178           00A4  A TM1CNT EQU    $A4        TIMER 1 COUNTER REG
00179           00A6  A TIMER1 EQU    $A6        TIMER 1 LATCHES
00180           00A8  A TIMER2 EQU    $A8        TIMER 2 LOAD ADR
00181           00AA  A VIAACR EQU    $AA        VIA AUX CONTROL REG
00182           00AC  A VIAIFR EQU    $AC        VIA INTR FLAG REG
00183           00AD  A VIAPCR EQU    $AD        VIA PERIPHAL CONTROL REG
00184           00AF  A VIAIER EQU    $AF        VIA INTR ENABLE REG
00185           00B0  A LVAAD  EQU    $B0        OA VOLT A/D START
00186           00B1  A LVBAD  EQU    $B1        OB VOLT A/D START
00187           00B3  A TVAD   EQU    $B3        TERM VOLTAGE A/D START
00188           00B2  A WCSKAD EQU    $B2        WC A/D START (STICK)
00189           00B2  A WCSDAD EQU    WCSKAD     WC A/D START (STICK)
00190           00B4  A PAINP  EQU    $B4        PA INPUT CHANNEL
00191                 *
00192                 *
00193A 9000                     ORG    $9000
00194A 9000     0001  A CHKSUM PMB    1
00195A 9001     20    A         FCC    125,
00196A 9002 8E 017F   A RESTRT LDS    #STACK
00197A 9081 7F 0000   A         CLR    ERR07      CLEAR ERR 7 FLAG
00198A 9084 CE 0001   A SLFTST LDX    #1         DON'T CHANGE 'ERR07'
00199                 *                          TEST $000 RAM
00200A 9087 86 7F     A RAMTST LDAA   #127       127 BYTES/BLOCK
00201A 9089 C6 55     A RAMTSO LDAB   #$55       TEST BITS 0,2,4,6
00202A 908B E7 00     A         STAB   X          STORE TEST PATTERN
00203A 908D E1 00     A         CMPB   X          STORED?
00204A 908F 26 4E 90DF A        BNE    STERR      NO, ERROR
00205A 9091 58                  ASLB              YES, TEST OTHER BITS
00206A 9092 E7 00     A         STAB   X
00207A 9094 E1 00     A         CMPB   X          PATTERN WRITTEN?
00208A 9096 26 47 90DF          BNE    STERR      NO, ERROR
00209A 9098 08                  INX               YES NEXT BYTE
00210A 9099 4A                  DECA              DONE?
00211A 909A 26 ED 9089          BNE    RAMTSO     NO, GO AGAIN
00212A 909C 8C 0080  A          CPX    #$0080     TO
00213A 909F 26 07 90A8          BNE    ROMTST     TEST
00214A 90A1 CE 0100  A          LDX    #$0100     RAM ON
00215A 90A4 86 80               LDAA   #$80
00216A 90A6 20 E1 9089          BRA    RAMTSO     RIOT
00217                 * START ADR OF PGM
00218A 90A8 BD 9EE9  A ROMTST JSR    TSTPRT     INCLUDE PRINTER EPROM
00219A 90AB CE 9000  A         LDX    #CHKSUM
00220A 90AE 4D                 TSTA
00221A 90AF 26 03 90B4         BNE    NOPRT      IN TEST, IF THERE
00222A 90B1 CE 8800  A         LDX    #PRTFMT
00223A 90B4 4F        NOPRT   CLRA
00224A 90B5 A8 00    A ROMTSO EORA   X          COMPUTE LRC
00225A 90B7 08                 INX
```

```
00226A 90B8 8C A000  A           CPX     #$A000    END OF PGM
00227A 90BB 26 F8 90B5           BNE     ROMTSO    NO, NEXT BYTE
00228A 90BD 4D                   TSTA              YES, TEST CHECKSUM
00229A 90BE 26 1F 90DF           BNE     STERR     ELSE, SET ERRO7
00230A 90C0 CE 03E8  A           LDX     #1000     TEST TIMER 2
00231A 90C3 DF A8    A           STX     TIMER2    LOAD W/ 1MS DELAY
00232A 90C5 DF A8    A           STX     TIMER2
00233A 90C7 C6 20    A           LDAB    #$20      TIMER 2 IFR BIT
00234A 90C9 BD 9DD3  A           JSR     TIMTST    TEST TIMER
00235A 90CC D7 AC    A           STAB    VIAIFR    CLEAR IFR BIT
00236A 90CE 4D                   TSTA
00237A 90CF 26 0E 90DF           BNE     STERR
00238A 90D1 DF A6    A TM1TST    STX     TIMER1    LOAD LATCHES
00239A 90D3 DF A4    A           STX     TM1CNT    THEN LOAD TIMER
00240A 90D5 C6 40    A           LDAB    #$40      TIMER 1 IFR BIT
00241A 90D7 BD 9DD3  A           JSR     TIMTST    TEST TIMER 1
00242A 90DA D7 AC    A           STAB    VIAIFR    CLEAR IFR BIT
00243A 90DC 4D                   TSTA
00244A 90DD 27 04 90E3           BEQ     RST1
00245A 90DF 86 FF    A STERR     LDAA    #$FF
00246A 90E1 97 00    A           STAA    ERRO7
00247A 90E3 CE 0001  A RST1      LDX     #1
00248                          * CLEAR ALL OF $00 RAM
00249A 90E6 6F 00    A RAMCLR    CLR     X         EXCEPT ERROR 7 FLAG
00250A 90E8 08                   INX
00251A 90E9 8C 0080  A           CPX     #RIODRA
00252A 90EC 26 03 90F1           BNE     NRL
00253A 90EE CE 0100  A           LDX     #CABLK    ALSO CLEAR VIA
00254A 90F1 BC 0136  A NRL       CPX     #EPROMP+1 RAM ON POWER ON
00255A 90F4 26 F0 90E6           BNE     RAMCLR
00256                            *
00257A 90F6 BD 9EE9  A           JSR     TSTPRT
00258A 90F9 86 40    A           LDAA    #$40      SET UP OUTPUTS
00259A 90FB 97 A0    A           STAA    VIADRA
00260A 90FD 86 52    A           LDAA    #DDRA     THEN DATA
00261A 90FF 97 A2    A           STAA    DDRAV     DIRECTION
00262A 9101 86 FF    A           LDAA    #DDRB     GET DDRB MASK
00263A 9103 97 A3    A           STAA    DDRBV     SET UP DDRB(VIA)
00264A 9105 86 F0    A           LDAA    #DDRC     GET DDRA MASK
00265A 9107 97 81    A           STAA    DDRAR     SET UP DDRA(RIOT)
00266A 9109 86 FF    A           LDAA    #DDRD     GET DDRB MASK
00267A 910B 97 83    A           STAA    DDRBR     SET UP DDRB(RIOT)
00268A 910D 86 E7    A           LDAA    #$E7
00269A 910F 97 AD    A           STAA    VIAPCR    CA1, CA2 POS EDGE
00270A 9111 86 C0    A           LDAA    #$C0
00271A 9113 97 AA    A           STAA    VIAACR
00272A 9115 96 A0    A           LDAA    VIADRA    GET DIP SWITCHES
00273A 9117 97 5C    A           STAA    DRAIMG
00274A 9119 C6 3C    A           LDAB    #60       SET UP
00275A 911B 85 20    A           BITA    #$20      LINE FREQUENCY
00276A 911D 27 02 9121           BEQ     FREQST    PA7 LOW IS 60HZ
00277A 911F C6 32    A           LDAB    #50
00278A 9121 D7 38    A FREQST    STAB    FREQ      STORE FREQUENCY
00279A 9123 86 81    A           LDAA    #$81
00280A 9125 97 AF    A           STAA    VIAIER
00281A 9127 86 AD    A           LDAA    #173      SET RIOT TO
00282A 9129 97 9D    A           STAA    RIOTBI    1,388 MSEC TIMEOUT
00283A 912B 86 06    A           LDAA    #6
00284A 912D 97 51    A           STAA    CHRSEL
00285A 912F 86 64    A           LDAA    #100      SET UP FLASH
00286A 9131 97 48    A           STAA    FLSHCT    COUNTER FOR BKGRND
00287A 9133 86 14    A           LDAA    #20       SET 20-CYCLE DELAY
00288A 9135 97 3E    A           STAA    SWREAD    ON RESTART
00289A 9137 86 80    A           LDAA    #TRGPAS*$10
00290A 9139 97 80    A           STAA    RIODRA    WAIT FOR
00291A 913B BD 9DE5  A RSWAIT    JSR     WATCH
00292A 913E 96 80    A           LDAA    RIODRA    TRIGGER OPEN
00293A 9140 46                   RORA
00294A 9141 25 F8 913B           BCS     RSWAIT    WAIT IF CLOSED
00295A 9143 86 39    A           LDAA    #57       PRINT
00296A 9145 7D 0135  A           TST     EPROMP
00297A 9148 26 03 914D           BNE     NHWE
```

```
00298A 914A B7 012D  A            STAA   PGFMT     HEADINGS
00299A 914D CE 0E04  A     NHWE   LDX    #$0E04    SET FLAGS FOR MONITORING
00300A 9150 DF 7D    A            STX    LMCTR     LINE VOLTAGE NOW!
00301A 9152 CE 0A03  A            LDX    #$0A03    SET PA. DEFAULT PARAMETERS
00302A 9155 DF 77    A            STX    PACURB
00303A 9157 86 0F    A            LDAA   #15
00304A 9159 97 3F    A            STAA   RIOTMD
00305                       *
00306                       * DETERMINE ROTATION OF 3-PHASE
00307                       * SECONDARY (A-B-C OR A-C-B)
00308                       * NOTE: A-C-B  ADC CH0 LEADS CH1 BY 60 DEGREES
00309                       *       A-B-C   "    "     "    "  "  300 DEGREES
00310                       * DELAY TIMING IS DONE THROUGH SOFTWARE
00311                       *    (NO TIMER INTERRUPTS)
00312                       *
00313A 915B 5F                    CLRB
00314A 915C 86 01    A            LDAA   #1
00315A 915E 97 AC    A            STAA   VIAIFR    CLEAR ZC IFR FLAG
00316A 9160 BD 9DE5  A   ROTWAI   JSR    WATCH
00317A 9163 96 AC    A            LDAA   VIAIFR    WAIT FOR ZERO CROSS; TRIGGE
00318A 9165 46                    RORA             SOFTWARE WATCHDOG WHILE
00319A 9166 24 F8 9160            BCC    ROTWAI    WAITING
00320A 9168 CE 0319  A            LDX    #793      DELAY 150 DEGREES
00321A 916B 09          DLY150    DEX              -600 US (ZC CONSTANT)
00322A 916C 26 FD 916B            BNE    DLY150
00323A 916E 86 02    A            LDAA   #02
00324A 9170 97 AC    A            STAA   VIAIFR
00325A 9172 97 B0    A            STAA   LVAAD     START CONVERSION
00326A 9174 96 AC    A   ROTWAO   LDAA   VIAIFR    (CH 0) AND
00327A 9176 85 02    A            BITA   #2        WAIT FOR COMPLETION
00328A 9178 27 FA 9174            BEQ    ROTWAO
00329A 917A 96 B0    A            LDAA   LVAAD     CH 0 = 0
00330A 917C 81 0A    A            CMPA   #10
00331A 917E 23 01 9181            BLS    STOROT    YES, STORE A-C-B ROTATION
00332A 9180 5A                    DECB             ELSE, STORE A-B-C ROTATION
00333A 9181 D7 5D    A   STOROT   STAB   ROTAT     STORE ROTATION
00334A 9183 86 01    A            LDAA   #1        CLEAR ZC
00335A 9185 97 AC    A            STAA   VIAIFR    IFR BITS
00336                       * KSM BACKGROUND
00337                       *
00338A 9187 0E          BKGRND    CLI
00339A 9188 BD 9DE5  A            JSR    WATCH     CALL SOFTWARE WATCHDOG
00340A 918B 7D 012E  A            TST    POWDWN
00341A 918E 27 F7 9187            BEQ    BKGRND
00342A 9190 96 3E    A   BKO      LDAA   SWREAD    DONE RESET DELAY?
00343A 9192 26 20 91B4            BNE    JDSP      NO, DON'T DO ANYTHING
00344A 9194 96 02    A            LDAA   ERR01     IF ERROR 01,04,05
00345A 9196 9A 01    A            ORAA   ERR04     06,07 OR 08 DON'T
00346A 9198 9A 05    A            ORAA   ERR05     DO ANYTHING
00347A 919A 9A 06    A            ORAA   ERR06
00348A 919C 9A 00    A            ORAA   ERR07
00349A 919E 9A 03    A            ORAA   ERR08
00350A 91A0 27 05 91A7            BEQ    NOERR
00351A 91A2 7F 000A  A            CLR    STATE     ELSE RETURN TO IDLE
00352A 91A5 20 0D 91B4            BRA    JDSP
00353A 91A7 96 08    A   NOERR    LDAA   STICK     STICK MODE?
00354A 91A9 27 03 91AE            BEQ    NOSTK     NO, BRANCH
00355A 91AB 7E 9510  A            JMP    STKRTN    YES, GO TO STICK ROUTINE
00356A 91AE 96 09    A   NOSTK    LDAA   TRIGGR    TRIGGER?
00357A 91B0 26 05 91B7            BNE    TRGCLS
00358A 91B2 97 0A    A            STAA   STATE     NO, SET STATE = 0
00359A 91B4 7E 95C5  A   JDSP     JMP    DSPFMT    GO TO DISP FORMAT
00360A 91B7 96 0B    A   TRGCLS   LDAA   LOCKUP    LOCKUP?
00361A 91B9 26 F9 91B4            BNE    JDSP      YES, GO TO DISP FORMAT
00362A 91BB BD 9DE5  A   JSTATE   JSR    WATCH     CALL SOFTWARE WATCHDOG
00363A 91BE 5F                    CLRB
00364A 91BF 96 0A    A            LDAA   STATE     GET ADDRESS OF NEXT
00365A 91C1 48                    ASLA             JUMP TABLE ROUTINE
00366A 91C2 8B AF    A            ADDA   #BKTAB-BKTAB/$100*$100
00367A 91C4 C9 9F    A            ADCB   #BKTAB/$100 DEPENDING ON
00368A 91C6 97 6A    A            STAA   TEMP4+1   STATE
00369A 91C8 D7 69    A            STAB   TEMP4
```

```
00370A 91CA DE 69      A         LDX     TEMP4
00371A 91CC EE 00      A GOSUB   LDX     X           GET ADR
00372A 91CE AD 00      A         JSR     X           JSR TO ROUTINE
00373A 91D0 96 07      A         LDAA    ERRO3       IF LOCATION ERRO3 IS
00374A 91D2 2A 05 91D9           BPL     NE7         NEGATIVE, ERROR 7 HAS
00375A 91D4 4F                   CLRA                OCCURRED, SO MAKE IT TOP
00376A 91D5 97 02      A         STAA    ERRO1       PRIORTY BY CLEARING
00377A 91D7 97 04      A         STAA    ERRO2       TWO AND ONE
00378A 91D9 96 7F      A NE7     LDAA    TXFLAG      IF 1,2 OR 3
00379A 91DB 27 07 91E4           BEQ     NPRT        GO TO FORMAT AND
00380A 91DD 81 04      A         CMPA    #04         START TX ROUTINE
00381A 91DF 24 03 91E4           BCC     NPRT
00382A 91E1 BD 8800    A         JSR     PRTFMT
00383A 91E4 96 0A      A NPRT    LDAA    STATE       IF STATE 0, GO TO
00384A 91E6 27 9F 9187           BEQ     BKGRND      BEGIN BKGRND, ELSE
00385A 91E8 20 D1 91BB           BRA     JSTATE      FIND ADR IN JMP TABLE
00386                          *
00387                          * BACKGROUND STATE 0
00388                          * HOUSEKEEPING FOR A STUD WELD
00389                          *
00390A 91EA 86 0F      A STATE0  LDAA    #15         ABORT ANY LINE
00391A 91EC 97 3F      A         STAA    RIOTMD      VOLTAGE MONITORING
00392A 91EE CE 0000    A         LDX     #0000
00393A 91F1 DF 7D      A         STX     LMCTR
00394A 91F3 DF 14      A         STX     TOTWC       CLEAR ACCUMULATORS
00395A 91F5 DF 16      A         STX     TOTTV
00396A 91F7 4F                   CLRA
00397A 91F8 97 7C      A         STAA    ADDCYC
00398A 91FA 86 03      A         LDAA    #3          DELAY 3 CYCLES AFTER
00399A 91FC 97 0C      A         STAA    DLYCTO      TRIGGER
00400A 91FE 86 64      A         LDAA    #100        RESET FLASH
00401A 9200 97 48      A         STAA    FLSHCT      COUNTER
00402A 9202 86 27      A         LDAA    #39         HAMMER 40 TIMES
00403A 9204 97 40      A         STAA    HAMRCT
00404A 9206 BD 9E0F    A         JSR     PADJA       GET BASE PHASE ANGLE
00405A 9209 DE 0F      A         LDX     TFT         AND GAIN FOR MAIN
00406A 920B DF 79      A         STX     TTFT        WELD CURRENT AND
00407A 920D 96 62      A         LDAA    DELTAT      SAVE
00408A 920F 97 7B      A         STAA    TDELT
00409A 9211 86 01      A         LDAA    #01
00410A 9213 97 0A      A         STAA    STATE
00411A 9215 39                 EXJTAB   RTS
00412                          *
00413                          * BACKGROUND STATE 1
00414                          * INITIALIZE THE PILOT ARC
00415                          *
00416A 9216 96 0C      A STATE1  LDAA    DLYCTO      TRIGGER CYCLE CTR = 0?
00417A 9218 26 FB 9215           BNE     EXJTAB      NO, RETURN
00418A 921A 96 78      A         LDAA    PACYCB      PILOT ARC
00419A 921C 97 0C      A         STAA    DLYCTO      SET PILOT ARC CYCLE DELAY
00420A 921E 4F                   CLRA
00421A 921F 97 95      A         STAA    RIOTD       DISABLE RIOTD INTR
00422A 9221 97 82      A         STAA    RIODRB      CLEAR DISP DATA LINES
00423A 9223 97 13      A         STAA    CYCLES      RESET APPROPRIATE
00424A 9225 97 04      A         STAA    ERRO2       RAM AND ERROR CODES
00425A 9227 97 07      A         STAA    ERRO3
00426A 9229 97 5B      A         STAA    GTFLAG
00427A 922B 97 3C      A         STAA    CYCPLS
00428A 922D 97 5F      A         STAA    ADJ
00429A 922F 97 6E      A         STAA    REGAVE
00430A 9231 97 6F      A         STAA    REGAVE+1
00431A 9233 97 71      A         STAA    REGCNT
00432A 9235 BD 9E09    A         JSR     INANG       GET BASE PHASE ANGLE AND
00433A 9238 BD 9E18    A         JSR     WADJA       GAIN FOR PILOT ARC
00434A 923B 86 02      A         LDAA    #2
00435A 923D 97 0A      A         STAA    STATE
00436A 923F 39                   RTS
00437                          *
00438                          * BACKGROUND STATE 2
00439                          * WAIT TILL END OF PILOT ARC COMPLETE
00440                          *
00441A 9240 96 0C      A STATE2  LDAA    DLYCTO      DELAY CTR = 0?
```

```
00442A 9242 26 D1 9215        BNE    EXJTAB   NO, RETURN
00443A 9244 96 0D    A         LDAA   LFCHK    LIFT CHECK?
00444A 9246 26 29 9271        BNE    PAFND,   YES, DON'T TEST P.A.
00445A 9248 96 54    A         LDAA   TMOUT    WAIT TIL 120 DEGREES
00446A 924A 81 05    A         CMPA   #05      INTO LAST P.A. CYCLE
00447A 924C 26 C7 9215        BNE    EXJTAB
00448A 924E 96 70    A         LDAA   REG      IF CURRENT GREATER THAN
00449A 9250 81 03    A         CMPA   #03      30 AMPS, THEN WE
00450A 9252 22 1D 9271        BHI    PAFND    HAVE PA.
00451A 9254 86 07    A         LDAA   #7       SET STATE = 7
00452A 9256 97 0A    A         STAA   STATE
00453A 9258 4F                 CLRA            CURRENT DISPLACEMENT IS
00454A 9259 97 60    A         STAA   IDEAL    ZERO IF HAMMERING
00455A 925B B7 0131  A         STAA   OIDEAL   (IDEAL - OIDEAL)
00456A 925E CE 063D  A         LDX    #$063D   WAIT
00457A 9261 09           WFC   DEX             TIL
00458A 9262 26 FD 9261        BNE    WFC      NO VOLTAGE
00459A 9264 86 40    A         LDAA   #$40     THEN RELEASE
00460A 9266 97 A0    A         STAA   VIADRA   G.S.
00461A 9268 86 04    A         LDAA   #04
00462A 926A 97 0C    A         STAA   DLYCTO
00463A 926C 86 AD    A         LDAA   #173     ENABLE KHZ
00464A 926E 97 9D    A         STAA   RIOT8I
00465A 9270 39                 RTS
00466A 9271 B6 0130  A  PAFND  LDAA   TTWCBI   SET UP
00467A 9274 97 60    A         STAA   IDEAL    PARAMETER
00468A 9276 DE 79    A         LDX    TTFT     I(REF), BASE PHASE ANGLE,
00469A 9278 DF 0F    A         STX    TFT      GAIN AND TIME FOR
00470A 927A 96 7B    A         LDAA   TDELT    MAIN WELD CURRENT
00471A 927C 97 62    A         STAA   DELTAT
00472A 927E 96 3B    A         LDAA   TWCYCB   TARG TIME = DIAL - 1
00473A 9280 81 06    A         CMPA   #06
00474A 9282 24 02 9286         BCC    NOTONE
00475A 9284 86 06    A         LDAA   #06      REQUIRE AT LEAST 6 CYCLES
00476A 9286 80 02    A NOTONE  SUBA   #02      FOR WELD
00477A 9288 97 12    A         STAA   TARTIM
00478A 928A 86 FD    A         LDAA   #-3      DON'T START REG AVE TIL
00479A 928C 97 71    A         STAA   REGCNT   AFTER 3 PHASES
00480A 928E 0F                 SEI
00481A 928F 7C 000A  A         INC    STATE
00482A 9292 CE 0000  A         LDX    #0000    RESET CURRENT
00483A 9295 FF 0100  A         STX    CACCUM   AVERAGING
00484A 9298 86 03    A         LDAA   #03
00485A 929A B7 0102  A         STAA   CACNT
00486                    *
00487                    *  BACKGROUND STATE 3
00488                    *    THIS IS A DUMMY STATE
00489                    *
00490A 929D 7C 000A  A STATE3  INC    STATE    YES, STATE = 4
00491A 92A0 7F 0011  A         CLR    ZCFLAG   WAIT FOR NEXT Z.C.
00492A 92A3 0E                 CLI
00493A 92A4 39         ST3RTS  RTS
00494                    *
00495                    *  BACKGROUND STATE 4
00496                    *    THIS IS MAIN WELD CURRENT ROUTINE!
00497                    *
00498A 92A5 96 11     A STATE4 LDAA   ZCFLAG   ZERO CROSS IN?
00499A 92A7 27 FB 92A4         BEQ    ST3RTS   NO, RETURN
00500A 92A9 7F 0011  A         CLR    ZCFLAG   CLEAR ZERO CROSS FLAG
00501A 92AC D6 63    A         LDAB   GOTSMP   WAIT TIL SAMPLE RECEIVED
00502A 92AE 27 19 92C9         BEQ    ST4B
00503A 92B0 7F 0063  A         CLR    GOTSMP
00504A 92B3 D6 13    A         LDAB   CYCLES   SKIP FIRST THREE
00505A 92B5 C1 04    A         CMPB   #04      CYCLES (TRANSITION
00506A 92B7 25 08 92C1         BCS    NOTZR    FROM P.A.)
00507A 92B9 96 18    A         LDAA   CURRNT
00508A 92BB CE 0014  A         LDX    #TOTWC
00509A 92BE BD 9E00  A         JSR    UPAVG    UPDATE TOTAL WC
00510A 92C1 96 64    A NOTZR   LDAA   VOLT     GET TV FROM 3RD SAMPLE
00511A 92C3 CE 0016  A         LDX    #TOTTV
00512A 92C6 BD 9E00  A         JSR    UPAVG    UPDATE TOTAL TV
00513A 92C9 96 12    A ST4B    LDAA   TARTIM   DONE FIRING?
00514A 92CB 26 D7 92A4         BNE    ST3RTS   NO, RETURN
```

```
00515A 92CD DE 14    A ST4A   LDX   TOTWC       COMPUTE AVERAGE
00516A 92CF DF 2F    A        STX   MPCN16      WELD CURRENT
00517A 92D1 CE 000A  A        LDX   #0010       1) CONVERT NEW
00518A 92D4 DF 31    A        STX   MPYR16      TOTAL CURRENT TO
00519A 92D6 BD 9D1B  A        JSR   MULT16      AMPS
00520A 92D9 BD 9DEE  A        JSR   PRODIV
00521A 92DC 96 13    A ST4D   LDAA  CYCLES      2) DIVIDE CURRENT BY
00522A 92DE 80 03    A        SUBA  #03         NUMBER OF CYCLES
00523A 92E0 BD 9C9D  A ST4D1  JSR   DIVIDE
00524                       * MOVE AND ADJUST WELD CURRENT BY DISPLACEMENT
00525A 92E3 DE 22    A        LDX   QUO+1       (IDEAL - OIDEAL)
00526A 92E5 BD 9EFA  A        JSR   MOVWC       GET AVERAGE CURRENT
00527A 92E8 DE 16    A        LDX   TOTTV       COMPUTE AVERAGE
00528A 92EA DF 2F    A        STX   MPCN16      TERMINAL VOLTAGE
00529A 92EC CE 0066  A        LDX   #VSCALE     1) CONVERT RAW
00530A 92EF DF 31    A        STX   MPYR16      TOTAL VOLTAGE TO
00531A 92F1 BD 9D1B  A        JSR   MULT16      VOLTS
00532A 92F4 BD 9DEE  A        JSR   PRODIV
00533A 92F7 96 13    A        LDAA  CYCLES      2) DIVIDE VOLTAGE
00534A 92F9 BD 9C9D  A ST4D2  JSR   DIVIDE
00535A 92FC 96 22    A        LDAA  QUO+1       GET AVERAGE
00536A 92FE 97 35    A        STAA  AVETV       VOLTAGE
00537A 9300 DE 33    A        LDX   AVEWC       GET AVERAGE
00538A 9302 DF 1F    A        STX   MPCAND+2    WELD CURRENT
00539A 9304 7F 001E  A        CLR   MPCAND+1    MULTIPLY BY
00540A 9307 BD 9CE1  A        JSR   MULT        AVE TERM VOLTAGE
00541A 930A 96 3B    A        LDAA  TWCYCB      USE # ON DIAL
00542A 930C 9B 7C    A        ADDA  ADDCYC      PLUS ANY ADDED BECAUSE
00543A 930E DE 19    A        LDX   PROD        OF LOW CURRENT
00544A 9310 DF 1D    A        STX   MPCAND
00545A 9312 DE 1B    A        LDX   PROD+2
00546A 9314 DF 1F    A        STX   MPCAND+2
00547A 9316 BD 9CE1  A        JSR   MULT        MULTIPLY BY # OF CYCLES
00548A 9319 BD 9DEE  A        JSR   PRODIV
00549A 931C 96 38    A        LDAA  FREQ        DIVIDE BY 50/60HZ FOR
00550A 931E BD 9C9D  A        JSR   DIVIDE      TIME IN SECONDS
00551A 9321 BD 9DF7  A        JSR   QUODIV      DIVIDE BY 100
00552A 9324 86 64    A        LDAA  #100        TO GET ENERGY
00553A 9326 BD 9C9D  A        JSR   DIVIDE      IN XXX.X KW-SECS
00554A 9329 BD 9DE5  A        JSR   WATCH       ROUTINE TOO LONG TO WAIT
00555                       *                   TIL RETURN TO JSR TABLE
00556A 932C DE 21    A        LDX   QUO         GET ENERGY
00557A 932E DF 36    A        STX   ENERGY      IN KILOWATT-SECS
00558A 9330 96 0E    A        LDAA  TWCURB      COMPUTE IDEAL
00559A 9332 97 20    A        STAA  MPCAND+3    ENERGY
00560A 9334 CE 0000  A        LDX   #0000
00561A 9337 DF 1E    A        STX   MPCAND+1    1) IDEAL CURRENT *
00562A 9339 96 35    A        LDAA  AVETV       ACTUAL VOLTAGE
00563A 933B BD 9CE1  A        JSR   MULT
00564A 933E DE 19    A        LDX   PROD        2) I*V*CYCLES
00565A 9340 DF 1D    A        STX   MPCAND
00566A 9342 DE 1B    A        LDX   PROD+2
00567A 9344 DF 1F    A        STX   MPCAND+2
00568A 9346 96 3B    A        LDAA  TWCYCB      USE DIALED IN CYCLES
00569A 9348 BD 9CE1  A        JSR   MULT        FOR IDEAL ENERGY
00570A 934B DE 19    A        LDX   PROD
00571A 934D DF 1D    A        STX   MPCAND
00572A 934F DE 1B    A        LDX   PROD+2      MULTIPLY BY 10 BECAUSE
00573A 9351 DF 1F    A        STX   MPCAND+2    SENSED CURRENT IS
00574A 9353 86 0A    A        LDAA  #10         ACTUAL CURRENT/10
00575A 9355 BD 9CE1  A        JSR   MULT
00576A 9358 BD 9DEE  A        JSR   PRODIV
00577A 935B 96 38    A        LDAA  FREQ        3) DIVIDE BY LINE
00578A 935D BD 9C9D  A        JSR   DIVIDE      FREQUENCY
00579A 9360 BD 9DF7  A        JSR   QUODIV
00580A 9363 86 64    A        LDAA  #100
00581A 9365 BD 9C9D  A        JSR   DIVIDE      STORE IDEAL
00582A 9368 DE 21    A        LDX   QUO         ENERGY
00583A 936A DF 39    A        STX   IDENRG
00584A 936C DE 21    A        LDX   QUO
00585A 936E DF 25    A        STX   DVND+1
00586A 9370 96 23    A        LDAA  QUO+2
```

```
00587A 9372 97 27    A              STAA   DVND+3
00588A 9374 7F 0024  A              CLR    DVND      COMPUTE 1% OF
00589A 9377 86 64    A              LDAA   #100      TOTAL ENERGY
00590A 9379 BD 9C9D  A              JSR    DIVIDE
00591A 937C 96 23    A              LDAA   QUO+2
00592A 937E 8B 80    A              ADDA   #$80      ROUND OFF 1% OF
00593A 9380 96 22    A              LDAA   QUO+1     TOTAL ENERGY
00594A 9382 89 00    A              ADCA   #00
00595A 9384 97 22    A              STAA   QUO+1
00596A 9386 96 21    A              LDAA   QUO
00597A 9388 89 00    A              ADCA   #0
00598A 938A 97 21    A              STAA   QUO
00599A 938C 96 39    A              LDAA   IDENRG    IDEAL ENERGY>
00600A 938E 91 36    A              CMPA   ENERGY    ACTUAL ENERGY?
00601A 9390 22 1F 93B1               BHI   ENERGT    YES, GO TO GT
00602A 9392 25 0B 939F                BCS   ENERLT   NO, GO TO LT
00603A 9394 96 3A    A              LDAA   IDENRG+1
00604A 9396 91 37    A              CMPA   ENERGY+1
00605A 9398 22 17 93B1               BHI   ENERGT
00606A 939A 25 03 939F                BCS   ENERLT
00607A 939C 7E 9430  A JST4EN       JMP    ST4END    IF IDEAL EN = ACTUAL
00608A 939F 86 FF    A ENERLT       LDAA   #$FF      COMPUTE
00609A 93A1 97 5B    A              STAA   GTFLAG    ACTUAL - IDEAL
00610A 93A3 96 37    A              LDAA   ENERGY+1  MPCAND = BUFFER
00611A 93A5 90 3A    A              SUBA   IDENRG+1  FOR DIFFERENCE
00612A 93A7 97 1E    A              STAA   MPCAND+1
00613A 93A9 96 36    A              LDAA   ENERGY
00614A 93AB 92 39    A              SBCA   IDENRG
00615A 93AD 97 1D    A              STAA   MPCAND
00616A 93AF 20 0C 93BD               BRA   ENRCMP
00617A 93B1 96 3A    A ENERGT       LDAA   IDENRG+1  COMPUTE
00618A 93B3 90 37    A              SUBA   ENERGY+1  IDEAL - ACTUAL
00619A 93B5 97 1E    A              STAA   MPCAND+1
00620A 93B7 96 39    A              LDAA   IDENRG
00621A 93B9 92 36    A              SBCA   ENERGY
00622A 93BB 97 1D    A              STAA   MPCAND
00623A 93BD 91 21    A ENRCMP       CMPA   QUO       DIFF <= 10%
00624A 93BF 25 DB 939C               BCS   JST4EN    YES, GO TO END
00625A 93C1 22 08 93CB               BHI   INCYC     NO, CHECK FOR
00626A 93C3 96 1E    A              LDAA   MPCAND+1  INCREASE IN
00627A 93C5 91 22    A              CMPA   QUO+1     CYCLES
00628A 93C7 25 D3 939C               BCS   JST4EN
00629A 93C9 27 D1 939C               BEQ   JST4EN
00630A 93CB 96 5B    A INCYC        LDAA   GTFLAG    ENERGY EXCEEDED?
00631A 93CD 26 04 93D3               BNE   SETER2    YES, ERROR 2
00632A 93CF 96 3C    A              LDAA   CYCPLS    CHECK FOR
00633A 93D1 27 04 93D7               BEQ   INCRS     INCREASED CYCLES
00634A 93D3 97 04    A SETER2       STAA   ERRO2     ERRO2 IF INCREASED
00635A 93D5 20 C5 939C               BRA   JST4EN    GO TO STATE 4
00636A 93D7 86 01    A INCRS        LDAA   #01       SET INCREASED
00637A 93D9 97 3C    A              STAA   CYCPLS    CYCLES FLAG
00638A 93DB DE 0E    A              LDX    TWCURB    GET IDEAL CURRENT
00639A 93DD DF 1E    A              STX    MPCAND+1  STORE AS MPCAND
00640A 93DF CE 0000  A              LDX    #0000
00641A 93E2 DF 1F    A              STX    MPCAND+2
00642A 93E4 96 3B    A              LDAA   TWCYCB    GET IDEAL CYCLES
00643A 93E6 BD 9CE1  A              JSR    MULT
00644A 93E9 BD 9DEE  A              JSR    PRODIV    MOVE PRODUCT TO DVND
00645A 93EC D6 33    A              LDAB   AVEWC     GET ACTUAL
00646A 93EE 96 34    A              LDAA   AVEWC+1   CURRENT AVERAGE
00647A 93F0 54                      LSRB             SHIFT RIGHT 3X
00648A 93F1 46                      RORA             TO FIT INTO
00649A 93F2 54                      LSRB             32X8 DIVIDE
00650A 93F3 46                      RORA
00651A 93F4 54                      LSRB
00652A 93F5 46                      RORA
00653A 93F6 BD 9C9D  A              JSR    DIVIDE    DIVIDE
00654A 93F9 BD 9DF7  A              JSR    QUODIV    MOVE QUO TO 4-BYTE
00655A 93FC CE 0024  A              LDX    #DVND     BUFFER AND SHIFT
00656A 93FF 86 03    A              LDAA   #3        RIGHT 3X
00657A 9401 64 00    A INCRSO       LSR    X         TO NORMALIZE
00658A 9403 66 01    A              ROR    1,X
```

```
00659A 9405 66 02    A          ROR    2,X         NEW CYCLE TIME
00660A 9407 66 03    A          ROR    3,X         IS IN DVND
00661A 9409 4A                  DECA
00662A 940A 26 F5 9401          BNE    INCRS0
00663A 940C 96 25    A          LDAA   DVND+1
00664A 940E 90 3B    A          SUBA   TWCYCB      STORE # CYCLES
00665A 9410 97 2E    A          STAA   TEMP1       TO INCREASE
00666A 9412 96 3B    A          LDAA   TWCYCB
00667A 9414 97 26    A          STAA   DVND+2      COMPUTE
00668A 9416 CE 0000  A          LDX    #0          10% OF DIALED
00669A 9419 DF 24    A          STX    DVND        CYCLES
00670A 941B 7F 0027  A          CLR    DVND+3
00671A 941E 86 0A    A          LDAA   #10         ANSWER IS IN
00672A 9420 BD 9C9D  A          JSR    DIVIDE      QUO+1
00673A 9423 96 22    A          LDAA   QUO+1       MAX < COMPUTED
00674A 9425 91 2E    A          CMPA   TEMP1       INCREASE?
00675A 9427 25 02 942B          BCS    INCRS1      YES, BRANCH
00676A 9429 96 2E    A          LDAA   TEMP1       NO, GET TEMP1
00677A 942B 97 12    A  INCRS1  STAA   TARTIM
00678A 942D 97 7C    A          STAA   ADDCYC      SAVE NUMBER CYCLES ADDED
00679A 942F 39                  RTS                CONTINUE FIRING
00680                         *
00681                         *
00682A 9430 86 06    A  ST4END  LDAA   #6          SET HOT PLUNGE CYCLE
00683A 9432 97 0C    A          STAA   DLYCTO      DOWN CTR = 6
00684A 9434 86 05    A          LDAA   #5          SET STATE = 5
00685A 9436 97 0A    A          STAA   STATE
00686A 9438 39          ST4RTS  RTS                END STATE 4
00687                         *
00688                         * BACKGROUND STATE 5
00689                         * HOT PLUNGE ROUTINE
00690                         *
00691A 9439 96 11    A  STATE5  LDAA   ZCFLAG      ZERO CROSS IN?
00692A 943B 27 FB 9438          BEQ    ST4RTS      NO, RETURN
00693A 943D 7F 0011  A          CLR    ZCFLAG      YES, CLEAR ZC FLAG
00694A 9440 96 A0    A          LDAA   VIADRA      DEENERGIZE GUN
00695A 9442 84 FD    A          ANDA   #$FD        SOLENOID
00696A 9444 97 A0    A          STAA   VIADRA
00697A 9446 96 0C    A          LDAA   DLYCTO      HOT PL DOWN CTR=0?
00698A 9448 26 44 948E          BNE    ST5RTS
00699A 944A 7C 000A  A          INC    STATE       SET STATE <--6
00700A 944D 96 0D    A          LDAA   LFCHK       IF LIFT CHECK,
00701A 944F 26 0F 9460          BNE    NCSDLC
00702A 9451 7D 0135  A          TST    EPROMP      IF PRINTER EPROM NOT
00703A 9454 26 04 945A          BNE    SKPPRT      THERE, DON'T SET TX FLAG
00704A 9456 86 01    A          LDAA   #01         START TX TASK
00705A 9458 97 7F    A          STAA   TXFLAG
00706A 945A 96 A0    A  SKPPRT  LDAA   VIADRA      SET CHUCK
00707A 945C 8A 10    A          ORAA   #$10        SAVER ACTIVE
00708A 945E 97 A0    A          STAA   VIADRA
00709A 9460 4F          NCSDLC  CLRA               TURN OFF
00710A 9461 97 A1    A          STAA   VIADRB      WELD
00711A 9463 CE 1000  A          LDX    #$1000      INITIALIZE CHUCK
00712A 9466 FF 0132  A          STX    CSTIM       SAVER TIME OUT
00713A 9469 96 3B    A  UPDCYC  LDAA   TWCYCB      SET CYCLES EQUAL
00714A 946B 9B 7C    A          ADDA   ADDCYC      TO TOTAL FOR WELD
00715A 946D 97 13    A          STAA   CYCLES
00716A 946F 96 0D    A          LDAA   LFCHK       IF LIFT CHECK, NO
00717A 9471 26 22 9495          BNE    ELC         NEED TO DETECT ERRORS
00718A 9473 96 0E    A          LDAA   TWCURB      COMPUTE 50%
00719A 9475 97 72    A          STAA   FACTOR
00720A 9477 86 05    A          LDAA   #10/2
00721A 9479 BD 9C8D  A          JSR    MULT8
00722A 947C D1 33    A          CMPB   AVEWC       50% CURRENT
00723A 947E 22 0F 948F          BHI    SETER1      ACHIEVED?
00724A 9480 25 04 9486          BCS    CKINC       YES, SET ERRO1
00725A 9482 91 34    A          CMPA   AVEWC+1     NO, CHECK ERRO3
00726A 9484 22 09 948F          BHI    SETER1
00727A 9486 96 07    A  CKINC   LDAA   ERRO3       IF ERROR 7
00728A 9488 2B 64 94EE          BMI    ST6RTS      SKIP ERROR 3
00729A 948A 96 3C    A          LDAA   CYCPLS      NO ERRO1, CHECK
00730A 948C 97 07    A          STAA   ERRO3       FOR ERRO3
```

```
00731A 948E 39            ST5RTS  RTS
00732A 948F 86 FF     A   SETER1  LDAA    #$FF
00733A 9491 97 02     A           STAA    ERR01
00734A 9493 20 F1 9486         BRA    CKINC
00735A 9495 4F            ELC     CLRA                    IF LIFT CHECK
00736A 9496 97 60     A           STAA    IDEAL           CLEAR CERTAIN FLAGS
00737A 9498 B7 0131   A           STAA    OIDEAL
00738A 949B 97 04     A           STAA    ERR02
00739A 949D 96 3B     A           LDAA    TWCYCB
00740A 949F 97 13     A           STAA    CYCLES
00741A 94A1 CE 0000   A           LDX     #0000           AND ACCUMULATORS
00742A 94A4 DF 33     A           STX     AVEWC           THAT ONLY HAVE
00743A 94A6 DF 35     A           STX     AVETV           A MEANING AFTER
00744A 94A8 DF 36     A           STX     ENERGY          A WELD
00745A 94AA 39                    RTS
00746                     *
00747                     *       BACKGROUND STATE 6
00748                     *       END OF STUD WELD
00749                     *
00750A 94AB 96 0D     A   STATE6  LDAA    LFCHK           IF LIFT CHECK, IGNORE
00751A 94AD 26 22 94D1         BNE    TRGGCK          CHUCK SAVER
00752A 94AF 96 A0     A           LDAA    VIADRA          IF CHUCK SAVER ON
00753A 94B1 85 10     A           BITA    #$10
00754A 94B3 27 18 94CD          BEQ    ST61
00755A 94B5 FE 0132   A           LDX     CSTIM           IF CHUCK SAVER
00756A 94B8 27 0B 94C5          BEQ    CKCK            TIME OUT OCCURS,
00757A 94BA 09                    DEX                     TURN IT OFF
00758A 94BB FF 0132   A           STX     CSTIM
00759A 94BE 26 05 94C5          BNE    CKCK
00760A 94C0 84 EF     A           ANDA    #$EF
00761A 94C2 97 A0     A           STAA    VIADRA
00762A 94C4 39                    RTS
00763A 94C5 85 04     A   CKCK    BITA    #04             AND INPUT IS ACTIVE
00764A 94C7 26 25 94EE          BNE    ST6RTS          TURN IT OFF
00765A 94C9 84 EF     A           ANDA    #$EF
00766A 94CB 97 A0     A           STAA    VIADRA
00767A 94CD 85 04     A   ST61    BITA    #04             IF CHUCK SAVER INPUT
00768A 94CF 27 1D 94EE          BEQ    ST6RTS          IS ACTIVE, EXIT
00769A 94D1 86 80     A   TRGGCK  LDAA    #TRGPAS*$10     PUT OUT SEL
00770A 94D3 7F 0082   A           CLR     RIODRB          CLEAR DISP DATA LINES
00771A 94D6 97 80     A           STAA    RIODRA          FOR TRIGGER
00772A 94D8 96 80     A           LDAA    RIODRA          GET TRIGGER DATA
00773A 94DA 85 01     A           BITA    #TRIG           TRIGGER?
00774A 94DC 26 10 94EE          BNE    ST6RTS          YES, RETURN
00775A 94DE 4F                    CLRA
00776A 94DF 97 0A     A           STAA    STATE           SET STATE = 0
00777A 94E1 97 09     A           STAA    TRIGGR          RESET TRIGGER FLAG
00778A 94E3 86 FF     A           LDAA    #$FF            ENABLE KHZ
00779A 94E5 97 6B     A           STAA    ENABLE          TIMER FLAG
00780A 94E7 CE 0000   A           LDX     #0              CLEAR BUFFERS
00781A 94EA DF 14     A           STX     TOTWC
00782A 94EC DF 16     A           STX     TOTTV
00783A 94EE 39            ST6RTS  RTS
00784                     *
00785                     *       BACKGROUND STATE 7
00786                     *       HAMMER ROUTINE
00787                     *
00788A 94EF 96 0C     A   STATE7  LDAA    DLYCTO          IF NOT DONE 3
00789A 94F1 26 FB 94EE          BNE    ST6RTS          CYCLE DELAY, RETURN
00790A 94F3 96 40     A           LDAA    HAMRCT          DONE HAMMERING?
00791A 94F5 27 08 94FF          BEQ    DNHAMR          YES, BRANCH
00792A 94F7 4A                    DECA                    DECREMENT
00793A 94F8 97 40     A           STAA    HAMRCT          HAMMER CTR
00794A 94FA 86 01     A           LDAA    #1              RESET DELAY
00795A 94FC 97 0A     A           STAA    STATE           COUNTER
00796A 94FE 39            ST7RTS  RTS
00797A 94FF 96 09     A   DNHAMR  LDAA    TRIGGR          TRIGGER CLOSED?
00798A 9501 26 FB 94FE          BNE    ST7RTS          YES, RTS
00799A 9503 97 0A     A           STAA    STATE           NO, CLEAR STATE
00800A 9505 CE 0000   A           LDX     #0000           AND, DISPLAY BUFFER
00801A 9508 DF 4A     A           STX     SEGBUF
00802A 950A DF 4C     A           STX     SEGBUF+2
```

```
00803A 950C 7F 0013  A           CLR     CYCLES
00804A 950F 39                   RTS                AND GO TO MAIN DK LOOP
00805                  *
00806                  *  STICK ROUTINE
00807                  *
00808A 9510 96 11     A STKRTN   LDAA    ZCFLAG     ZERO CROSS IN?
00809A 9512 27 21 9535           BEQ     JBKG
00810A 9514 7F 0011   A           CLR     ZCFLAG
00811A 9517 96 0A     A           LDAA    STATE      IF STATE = 0, THEN OPEN
00812A 9519 26 16 9531           BNE     STKO       WAS DETECTED,
00813A 951B BD 9E09   A           JSR     INANG      SO RESUME HI VOLTAGE
00814A 951E BD 9E18   A           JSR     WADJA      FIRING AND RE COMPUTE
00815A 9521 4F                    CLRA               WELD PARAMETER -- ALSO
00816A 9522 97 55     A           STAA    AVECTR     SET UP FLAGS AGAIN
00817A 9524 97 5F     A           STAA    ADJ
00818A 9526 97 63     A           STAA    GOTSMP
00819A 9528 86 04     A           LDAA    #04
00820A 952A 97 6B     A           STAA    ENABLE
00821A 952C 97 0A     A           STAA    STATE
00822A 952E 7E 95C5   A           JMP     DSPFMT
00823A 9531 96 63     A STKO      LDAA    GOTSMP     ELSE WAIT FOR SAMPLE
00824A 9533 26 03 9538           BNE     UPAV       FROM TIMER ROUTINE
00825A 9535 7E 9187   A JBKG     JMP     BKGRND
00826A 9538 4F          UPAV     CLRA               THEN DISABLE DISPLAY
00827A 9539 97 6B     A           STAA    ENABLE
00828A 953B 97 63     A           STAA    GOTSMP
00829A 953D 97 82     A           STAA    RIODRB
00830A 953F 96 18     A           LDAA    CURRNT     UPDATE
00831A 9541 9B 15     A           ADDA    TOTWC+1    CURRENT AND VOLTAGE
00832A 9543 97 15     A           STAA    TOTWC+1    ACCUMULATORS, FOR
00833A 9545 96 14     A           LDAA    TOTWC      THE AVERAGE COMPUTATION
00834A 9547 89 00     A           ADCA    #00
00835A 9549 97 14     A           STAA    TOTWC
00836A 954B 96 64     A           LDAA    VOLT
00837A 954D 9B 17     A           ADDA    TOTTV+1
00838A 954F 97 17     A           STAA    TOTTV+1
00839A 9551 96 16     A           LDAA    TOTTV
00840A 9553 89 00     A           ADCA    #00
00841A 9555 97 16     A           STAA    TOTTV
00842A 9557 96 55     A           LDAA    AVECTR     EVERY 8TH CYCLE
00843A 9559 81 07     A           CMPA    #07        RECOMPUTE AVERAGE
00844A 955B 27 05 9562           BEQ     STK1
00845A 955D 4C                    INCA               THE AVERAGE IS ONLY OF
00846A 955E 97 55                 STAA    AVECTR     THE PREVIOUS 8 CYCLES
00847A 9560 20 4C 95AE            BRA     STK3
00848A 9562 DE 14     A STK1     LDX     TOTWC
00849A 9564 DF 2F     A           STX     MPCN16
00850A 9566 CE 0140   A           LDX     #10*32     10*32 SCALES THE
00851A 9569 DF 31     A           STX     MPYR16     ACCUMULATED SAMPLES
00852A 956B BD 9D1B   A           JSR     MULT16     TO FIT DISPLAY FORMAT
00853A 956E 96 18     A           LDAA    CURRNT
00854A 9570 27 05 9577           BEQ     NCTA
00855A 9572 DE 1A     A           LDX     PROD+1     REQUIREMENTS
00856                  * MOVE AND ADJUST WELD CURRENT BY DISPLACEMENT
00857A 9574 BD 9EFA   A           JSR     MOVWC      (IDEAL - OIDEAL)
00858A 9577 DE 16     A NCTA     LDX     TOTTV
00859A 9579 DF 2F     A           STX     MPCN16
00860A 957B CE 0066   A           LDX     #VSCALE    SCALES THE
00861A 957E DF 31     A           STX     MPYR16     ACCUMULATED VOLTAGE
00862A 9580 BD 9D1B   A           JSR     MULT16     SAMPLES TO FIT DISPLAY
00863A 9583 96 1A     A           LDAA    PROD+1     FORMAT REQUIREMENTS
00864A 9585 D6 1B     A           LDAB    PROD+2
00865A 9587 47                    ASRA
00866A 9588 56                    RORB
00867A 9589 47                    ASRA
00868A 958A 56                    RORB
00869A 958B 47                    ASRA
00870A 958C 56                    RORB               DIVIDE BY 8 FOR AVERAGE
00871A 958D 96 18     A           LDAA    CURRNT
00872A 958F 26 0E 959F            BNE     GOTCUR
00873A 9591 D7 61     A           STAB    OAVETV     OPEN TV FOR STICK MODE
00874A 9593 7F 0055   A           CLR     AVECTR
```

```
00875A 9596 CE 0000  A            LDX    #0000
00876A 9599 DF 14    A            STX    TOTWC
00877A 959B DF 16    A            STX    TOTTV
00878A 959D 20 26 95C5            BRA    DSPFMT
00879A 959F D7 35    A  GOTCUR    STAB   AVETV
00880A 95A1 4F          STK2      CLRA                 RESET ACCUMULATORS
00881A 95A2 97 55    A            STAA   AVECTR        AND COUNTER
00882A 95A4 CE 0000  A            LDX    #0000
00883A 95A7 DF 14    A            STX    TOTWC
00884A 95A9 DF 16    A            STX    TOTTV
00885A 95AB 7E 9715  A            JMP    BUFSET
00886A 95AE 0F          STK3      SEI
00887A 95AF 86 70    A            LDAA   #$70
00888A 95B1 97 6B    A            STAA   ENABLE        IF STICK SWITCH
00889A 95B3 97 80    A            STAA   RIODRA        CHANGED, EXIT STICK
00890A 95B5 96 80    A            LDAA   RIODRA        MODE GRACEFULLY
00891A 95B7 85 08    A            BITA   #08
00892A 95B9 26 03 95BE            BNE    STKSTP
00893A 95BB 7E 9187  A            JMP    BKGRND
00894A 95BE 4F          STKSTP    CLRA
00895A 95BF 97 08    A            STAA   STICK
00896A 95C1 97 61    A            STAA   OAVETV
00897A 95C3 97 13    A            STAA   CYCLES
00898                      *
00899                      *  BACKGROUND - DISPLAY FORMAT ROUTINE
00900                      *
00901A 95C5 96 41    A  DSPFMT    LDAA   TWTIMD        GET BCD CYCLE
00902A 95C7 84 0F    A            ANDA   #$F           TIME ON DIALS
00903A 95C9 97 1A    A            STAA   PROD+1
00904A 95CB 96 42    A            LDAA   TWTIMD+1
00905A 95CD 97 1B    A            STAA   PROD+2
00906A 95CF 4F                    CLRA                 SET UP PROD
00907A 95D0 97 19    A            STAA   PROD          AS 5 BYTE BUFFER
00908A 95D2 BD 9D96  A            JSR    BCDBIN        CONVERT TO BINARY
00909A 95D5 96 1D    A  STOTIM    LDAA   PROD+4
00910A 95D7 D6 08    A            LDAB   STICK
00911A 95D9 26 08 95E3            BNE    WCYC
00912A 95DB D6 3D    A            LDAB   PAREAD
00913A 95DD 27 04 95E3            BEQ    WCYC
00914A 95DF 97 78    A            STAA   PACYCB
00915A 95E1 20 02 95E5            BRA    PACYC
00916A 95E3 97 3B    A  WCYC      STAA   TWCYCB        STORE CYCLES IN BINARY
00917A 95E5 4F          PACYC     CLRA
00918A 95E6 97 19    A            STAA   PROD          SET UP TO CONVERT
00919                      * ROUND OFF THUMBWHEEL CURRENT AND CONVERT
00920                      * TO ONE BYTE BINARY (0-200)
00921A 95E8 96 44    A            LDAA   TWCURD+1
00922A 95EA 8B 05    A            ADDA   #5            ROUND OFF
00923A 95EC 19                    DAA
00924A 95ED 16                    TAB
00925A 95EE 96 43    A            LDAA   TWCURD
00926A 95F0 89 00    A            ADCA   #0
00927A 95F2 19                    DAA
00928A 95F3 47                    ASRA                 DIVIDE
00929A 95F4 56                    RORB                 BY
00930A 95F5 47                    ASRA                 10
00931A 95F6 56                    RORB
00932A 95F7 47                    ASRA
00933A 95F8 56                    RORB
00934A 95F9 47                    ASRA
00935A 95FA 56                    RORB
00936A 95FB 97 1A    A            STAA   PROD+1
00937A 95FD D7 1B    A            STAB   PROD+2
00938A 95FF BD 9D96  A            JSR    BCDBIN        CONVERT TO BINARY
00939A 9602 96 1D    A            LDAA   PROD+4        GET CURRENT
00940A 9604 D6 08    A            LDAB   STICK
00941A 9606 26 08 9610            BNE    WCUR
00942A 9608 D6 3D    A            LDAB   PAREAD
00943A 960A 27 04 9610            BEQ    WCUR
00944A 960C 97 77    A            STAA   PACURB
00945A 960E 20 02 9612            BRA    PACUR
00946A 9610 97 0E    A  WCUR      STAA   TWCURB        STORE BINARY
```

```
00947A 9612 D6 08     A PACUR  LDAB  STICK       STICK MODE?
00948A 9614 27 0A 9620        BEQ   CKISTD      NO, CHECK STUD CUR
00949A 9616 81 03     A        CMPA  #3          CURRENT < 30?
00950A 9618 25 0A 9624         BCS   SETER5
00951A 961A 81 29     A CKGTSK CMPA  #41
00952A 961C 24 06 9624         BCC   SETER5      IF CURRENT > 400
00953A 961E 20 0A 962A         BRA   CUROK       ELSE, CURRENT OK
00954A 9620 81 05     A CKISTD CMPA  #05         CURRENT < 50?
00955A 9622 24 06 962A         BCC   CUROK       YES, SET ERRO5
00956A 9624 86 FF     A SETER5 LDAA  #$FF
00957A 9626 97 05     A        STAA  ERRO5
00958A 9628 20 03 962D         BRA   CKTIM
00959A 962A 7F 0005   A CUROK  CLR   ERRO5       CURENT OK, CLEAR ERRO5
00960A 962D 96 08     A CKTIM  LDAA  STICK       DON'T
00961A 962F 26 08 9639         BNE   WLDTIM      ALLOW
00962A 9631 96 3D     A        LDAA  PAREAD      ZERO
00963A 9633 27 04 9639         BEQ   WLDTIM      CYCLES
00964A 9635 96 78     A        LDAA  PACYCB      IN
00965A 9637 20 02 963B         BRA   CMPO
00966A 9639 96 3B     A WLDTIM LDAA  TWCYCB      FIRING TIME = 0?
00967A 963B 27 05 9642 CMPO    BEQ   SETER6      YES, SET ERRO6
00968A 963D 7F 0006   A        CLR   ERRO6
00969A 9640 20 03 9645         BRA   ERRCK
00970A 9642 4A            SETER6 DECA             SET ERRO6
00971A 9643 97 06     A        STAA  ERRO6
00972A 9645 CE 0000   A ERRCK  LDX   #ERRO7      FIND OUT IF ANY
00973A 9648 4F                 CLRA              ERRORS
00974A 9649 97 45     A        STAA  PRIERR      PRIERR=0 MEANS NO ERRORS
00975A 964B E6 00     A ERRCKO LDAB  X           GET ERROR FLAG
00976A 964D 26 0D 965C         BNE   ERRSET      IF SET, DECODE
00977A 964F 08                 INX
00978A 9650 4C                 INCA
00979A 9651 81 08     A        CMPA  #8          FINISHED BUFFER?
00980A 9653 26 F6 964B         BNE   ERRCKO      NO, TRY AGAIN
00981A 9655 86 64     A        LDAA  #100        RESET FLASH
00982A 9657 97 48     A        STAA  FLSHCT      COUNTER
00983A 9659 7E 9715   A        JMP   BUFSET      YES, SET UP BUFFER
00984A 965C CE 9FBF   A ERRSET LDX   #ERRTAB     GET ERROR CODE
00985A 965F 4A           ERR1  DECA
00986A 9660 2B 03 9665         BMI   ERR2
00987A 9662 08                 INX
00988A 9663 20 FA 965F         BRA   ERR1
00989A 9665 A6 00     A ERR2   LDAA  X           GET ERROR CODE
00990A 9667 97 45     A        STAA  PRIERR
00991A 9669 81 03     A        CMPA  #3          ERROR CODE <= 3?
00992A 966B 23 22 968F         BLS   ERRLT3      YES, BRANCH
00993A 966D C6 AB     A ERRDSP LDAB  #$AB        STORE
00994A 966F D7 46     A        STAB  DSPBUF      'ER'
00995A 9671 81 08     A        CMPA  #08
00996A 9673 26 05 967A         BNE   NOT9
00997A 9675 D6 03     A        LDAB  ERRO8       TEST BIT 7 OF ERRO8
00998A 9677 2A 01 967A         BPL   NOT9        TO SEE IF IT IS
00999A 9679 4C                 INCA              PRINTER EXCEPTION (DISPLAY
01000A 967A 81 07     A NOT9   CMPA  #07         DISPLAY 0 FOR
01001A 967C 26 01 967F         BNE   NOT7        SELF TEST ERROR
01002A 967E 4F                 CLRA
01003A 967F 81 03     A NOT7   CMPA  #03         AND 7 FOR
01004A 9681 26 06 9689         BNE   NOT3        FOR T. V. ERROR
01005A 9683 D6 07     A        LDAB  ERRO3
01006A 9685 2A 02 9689         BPL   NOT3
01007A 9687 86 07     A        LDAA  #07
01008A 9689 8A B0     A NOT3   ORAA  #$B0        STORE
01009A 968B 97 47     A        STAA  DSPBUF+1    'R' AND ERROR NUMBER
01010A 968D 20 32 96C1         BRA   SEVSEG      GO TO SEVEN SEG ROUT
01011A 968F D6 48     A ERRLT3 LDAB  FLSHCT      GET FLASH COUNTER
01012A 9691 5A                 DECB              DECREMENT
01013A 9692 26 05 9699         BNE   FLSH1       BRANCH IF NOT 0
01014A 9694 C6 64     A        LDAB  #100        ELSE, RELOAD
01015A 9696 73 0049   A        COM   FLSHFL      COMPLEMENT DISP
01016A 9699 D7 48     A FLSH1  STAB  FLSHCT      STORE COUNTER
01017A 969B D6 49     A        LDAB  FLSHFL      DISPLAY ERROR?
01018A 969D 26 CE 966D         BNE   ERRDSP      YES, BRANCH
```

```
01019A 969F 81 03      A           CMPA    #3              ERROR 3?
01020A 96A1 26 13 96B6             BNE     DSPCUR          NO, GET CURRENT
01021A 96A3 96 07      A           LDAA    ERRO3           FOR ERROR 7
01022A 96A5 2A 04 96AB             BPL     E3              DISPLAY T.V.
01023A 96A7 96 35      A           LDAA    AVETV
01024A 96A9 20 02 96AD             BRA     E30R7
01025A 96AB 96 13      A  E3       LDAA    CYCLES          YES, GET CYCLES
01026A 96AD 97 2D      A  E30R7    STAA    TEMPO+1         AND PUT INTO
01027A 96AF 7F 002C    A           CLR     TEMPO           1X
01028A 96B2 DE 2C      A           LDX     TEMPO
01029A 96B4 20 02 96B8             BRA     ERRST2
01030A 96B6 DE 33      A  DSPCUR   LDX     AVEWC           GET CURRENT
01031A 96B8 DF 1C      A  ERRST2   STX     PROD+3          SET UP FOR BIN-BCD
01032A 96BA BD 9D57    A           JSR     BINBCD          CONVERT BIN TO BCD
01033A 96BD DE 1A      A           LDX     PROD+1          GET DISPLAY
01034A 96BF DF 46      A           STX     DSPBUF          INFO
01035                              *
01036A 96C1 7D 003E    A  SEVSEG   TST     SWREAD
01037A 96C4 26 31 96F7             BNE     JBK
01038A 96C6 96 46      A           LDAA    DSPBUF          CHANGE MSB TO
01039A 96C8 8D 30 96FA             BSR     CNVRT7          SEGMENT CODES
01040A 96CA 81 3F      A           CMPA    #$3F            SUPPRESS 2 LEADING
01041A 96CC 26 06 96D4             BNE     ZPSTO           ZEROS
01042A 96CE 4F                     CLRA                    IF BYTE = CODE FOR '0',
01043A 96CF C1 3F      A           CMPB    #$3F            SET = CODE FOR BLANK
01044A 96D1 26 01 96D4             BNE     ZPSTO
01045A 96D3 5F                     CLRB
01046A 96D4 97 4A      A  ZPSTO    STAA    SEGBUF          STORE 1ST 2
01047A 96D6 D7 4B      A           STAB    SEGBUF+1        SEG CODES
01048A 96D8 96 47      A           LDAA    DSPBUF+1        GET LSB OF BUFFER
01049A 96DA 8D 1E 96FA             BSR     CNVRT7          GET 7-SEG CODES
01050A 96DC D7 4D      A           STAB    SEGBUF+3        STORE 3RD AND
01051A 96DE D6 4E      A           LDAB    DSPMOD          4TH CODES
01052A 96E0 C1 04      A           CMPB    #4              DISPLAY DP IF ENERGY
01053A 96E2 26 06 96EA             BNE     NODP            AND NO ERRORS
01054A 96E4 D6 45      A           LDAB    PRIERR          ANY ERRORS?
01055A 96E6 26 02 96EA             BNE     NODP            YES, NO DECIMAL PT.
01056A 96E8 8A 80      A           ORAA    #$80            OR IN DP BIT
01057A 96EA 97 4C      A  NODP     STAA    SEGBUF+2
01058A 96EC 96 6B      A           LDAA    ENABLE          ONLY START TIMER
01059A 96EE 27 07 96F7             BEQ     JBK             IF ENABLE IS FLAGGED
01060A 96F0 7F 006B    A           CLR     ENABLE
01061A 96F3 86 AD      A           LDAA    #173
01062A 96F5 97 9D      A           STAA    RIOT8I
01063A 96F7 7E 9187    A  JBK      JMP     BKGRND          START BACKGROUND
01064A 96FA 16            CNVRT7   TAB                     CONVERT ONE BYTE
01065A 96FB 54                     LSRB                    OF BCD TO SEVEN
01066A 96FC 54                     LSRB                    SEGMENT CODES
01067A 96FD 54                     LSRB                    ENTER: DATA IN ACCA
01068A 96FE 54                     LSRB                    EXIT: HIGH
01069A 96FF 84 0F      A           ANDA    #$F             DIGIT IN A
01070A 9701 8D 06 9709             BSR     FINDCD          LOW DIGIT IN B
01071A 9703 36                     PSHA                    STORE LOW DIGIT CODE
01072A 9704 17                     TBA                     FIND HIGH DIGIT CODE
01073A 9705 8D 02 9709             BSR     FINDCD
01074A 9707 33                     PULB                    GET LOW DIGIT CODE
01075A 9708 39                     RTS
01076A 9709 CE 9FC7   A  FINDCD    LDX     #SEGTAB         FIND CODE IN
01077A 970C 4A            FINDO    DECA                    DIGIT IN A
01078A 970D 2B 03 9712             BMI     FIND1
01079A 970F 08                     INX
01080A 9710 20 FA 970C             BRA     FINDO
01081A 9712 A6 00      A  FIND1    LDAA    X
01082A 9714 39                     RTS
01083A 9715 96 4E      A  BUFSET   LDAA    DSPMOD          GET DISP MODE
01084A 9717 7F 002C    A           CLR     TEMPO
01085A 971A 81 01      A           CMPA    #1              WELD CURRENT?
01086A 971C 26 04 9722             BNE     BUFSTO          NO, BRANCH
01087A 971E DE 33      A           LDX     AVEWC           GET CURRENT
01088A 9720 20 44 9766             BRA     BUFCNV
01089A 9722 81 02      A  BUFSTO   CMPA    #2              TERMINAL VOLTAGE?
01090A 9724 26 04 972A             BNE     BUFST1          NO, BRANCH
```

```
01091A 9726 96 35    A           LDAA  AVETV     GET TERM VOLTAGE
01092A 9728 20 38 9762           BRA   BUF1
01093A 972A 81 04    A  BUFST1   CMPA  #4        TOTAL ENERGY?
01094A 972C 26 04 9732           BNE   BUFST2    NO, BRANCH
01095A 972E DE 36    A           LDX   ENERGY    GET ENERGY
01096A 9730 20 34 9766           BRA   BUFCNV
01097A 9732 81 03    A  BUFST2   CMPA  #03
01098A 9734 27 25 975B           BEQ   BUFST5
01099A 9736 81 07    A           CMPA  #07
01100A 9738 26 04 973E           BNE   BUFST3
01101A 973A 96 61    A           LDAA  OAVETV    OPEN TV, STICK MODE
01102A 973C 20 24 9762           BRA   BUF1
01103A 973E 81 05    A  BUFST3   CMPA  #05
01104A 9740 26 11 9753           BNE   BUFST4
01105A 9742 96 77    A           LDAA  PACURB    PA. CURRENT MUST
01106A 9744 5F                   CLRB            BE CONVERTED TO DECIMAL
01107A 9745 CE 0009  A           LDX   #0009
01108A 9748 9B 77    A  M10LP    ADDA  PACURB
01109A 974A C9 00    A           ADCB  #0
01110A 974C 09                   DEX
01111A 974D 26 F9 9748           BNE   M10LP
01112A 974F D7 2C    A           STAB  TEMPO
01113A 9751 20 0F 9762           BRA   BUF1
01114A 9753 81 06    A  BUFST4   CMPA  #06
01115A 9755 26 0A 9761           BNE   BUF0      IF NONE, DISPLAY ZERO
01116A 9757 96 78    A           LDAA  PACYCB    PA. CYCLES TO DISPLAY
01117A 9759 20 07 9762           BRA   BUF1
01118A 975B 96 13    A  BUFST5   LDAA  CYCLES    GET TIME
01119A 975D D6 08    A           LDAB  STICK
01120A 975F 27 01 9762           BEQ   BUF1
01121A 9761 4F           BUF0    CLRA
01122A 9762 97 2D    A  BUF1     STAA  TEMPO+1
01123A 9764 DE 2C    A  BUFLDX   LDX   TEMPO
01124A 9766 DF 1C    A  BUFCNV   STX   PROD+3    SET UP TO CONVERT
01125A 9768 BD 9D57  A           JSR   BINBCD    CONVERT TO BCD
01126A 976B DE 1A    A           LDX   PROD+1    PUT IN DISP
01127A 976D DF 46    A           STX   DSPBUF    BUFFER
01128A 976F 7E 96C1  A           JMP   SEVSEG    CONVERT TO 7-SEG
01129                 *
01130                 *  INTERRUPT SEARCH
01131                 *
01132A 9772 96 AC    A  IRQ      LDAA  VIAIFR    GET IR FLAG
01133A 9774 2B 03 9779           BMI   CKI
01134A 9776 7E 9B14  A  IRIOT    JMP   RIOT
01135A 9779 46          CKI      RORA
01136A 977A 25 03 977F           BCS   ZCROSS
01137A 977C 7E 9817  A           JMP   IRTMR2
01138                 *
01139                 *  ZERO CROSS INTERRUPT SERVICE
01140                 *
01141                 *
01142A 977F 86 32    A  ZCROSS   LDAA  #50
01143A 9781 B7 012E  A           STAA  POWDWN
01144A 9784 96 0A    A           LDAA  STATE     IF STATE 2,4 OR 5
01145A 9786 16                   TAB
01146A 9787 C1 02    A           CMPB  #2
01147A 9789 27 06 9791           BEQ   ZC1
01148A 978B 84 06    A           ANDA  #$06
01149A 978D 81 04    A           CMPA  #04
01150A 978F 26 3E 97CF           BNE   ZC5
01151A 9791 96 AF    A  ZC1      LDAA  VIAIER    START FIRING
01152A 9793 85 40    A           BITA  #$40
01153A 9795 27 06 979D           BEQ   ZC1A      HOWEVER, CHECK FOR
01154A 9797 96 53    A           LDAA  SCR       SPURIOUS INTERRUPT FIRST
01155A 9799 81 04    A           CMPA  #04
01156A 979B 25 50 97ED           BCS   ZC8
01157A 979D 96 2B    A  ZC1A     LDAA  FIRTIM+1  FIRTIM CONTAINS ABSOLUTE
01158A 979F 80 55    A           SUBA  #$55      DELAY, SUBTRACT
01159A 97A1 97 A9    A           STAA  TIMER2+1  INTERRUPT RESPONSE TIME
01160A 97A3 96 2A    A           LDAA  FIRTIM
```

```
01161A 97A5 82 00    A           SBCA    #00
01162A 97A7 97 A8    A           STAA    TIMER2    BEFORE STARTING TIMERS
01163A 97A9 96 AF    A           LDAA    VIAIER
01164A 97AB 8A A0    A           ORAA    #$A0
01165A 97AD 97 AF    A           STAA    VIAIER
01166A 97AF C1 04    A    ZC2    CMPB    #04
01167A 97B1 26 0F 97C2            BNE    ZC3
01168A 97B3 7A 0012  A            DEC    TARTIM    IF STATE 4, COUNT CYCLES
01169A 97B6 7C 0013  A            INC    CYCLES
01170A 97B9 96 5F    A            LDAA   ADJ       AND IF NOT ADJUSTING
01171A 97BB 26 0C 97C9            BNE    ZC4       (OPEN IN STICK MODE),
01172A 97BD BD 9ED0  A            JSR    START     CONDITIONALLY START
01173A 97C0 20 07 97C9            BRA    ZC4       LINE MONITOR
01174A 97C2 C1 05    A    ZC3    CMPB    #05
01175A 97C4 26 09 97CF            BNE    ZC5
01176A 97C6 7A 000C  A             DEC   DLYCTO    IF STATE 5, COUNT HOT PLUN
01177A 97C9 86 FF    A    ZC4    LDAA    #$FF
01178A 97CB 97 11    A            STAA   ZCFLAG    SET ZERO CROSS FLAG
01179A 97CD 20 1E 97ED             BRA   ZC8
01180A 97CF 96 3E    A    ZC5    LDAA    SWREAD    SWREAD NOT EQUAL ZERO
01181A 97D1 27 05 97D8            BEQ    ZC6       MEANS DELAY DURING
01182A 97D3 7A 003E  A            DEC    SWREAD    RESET TIL SWITCHES
01183A 97D6 20 15 97ED            BRA    ZC8       ARE READ
01184A 97D8 5D              ZC6    TSTB
01185A 97D9 26 0B 97E6            BNE    ZC7       IF STATE 0
01186A 97DB 96 08    A            LDAA   STICK     AND STUD MODE
01187A 97DD 26 03 97E2            BNE    ZC6A      CONDITIONALLY START
01188A 97DF BD 9ED0  A            JSR    START     LINE MONITOR
01189A 97E2 86 FF    A    ZC6A   LDAA    #$FF      AND SET ZERO CROSS FLAG
01190A 97E4 97 11    A            STAA   ZCFLAG
01191A 97E6 96 0C    A    ZC7    LDAA    DLYCTO
01192A 97E8 27 03 97ED            BEQ    ZC8       ONLY DEC IF NOT ZERO
01193A 97EA 7A 000C  A            DEC    DLYCTO
01194A 97ED 86 01    A    ZC8    LDAA    #01       CLEAR THE INTERRUPT
01195A 97EF 97 AC    A            STAA   VIAIFR
01196A 97F1 0E                    CLI
01197A 97F2 5F                    CLRB
01198A 97F3 96 A0    A            LDAA   VIADRA    CHECK FOR CAM
01199A 97F5 7D 0008  A            TST    STICK     LOCK INTERCONNECT
01200A 97F8 27 06 9800            BEQ    CKSTD     ERROR, IF IN STICK
01201A 97FA 85 08    A            BITA   #08
01202A 97FC 26 07 9805            BNE    STERR8
01203A 97FE 20 04 9804            BRA    SETERR
01204A 9800 85 08    A    CKSTD  BITA    #08
01205A 9802 27 01 9805            BEQ    STERR8
01206A 9804 5C              SETERR INCB
01207A 9805 D7 03    A    STERR8 STAB   ERR08
01208A 9807 B6 0135  A    NCHANG LDAA   EPROMP
01209A 980A 26 0A 9816            BNE    ZCRTI
01210A 980C B6 012D  A            LDAA   PGFMT
01211A 980F 81 39    A            CMPA   #57
01212A 9811 26 03 9816            BNE    ZCRTI
01213A 9813 BD 8947  A            JSR    PRTHD
01214A 9816 3B              ZCRTI  RTI
01215                       *
01216A 9817 85 10    A    IRTMR2 BITA    #$10      TIMER 2?
01217A 9819 27 3E 9859            BEQ    IRTMR1
01218                       * TIMER 2 INTERRUPT SERVICE
01219                       *
01220A 981B 86 20    A    TM2SRV LDAA   #$20       CLEAR IFR
01221A 981D 97 AC    A            STAA   VIAIFR    BIT
01222A 981F 86 C6    A            LDAA   #$C6
01223A 9821 D6 07    A            LDAB   ERR03
01224A 9823 2B 06 982B            BMI    SKPFIR
01225A 9825 D6 0D    A            LDAB   LFCHK
01226A 9827 26 02 982B            BNE    SKPFIR
01227A 9829 97 A1    A            STAA   VIADRB    PAIR OF SCR'S
01228A 982B 86 01    A    SKPFIR LDAA   #01        STORE SCR
01229A 982D 97 53    A            STAA   SCR       PAIR #
01230A 982F 97 54    A            STAA   TMOUT
01231A 9831 86 C0    A            LDAA   #$C0      ENABLE PB7
01232A 9833 97 AA    A            STAA   VIAACR
```

```
01233A 9835 86 E8      A              LDAA   #$E8        LOAD TIMER 1
01234A 9837 97 A5      A              STAA   TM1CNT+1    FOR 1 MS
01235A 9839 86 03      A              LDAA   #03
01236A 983B 97 A4      A              STAA   TM1CNT
01237A 983D CE 06F1    A              LDX    #1777       LOAD LATCHES FOR
01238A 9840 DF A6      A              STX    TIMER1      RESET OF 30 DEGREES
01239A 9842 86 40      A              LDAA   #$40
01240A 9844 97 AC      A              STAA   VIAIFR
01241A 9846 86 C0      A              LDAA   #$C0        ENABLE TIMER 1, DISABLE
01242A 9848 97 AF      A              STAA   VIAIER      TIMER 2
01243A 984A 86 20      A              LDAA   #$20
01244A 984C 97 AF      A              STAA   VIAIER
01245A 984E 96 0A      A              LDAA   STATE       IF STATE 2, ENERGIZE
01246A 9850 81 02      A              CMPA   #02         GUN SOLENOID
01247A 9852 26 04 9858                BNE    TM2RTI
01248A 9854 86 42      A              LDAA   #$42
01249A 9856 97 A0      A              STAA   VIADRA
01250A 9858 3B           TM2RTI       RTI
01251                    *
01252A 9859 85 20      A IRTMR1       BITA   #$20        TIMER 1?
01253A 985B 26 03 9860                BNE    IRTM
01254A 985D 7E 9B14    A              JMP    RIOT
01255A 9860 86 FF      A IRTM         LDAA   #$FF        YES, TIMER 1 SERVICE
01256A 9862 97 6D      A              STAA   T1BUSY      FLAG ROUTINE SO IF KHZ
01257A 9864 BD 986B    A              JSR    TM1SRV      OCCURS, IT IS IGNORED
01258A 9867 7F 006D    A              CLR    T1BUSY
01259A 986A 3B                        RTI
01260                    *
01261                    *    TIMER 1 INTERRUPT SERVICE
01262                    *
01263A 986B 86 40      A TM1SRV       LDAA   #$40        CLEAR IFR
01264A 986D 97 AC      A              STAA   VIAIFR      BIT
01265A 986F 96 7F      A              LDAA   TXFLAG
01266A 9871 81 04      A              CMPA   #04         4 TO 13 IS TX
01267A 9873 25 03 9878                BCS    NOTX        SEQUENCE
01268A 9875 7E 88FB    A              JMP    TXROU
01269A 9878 0E           NOTX         CLI
01270A 9879 7C 0054    A              INC    TMOUT       INCREMENT TIMEOUT CTR
01271A 987C 96 54      A              LDAA   TMOUT       ODD # OF
01272A 987E 44                        LSRA               TIMEOUTS?
01273A 987F 25 03 9884                BCS    FALLNG
01274A 9881 7E 9957    A              JMP    RISING
01275A 9884 96 53      A FALLNG       LDAA   SCR         ON THE FALLING EDGE
01276A 9886 81 02      A              CMPA   #02         OF PB7, IF IT'S THE
01277A 9888 26 2C 98B6                BNE    REGUL       FIRST ONE AFTER ZERO
01278A 988A 0F                        SEI
01279A 988B 86 02      A              LDAA   #02         CROSS, THE TERMINAL
01280A 988D 97 AC      A              STAA   VIAIFR      VOLTAGE IS SAMPLED
01281A 988F 97 B3      A              STAA   TVAD        AND FLAGGED FOR AVERAGE
01282A 9891 96 AC      A WAITO        LDAA   VIAIFR      ACCUMULATION UPDATE
01283A 9893 85 02      A              BITA   #02
01284A 9895 27 FA 9891                BEQ    WAITO
01285A 9897 96 B3      A              LDAA   TVAD
01286A 9899 0E                        CLI
01287A 989A 97 64      A              STAA   VOLT
01288A 989C D6 0D      A              LDAB   LFCHK       IF NOT LIFT CHECK
01289A 989E 26 12 98B2                BNE    E7CF
01290A 98A0 D6 08      A              LDAB   STICK       OR STICK
01291A 98A2 26 0E 98B2                BNE    E7CF
01292A 98A4 D6 0A      A              LDAB   STATE       AND MAIN WELD CURRENT
01293A 98A6 C1 04      A              CMPB   #04
01294A 98A8 26 08 98B2                BNE    E7CF
01295A 98AA 81 1A      A              CMPA   #26         AND TERMINAL VOLTAGE < 25V
01296A 98AC 24 04 98B2                BCC    E7CF
01297A 98AE 86 FF      A              LDAA   #$FF        THEN DECLARE ERROR 7
01298A 98B0 97 07      A              STAA   ERRO3       (ERRO3 SET NEGATIVE)
01299A 98B2 86 FF      A E7CF         LDAA   #$FF
01300A 98B4 97 63      A              STAA   GOTSMP
01301A 98B6 96 5F      A REGUL        LDAA   ADJ         IF ADJUSTING HASN'T STARTE
01302A 98B8 26 03 98BD                BNE    REGX        YET SKIP REGULATION
01303A 98BA 7E 994A    A              JMP    REGS        ROUTINE
01304A 98BD D6 70      A REGX         LDAB   REG         ADD CURRENT FROM PREVIOUS
```

```
01305A 98BF 4F            CLRA              SAMPLE TO REGULATION
01306A 98C0 DB 6F    A    ADDB  REGAVE+1    ACCUMULATION
01307A 98C2 99 6E    A    ADCA  REGAVE
01308A 98C4 97 6E    A    STAA  REGAVE
01309A 98C6 D7 6F    A    STAB  REGAVE+1
01310A 98C8 96 71    A    LDAA  REGCNT      INCREMENT REGULATION
01311A 98CA 4C            INCA              COUNTER. IF IT BECOMES
01312A 98CB 27 7D 994A    BEQ   REG8        ZERO, RESET ACCCUMULATION
01313A 98CD 7D 0008  A    TST   STICK
01314A 98D0 26 10 98E2    BNE   REG0        IF STICK MODE OR PILOT
01315A 98D2 36            PSHA              ARC, AVERAGE 16 PHASES
01316A 98D3 96 0A    A    LDAA  STATE       ELSE AVERAGE 2 PHASES
01317A 98D5 81 02    A    CMPA  #02
01318A 98D7 32            PULA
01319A 98D8 27 08 98E2    BEQ   REG0
01320A 98DA 81 02    A    CMPA  #02
01321A 98DC 26 08 98E6    BNE   REG0A
01322A 98DE 96 6E    A    LDAA  REGAVE
01323A 98E0 20 14 98F6    BRA   REG1A
01324A 98E2 81 10    A REG0  CMPA  #16
01325A 98E4 27 04 98EA    BEQ   REG1
01326A 98E6 97 71    A REG0A STAA  REGCNT
01327A 98E8 20 67 9951    BRA   RELOAD
01328A 98EA 96 6E    A REG1  LDAA  REGAVE   DIVIDE ACCUMULATION
01329A 98EC CB 08    A    ADDB  #08         (ROUND OFF)
01330A 98EE 89 00    A    ADCA  #00
01331A 98F0 44            LSRA              BY 16 OR
01332A 98F1 56            RORB
01333A 98F2 44            LSRA
01334A 98F3 56            RORB
01335A 98F4 44            LSRA
01336A 98F5 56            RORB
01337A 98F6 44       REG1A LSRA             2
01338A 98F7 56            RORB
01339A 98F8 96 60    A    LDAA  IDEAL       SET REGCNT TO SIGN
01340A 98FA 11            CBA               OF IDEAL CURRENT MINUS
01341A 98FB 25 03 9900    BCS   REG1B       ACTUAL CURRENT
01342A 98FD 4F            CLRA
01343A 98FE 20 02 9902    BRA   REG1C
01344A 9900 86 FF    A REG1B LDAA  #$FF
01345A 9902 97 71    A REG1C STAA  REGCNT
01346A 9904 96 60    A    LDAA  IDEAL
01347A 9906 10            SBA
01348A 9907 2A 01 990A    BPL   REG2
01349A 9909 40            NEGA
01350A 990A D6 62    A REG2  LDAB  DELTAT   COMPUTE GAIN*(IDEAL-
01351A 990C D7 72    A    STAB  FACTOR      ACTUAL)
01352A 990E BD 9CBD  A    JSR.  MULT8
01353A 9911 7D 0071  A    TST   REGCNT      IF DIFFERENCE WAS
01354A 9914 2B 0A 9920    BMI   REG3        POSITIVE, COMPLEMENT
01355A 9916 D7 6E    A    STAB  REGAVE      THE PRODUCT
01356A 9918 97 6F    A    STAA  REGAVE+1
01357A 991A 4F            CLRA
01358A 991B 5F            CLRB
01359A 991C 90 6F    A    SUBA  REGAVE+1
01360A 991E D2 6E    A    SBCB  REGAVE
01361A 9920 9B 10    A REG3  ADDA  TFT+1    CHANGE THE BASE PHASE
01362A 9922 D9 0F    A    ADCB  TFT         ANGLE (TFT) BY THE
01363A 9924 2A 02 9928    BPL   NNEG
01364A 9926 C6 07    A    LDAB  #07
01365A 9928 C1 08    A NNEG  CMPB  #08      PRODUCT COMPUTED ABOVE
01366A 992A 22 0C 9938    BHI   REG5
01367A 992C 26 04 9932    BNE   REG4
01368A 992E 81 80    A    CMPA  #$80
01369A 9930 24 14 9946    BCC   REG7
01370A 9932 86 80    A REG4  LDAA  #$80     DON'T ALLOW THE BASE
01371A 9934 C6 08    A    LDAB  #08.        PHASE ANGLE TO BE
01372A 9936 20 0E 9946    BRA   REG7        LESS THAN $80 OR
01373A 9938 C1 1D    A REG5  CMPB  #$1D     GREATER THAN $1DD1
01374A 993A 22 06 9942    BHI   REG6
01375A 993C 26 08 9946    BNE   REG7
01376A 993E 81 D1    A    CMPA  #$D1
```

```
01377A 9940 25 04 9946           BCS    REG7
01378A 9942 86 D1      .A REG6   LDAA   #$D1
01379A 9944 C6 1D      A         LDAB   #$1D
01380A 9946 D7 0F      A REG7    STAB   TFT       UPDATE BASE PHASE
01381A 9948 97 10      A         STAA   TFT+1     ANGLE AND
01382A 994A 4F           REG8    CLRA             CLEAR ACCUMULATOR
01383A 994B 97 6E      A         STAA   REGAVE
01384A 994D 97 6F      A         STAA   REGAVE+1
01385A 994F 97 71      A         STAA   REGCNT
01386A 9951 CE 06F1    A RELOAD  LDX    #1777     SET LATCHES TO 60 DEGREES
01387A 9954 DF A6      A         STX    TIMER1    MINUS 1 M.S.
01388A 9956 39                   RTS
01389A 9957 86 02      A RISING  LDAA   #02       ON THE RISING EDGE
01390A 9959 0F                   SEI              OF PB7
01391A 995A 97 AC      A         STAA   VIAIFR    SAMPLE THE CURRENT
01392A 995C D6 60      A         LDAB   IDEAL     (USE WCSDAD IF IDEAL
01393A 995E C1 23      A         CMPB   #35       GREATER THAN 340, ELSE
01394A 9960 25 0E 9970           BCS    LT350     USE PAINP)
01395A 9962 97 B2      A         STAA   WCSDAD
01396A 9964 96 AC      A WAIT1   LDAA   VIAIFR
01397A 9966 85 02      A         BITA   #02       WAIT FOR CONVERSION
01398A 9968 27 FA 9964           BEQ    WAIT1     COMPLETE
01399A 996A 96 B2      A         LDAA   WCSDAD    GET CURRENT
01400A 996C C6 CC      A         LDAB   #$CC      AND
01401A 996E 20 0C 997C           BRA    CONV      SCALING FACTOR
01402A 9970 97 B4      A LT350   STAA   PAINP
01403A 9972 96 AC      A WAIT2   LDAA   VIAIFR
01404A 9974 85 02      A         BITA   #02
01405A 9976 27 FA 9972           BEQ    WAIT2
01406A 9978 96 B4      A         LDAA   PAINP
01407A 997A C6 2C      A         LDAB   #$2C
01408A 997C 0E           CONV    CLI
01409A 997D D7 72      A         STAB   FACTOR    MULTIPLY CURRENT
01410A 997F BD 9C8D    A         JSR    MULT8     SENSED BY SCALING
01411A 9982 D7 70      A         STAB   REG       FACTOR, SAVE IN REG
01412A 9984 27 03 9989           BEQ    NOCLR
01413A 9986 7F 0073    A         CLR    NOCUR     NOCUR INDICATES OPEN IN ST
01414A 9989 CE 0100    A NOCLR   LDX    #CABLK    AVERAGE THE CURRENT
01415A 998C EB 01      A         ADDB   1,X       OVER 4 PASSES BEFORE
01416A 998E E7 01      A         STAB   1,X       PASSING TO THE AVERAGING
01417A 9990 A6 00      A         LDAA   0,X       FOR DISPLAY ROUTINE
01418A 9992 89 00      A         ADCA   #00
01419A 9994 A7 00      A         STAA   0,X
01420A 9996 6A 02      A         DEC    2,X
01421A 9998 2A 11 99AB           BPL    NOAVE
01422A 999A 44                   LSRA
01423A 999B 56                   RORB
01424A 999C 44                   LSRA
01425A 999D 56                   RORB
01426A 999E C9 00      A         ADCB   #00
01427A 99A0 D7 18      A         STAB   CURRNT    AFTER 4 PHASE AVERAGE
01428A 99A2 86 03      A         LDAA   #03       CLEAR ACCUMULATOR
01429A 99A4 A7 02      A         STAA   2,X       AND RESET COUNTER
01430A 99A6 4F                   CLRA
01431A 99A7 A7 00      A         STAA   0,X
01432A 99A9 A7 01      A         STAA   1,X
01433A 99AB 96 54      A NOAVE   LDAA   TMOUT     IF 6 SCR PAIRS HAVE
01434A 99AD 81 0C      A         CMPA   #12       BEEN FIRED
01435A 99AF 25 0A 99BB           BCS    NXTSCR
01436A 99B1 86 40      A         LDAA   #$40      DISABLE TIMER 1
01437A 99B3 97 AF      A         STAA   VIAIER    INTERRUPT
01438A 99B5 97 AA      A         STAA   VIAACR    DISABLE PB7 OUT
01439A 99B7 86 80      A         LDAA   #$80      AND SET PB7 HI, PB6 LO
01440A 99B9 20 1E 99D9           BRA    PUTSCR
01441A 99BB 96 53      A NXTSCR  LDAA   SCR       LOOK UP NEXT SCR
01442A 99BD 4C                   INCA             PAIR FROM THE TABLE
01443A 99BE 97 53      A         STAA   SCR       DEPENDING ON THE
01444A 99C0 CE 9FDC    A         LDX    #ABCTAB-1 ROTATION
01445A 99C3 D6 5D      A         LDAB   ROTAT
01446A 99C5 26 03 99CA           BNE    TM1ABC
01447A 99C7 CE 9FD6    A         LDX    #ACBTAB-1
01448                          * CAUTION: ALL OF A ROTATION TABLE MUST
```

```
01449                    * BE ON THE SAME PAGE
01450A 99CA DF 67    A TM1ABC STX    TEMP3
01451A 99CC 9B 68    A        ADDA   TEMP3+1
01452A 99CE 97 68    A        STAA   TEMP3+1
01453A 99D0 DE 67    A        LDX    TEMP3
01454A 99D2 A6 00    A        LDAA   X
01455A 99D4 CE 03E8  A        LDX    #1000         AND SET THE LATCHES
01456A 99D7 DF A6    A        STX    TIMER1        FOR 1 MS
01457A 99D9 D6 0D    A PUTSCR LDAB   LFCHK         IF LIFT CHECK, NO SCR'S
01458A 99DB 26 0D 99EA        BNE    CKADJ
01459A 99DD D6 07    A        LDAB   ERR03
01460A 99DF 2B 06 99E7        BMI    DFIRE
01461A 99E1 D6 0A    A        LDAB   STATE
01462A 99E3 C1 07    A        CMPB   #07           IF HAMMERING
01463A 99E5 26 01 99E8        BNE    STSCR         TURN ALL SCR'S
01464A 99E7 4F        DFIRE   CLRA
01465A 99E8 97 A1    A STSCR  STAA   VIADRB        OFF
01466A 99EA 96 5F    A CKADJ  LDAA   ADJ
01467A 99EC 26 03 99F1        BNE    CKSTK         IF NOT ADJUSTING
01468A 99EE 7E 9A82  A        JMP    CKSTUD        YET GO TO CKSTUD
01469A 99F1 96 08    A CKSTK  LDAA   STICK
01470A 99F3 27 1D 9A12        BEQ    ADJUST
01471A 99F5 96 70    A        LDAA   REG           ELSE IF STICK MODE
01472A 99F7 26 19 9A12        BNE    ADJUST
01473A 99F9 96 73    A        LDAA   NOCUR         CHECK FOR NO CURRENT
01474A 99FB 4C                INCA                 FOR 3 CONSECUTIVE PHASES
01475A 99FC 97 73    A        STAA   NOCUR         THEN DECLARE AN OPEN
01476A 99FE 81 03    A        CMPA   #03
01477A 9A00 26 10 9A12        BNE    ADJUST
01478A 9A02 7F 000A  A        CLR    STATE         IF OPEN, ABORT WELD AND
01479A 9A05 86 80    A        LDAA   #$80          FLAG FOR REINITIALIZATION
01480A 9A07 97 A1    A        STAA   VIADRB
01481A 9A09 86 60    A        LDAA   #$60
01482A 9A0B 97 AF    A        STAA   VIAIER
01483A 9A0D 86 40    A        LDAA   #$40
01484A 9A0F 97 AA    A        STAA   VIAACR
01485A 9A11 39         ADJRTS RTS
01486A 9A12 7A 006C  A ADJUST DEC    SKPADJ        CHECK IF ADJUSTMENT
01487A 9A15 26 FA 9A11        BNE    ADJRTS        SHOULD BE SKIPPED
01488A 9A17 96 60    A AD1    LDAA   IDEAL         IF NOT, SET TADJ TO
01489A 9A19 91 70    A        CMPA   REG           SIGN OF DIFFERENCE
01490A 9A1B 25 03 9A20        BCS    AD1A          BETWEEN IDEAL AND
01491A 9A1D 5F                CLRB                 ACTUAL CURRENT
01492A 9A1E 20 02 9A22        BRA    AD1B
01493A 9A20 C6 FF    A AD1A   LDAB   #$FF
01494A 9A22 D7 5E    A AD1B   STAB   TADJ
01495A 9A24 90 70    A        SUBA   REG
01496A 9A26 2A 01 9A29        BPL    AD2
01497A 9A28 40                NEGA
01498A 9A29 97 72    A AD2    STAA   FACTOR        COMPUTE GAIN * DIFFERENCE
01499A 9A2B 96 62    A        LDAA   DELTAT
01500A 9A2D BD 9C8D  A        JSR    MULT8
01501A 9A30 D7 74    A        STAB   TEE
01502A 9A32 97 75    A        STAA   TEE+1
01503A 9A34 7D 005E  A        TST    TADJ          IF DIFFERENCE POSITIVE,
01504A 9A37 2B 06 9A3F        BMI    AD3           COMPLEMENT THE PRODUCT
01505A 9A39 5F                CLRB
01506A 9A3A 4F                CLRA
01507A 9A3B 90 75    A        SUBA   TEE+1
01508A 9A3D D2 74    A        SBCB   TEE
01509A 9A3F 9B 10    A AD3    ADDA   TFT+1         ADD TO BASE PHASE
01510A 9A41 D9 0F    A        ADCB   TFT           ANGLE
01511A 9A43 2B 0A 9A4F        BMI    AD4
01512A 9A45 C1 08    A        CMPB   #08           BUT DON'T ALLOW RESULT
01513A 9A47 22 0C 9A55        BHI    AD5           TO BE LESS THAN $80 OR
01514A 9A49 26 04 9A4F        BNE    AD4           GREATER THAN $1DD1
01515A 9A4B 81 80    A        CMPA   #$80
01516A 9A4D 24 14 9A63        BCC    AD7
01517A 9A4F 86 80    A AD4    LDAA   #$80
01518A 9A51 C6 08    A        LDAB   #08
01519A 9A53 20 0E 9A63        BRA    AD7
01520A 9A55 C1 1D    A AD5    CMPB   #$1D
```

```
01521A 9A57 22 06 9A5F              BHI     AD6
01522A 9A59 26 08 9A63              BNE     AD7
01523A 9A5B 81 D1    A              CMPA    #$D1
01524A 9A5D 25 04 9A63              BCS     AD7
01525A 9A5F 86 D1    A     AD6      LDAA    #$D1
01526A 9A61 C6 1D    A              LDAB    #$1D
01527A 9A63 90 2B    A     AD7      SUBA    FIRTIM+1    COMPUTE CHANGE FROM
01528A 9A65 D2 2A    A              SBCB    FIRTIM      RELATIVE ANGLE DURING
01529A 9A67 2A 09 9A72              BPL     AD8         PREVIOUS PHASE
01530A 9A69 C1 FE    A              CMPB    #$FE        BUT DON'T ALLOW IT
01531A 9A6B 24 0C 9A79              BCC     AD10
01532A 9A6D C6 FE    A              LDAB    #$FE        TO BE LESS THAN -512
01533A 9A6F 4F                      CLRA                OR GREATER THAN 1024
01534A 9A70 20 07 9A79              BRA     AD10
01535A 9A72 C1 04    A     AD8      CMPB    #04
01536A 9A74 25 03 9A79              BCS     AD10
01537A 9A76 C6 04    A              LDAB    #04
01538A 9A78 4F                      CLRA
01539A 9A79 D7 65    A     AD10     STAB    TTIM        PUT CHANGE IN TTIM
01540A 9A7B 97 66    A              STAA    TTIM+1      AND GO TO STORE
01541A 9A7D 7C 006C  A     AD13     INC     SKPADJ
01542A 9A80 20 3C 9ABE              BRA     STORE
01543                        *
01544A 9A82 96 08    A     CKSTUD   LDAA    STICK
01545A 9A84 26 05 9A8B              BNE     WAITSK
01546A 9A86 F6 012F  A              LDAB    TPACBI      IS STUD MODE GET
01547A 9A89 20 1F 9AAA              BRA     INIARC      PILOT ARC CURRENT AND
01548A 9A8B 96 70    A     WAITSK   LDAA    REG         GO TO INITIAL ANGLE ROUTIN
01549A 9A8D 81 02    A              CMPA    #02
01550A 9A8F 25 4F 9AE0              BCS     EXITT       ELSE IF CURRENT LESS THAN
01551A 9A91 CE 0000  A              LDX     #0000       20, EXIT
01552A 9A94 DF 33    A              STX     AVEWC       CLEAR DISPLAY FIELDS
01553A 9A96 DF 34    A              STX     AVEWC+1     AVERAGE ACCUMULATORS
01554A 9A98 DF 7D    A              STX     LMCTR
01555A 9A9A DF 14    A              STX     TOTWC       AND ABORT
01556A 9A9C DF 16    A              STX     TOTTV       LINE MONITORING
01557A 9A9E 86 0F    A              LDAA    #15
01558A 9AA0 97 3F    A              STAA    RIOTMD
01559A 9AA2 4F                      CLRA
01560A 9AA3 97 95    A              STAA    RIOTD       DISABLE KHZ
01561A 9AA5 97 6B    A              STAA    ENABLE
01562A 9AA7 F6 0130  A              LDAB    TTWCBI
01563A 9AAA 96 10    A     INIARC   LDAA    TFT+1       COMPUTE TTIM SO FIRTIM
01564A 9AAC 90 2B    A              SUBA    FIRTIM+1    EQUALS BASE PHASE ANGLE
01565A 9AAE 97 66    A              STAA    TTIM+1      AFTER THE NEXT ADJUSTMENT
01566A 9AB0 96 0F    A              LDAA    TFT
01567A 9AB2 92 2A    A              SBCA    FIRTIM
01568A 9AB4 97 65    A              STAA    TTIM
01569A 9AB6 D7 60    A              STAB    IDEAL       SET IDEAL CURRENT
01570A 9AB8 86 01    A              LDAA    #01         AND SET THE ADJUST FLAG
01571A 9ABA 97 6C    A              STAA    SKPADJ
01572A 9ABC 97 5F    A              STAA    ADJ
01573A 9ABE 96 AF    A     STORE    LDAA    VIAIER      THIS ROUTINE ADJUSTS
01574A 9AC0 85 40    A              BITA    #$40        EITHER TIMER IF IT
01575A 9AC2 27 05 9AC9              BEQ     ST1         IS ENABLE BY THE
01576A 9AC4 CE 00A4  A              LDX     #TM1CNT     AMOUNT IN TTIM
01577A 9AC7 8D 18 9AE1              BSR     ST3
01578A 9AC9 96 AF    A     ST1      LDAA    VIAIER
01579A 9ACB 85 20    A              BITA    #$20
01580A 9ACD 27 05 9AD4              BEQ     ST2
01581A 9ACF CE 00A8  A              LDX     #TIMER2
01582A 9AD2 8D 0D 9AE1              BSR     ST3
01583A 9AD4 96 65    A     ST2      LDAA    TTIM        THEN IT ADJUSTS
01584A 9AD6 D6 66    A              LDAB    TTIM+1      FIRTIM BY THE SAME
01585A 9AD8 DB 2B    A              ADDB    FIRTIM+1    AMOUNT
01586A 9ADA 99 2A    A              ADCA    FIRTIM
01587A 9ADC D7 2B    A              STAB    FIRTIM+1
01588A 9ADE 97 2A    A              STAA    FIRTIM
01589A 9AE0 39              EXITT   RTS
01590A 9AE1 A6 00    A     ST3      LDAA    X           READ THE TIMER
01591A 9AE3 E6 01    A              LDAB    1,X
01592A 9AE5 A1 00    A              CMPA    X
```

```
01593A 9AE7 26 F8 9AE1        BNE    ST3
01594A 9AE9 DB 66    A        ADDB   TTIM+1     ADJUST BY TTIM
01595A 9AEB 99 65    A        ADCA   TTIM
01596A 9AED C0 2C    A        SUBB   #44        AND TIME REQUIRED
01597A 9AEF 82 00    A        SBCA   #00        BY THE ROUTINE
01598A 9AF1 2A 03 9AF6        BPL    ST3A
01599A 9AF3 4F                CLRA              IF RESULT IS NEGATIVE
01600A 9AF4 C6 40    A        LDAB   #64        ADJUST BY 100 M.S.
01601A 9AF6 BC 00A8  A ST3A   CPX    #TIMER2
01602A 9AF9 26 08 9B03        BNE    ST4
01603A 9AFB    01 -  A        FCB    1,1,1      IF TIMER 2, JUST RESTORE
01604A 9AFE E7 01    A        STAB   1,X
01605A 9B00 A7 00    A        STAA   X
01606A 9B02 39                RTS
01607A 9B03 7F 00AA  A ST4    CLR    VIAACR     IF TIMER1, CHANGE
01608A 9B06 E7 01    A        STAB   1,X        MODE OF PB7, RESTORE
01609A 9B08 A7 00    A        STAA   X          AND PUT MODE OF PB7
01610A 9B0A 86 C0    A        LDAA   #$C0       BACK
01611A 9B0C 97 AA    A        STAA   VIAACR
01612A 9B0E CE 03E8  A        LDX    #1000      THAN SET LATCHES
01613A 9B11 DF A6    A        STX    TIMER1     FOR 1 M.S.
01614A 9B13 39                RTS
01615                      *
01616                      * RIOT INTERRUPT SERVICE
01617                      *
01618A 9B14 96 85    A RIOT   LDAA   RIOIFR     IF NO RIOT, INTERRUPT
01619A 9B16 26 01 9B19        BNE    R1         THEN EXIT (SPURIOUS)
01620A 9B18 3B                RTI
01621A 9B19 96 8C    A R1     LDAA   RIOTIM     CLEAR THE INTERRUPT
01622A 9B1B 96 3F    A        LDAA   RIOTMD     RIOTMD SEQUENCES THRU
01623A 9B1D 81 0F    A        CMPA   #15        LINE MONITORING STEPS
01624A 9B1F 27 44 9B65        BEQ    KHZ        15 MEANS SEQUENCE
01625A 9B21 4C                INCA
01626A 9B22 97 3F    A        STAA   RIOTMD     IS COMPLETE
01627A 9B24 81 02    A        CMPA   #02        2 MEANS CHECK THE
01628A 9B26 26 1A 9B42        BNE    R3         B PHASE AND
01629A 9B28 86 02    A        LDAA   #02
01630A 9B2A 97 AC    A        STAA   VIAIFR     IF ABC ROTATION
01631A 9B2C 97 B1    A        STAA   LVBAD
01632A 9B2E 96 AC    A R2     LDAA   VIAIFR     SET RIOTMD TO
01633A 9B30 85 02    A        BITA   #02        SAMPLE A AFTER
01634A 9B32 27 FA 9B2E        BEQ    R2
01635A 9B34 96 B1    A        LDAA   LVBAD      2 MORE INTERRUPTS
01636A 9B36 97 50    A        STAA   PHSEA
01637A 9B38 96 5D    A        LDAA   ROTAT
01638A 9B3A 27 29 9B65        BEQ    KHZ
01639A 9B3C 86 0A    A        LDAA   #10
01640A 9B3E 97 3F    A        STAA   RIOTMD
01641A 9B40 20 23 9B65        BRA    KHZ
01642A 9B42 81 0C    A R3     CMPA   #12        12 MEANS CHECK
01643A 9B44 26 1F 9B65        BNE    KHZ
01644A 9B46 86 02    A        LDAA   #02        THE A PHASE
01645A 9B48 97 AC    A        STAA   VIAIFR
01646A 9B4A 97 B0    A        STAA   LVAAD
01647A 9B4C 96 AC    A R4     LDAA   VIAIFR
01648A 9B4E 85 02    A        BITA   #02
01649A 9B50 27 FA 9B4C        BEQ    R4
01650A 9B52 96 B0    A        LDAA   LVAAD
01651A 9B54 81 80    A        CMPA   #$80
01652A 9B56 25 09 9B61        BCS    LNERR
01653A 9B58 90 50    A        SUBA   PHSEA
01654A 9B5A 2A 01 9B5D        BPL    R5
01655A 9B5C 40                NEGA              IF THE DIFFERENCE
01656A 9B5D 81 50    A R5     CMPA   #80        BETWEEN A AND B IS
01657A 9B5F 25 04 9B65        BCS    KHZ        GREATER THAN 40%
01658A 9B61 86 FF    A LNERR  LDAA   #$FF
01659A 9B63 97 01    A        STAA   ERRO4      SET ERROR 4 FLAG
01660                      *
01661                      * KHZ ROUTINE
01662                      *
01663A 9B65 86 AD    A KHZ    LDAA   #173       RELOAD TIME
01664A 9B67 97 9D    A        STAA   RIOT8I     SLICE TIMER
```

```
01665A 9B69 96 6D    A           LDAA    T1BUSY      IF TIMER 1 BUSY,
01666A 9B6B 27 01 9B6E           BEQ     OK1         IGNORE THIS INTERRUPT
01667A 9B6D 3B              KHZ1 RTI
01668A 9B6E 96 76  • A OK1       LDAA    RBUSY       SET KHZ BUSY FLAG
01669A 9B70 26 FB 9B6D           BNE     KHZ1        SO IF ANOTHER COMES
01670A 9B72 4C                   INCA                IN ON TOP, IT IS
01671A 9B73 97 76   A            STAA    RBUSY       IGNORED
01672A 9B75 8D 04 9B7B           BSR     OKRIOT
01673A 9B77 7F 0076 A            CLR     RBUSY
01674A 9B7A 3B                   RTI
01675A 9B7B 0E              OKRIOT CLI
01676A 9B7C 96 51   A            LDAA    CHRSEL      INCREMENT CLEAR
01677A 9B7E 4C                   INCA                SEL MODE 10
01678A 9B7F 81 0A   A            CMPA    #10         IF SEL = 10, SET = READ
01679A 9B81 25 01 9B84           BCS     STOSEL      SWITCH FLAG
01680A 9B83 4F                   CLRA                AND SEL = 0
01681A 9B84 97 51   A STOSEL     STAA    CHRSEL
01682A 9B86 16                   TAB
01683A 9B87 58                   ASLB
01684A 9B88 58                   ASLB
01685A 9B89 58                   ASLB
01686A 9B8A 58                   ASLB
01687A 9B8B 7F 0082 A            CLR     RIODRB
01688A 9B8E D7 80   A            STAB    RIODRA
01689A 9B90 C1 20   A            CMPB    #$20        CHARACTER SELECTS 2
01690A 9B92 25 11 9BA5           BCS     CHR0        THRU 5 ARE FOR DISPLAY
01691A 9B94 C1 60   A            CMPB    #$60        REFRESH
01692A 9B96 24 0D 9BA5           BCC     CHR0
01693A 9B98 CE 004A A            LDX     #SEGBUF
01694A 9B9B 81 02   A CHRA       CMPA    #2
01695A 9B9D 27 04 9BA3           BEQ     CHRB
01696A 9B9F 08                   INX
01697A 9BA0 4A                   DECA
01698A 9BA1 20 F8 9B9B           BRA     CHRA
01699A 9BA3 A6 00   A CHRB       LDAA    X           GET SEGMENT DATA
01700A 9BA5 C1 20   A CHR0       CMPB    #$20
01701A 9BA7 25 11 9BBA           BCS     CHR1
01702A 9BA9 C1 60   A            CMPB    #$60
01703A 9BAB 24 0D 9BBA           BCC     CHR1
01704A 9BAD 7D 012E A            TST     POWDWN
01705A 9BB0 26 03 9BB5           BNE     DATA
01706A 9BB2 4F                   CLRA
01707A 9BB3 20 03 9BB8           BRA     FFS
01708A 9BB5 7A 012E A DATA       DEC     POWDWN
01709A 9BB8 97 82   A FFS        STAA    RIODRB      PUT OUT NEW DATA
01710A 9BBA 96 80   A CHR1       LDAA    RIODRA      GET TW DATA
01711A 9BBC 84 0F   A            ANDA    #$F         MASK OUT HIGH NIBBLE
01712A 9BBE D6 51   A            LDAB    CHRSEL
01713A 9BC0 C1 07   A            CMPB    #KEYPAS     KEY SW SEL?
01714A 9BC2 26 3B 9BFF           BNE     KHZ0        NO, BRANCH
01715A 9BC4 16                   TAB                 MASK OUT ALL BUT
01716A 9BC5 C4 03   A            ANDB    #3          KEY SW BITS
01717A 9BC7 D1 52   A            CMPB    KEYSW
01718A 9BC9 27 03 9BCE           BEQ     KHZ2
01719A 9BCB BD 9C7E A            JSR     CLRERR
01720A 9BCE D7 52   A KHZ2       STAB    KEYSW
01721A 9BD0 C1 01   A            CMPB    #01
01722A 9BD2 26 05 9BD9           BNE     NLOCK       NO, NO LOCKUP
01723A 9BD4 D6 04   A            LDAB    ERRO2
01724A 9BD6 D7 0B   A            STAB    LOCKUP
01725A 9BD8 39                   RTS
01726A 9BD9 7F 000B A NLOCK      CLR     LOCKUP
01727A 9BDC D6 52   A KHZ3       LDAB    KEYSW
01728A 9BDE C1 02   A            CMPB    #2
01729A 9BE0 26 53 9C35           BNE     KHZRTS
01730A 9BE2 5F                   CLRB
01731A 9BE3 85 04   A            BITA    #PASEL      SET PA. ?
01732A 9BE5 27 01 9BE8           BEQ     KHZ3A1      NO, PA. FLAG = 0
01733A 9BE7 5A                   DECB                YES, PA. FLAG = FF
01734A 9BE8 D7 3D   A KHZ3A1     STAB    PAREAD      STORE PA. FLAG
01735A 9BEA 5F                   CLRB
01736A 9BEB 85 08   A            BITA    #STKSW      STICK?
```

```
01737A 9BED 27 0B 9BFA              BEQ    KHZ3A2    NO, STICK = 0
01738A 9BEF 7D 0008  A              TST    STICK
01739A 9BF2 27 0B 9BFF              BEQ    KHZO
01740A 9BF4 D7 13    A              STAB   CYCLES
01741A 9BF6 D7 61    A              STAB   OAVETV
01742A 9BF8 20 03 9BFD              BRA    KHZ3B
01743A 9BFA D7 0D    A KHZ3A2       STAB   LFCHK
01744A 9BFC 5A                      DECB             YES, STICK = FF
01745A 9BFD D7 08    A KHZ3B        STAB   STICK     STORE STICK
01746A 9BFF C1 08    A KHZO         CMPB   #TRGPAS   TRIGGER SET?
01747A 9C01 26 1F 9C22              BNE    KHZ4      NO, BRANCH
01748A 9C03 5F                      CLRB
01749A 9C04 85 01    A              BITA   #TRIG     YES, STORE TRIGGER
01750A 9C06 27 0A 9C12              BEQ    KHZ3C     AS FF/00
01751A 9C08 37                      PSHB             DON'T ALLOW TRIGGER
01752A 9C09 F6 012D  A              LDAB   PGFMT     WHILE HEADING IS
01753A 9C0C C1 39    A              CMPB   #57       PRINTING
01754A 9C0E 33                      PULB
01755A 9C0F 24 01 9C12              BCC    KHZ3C
01756A 9C11 5A                      DECB
01757A 9C12 D7 09    A KHZ3C        STAB   TRIGGR
01758A 9C14 5F                      CLRB             STORE LIFT
01759A 9C15 85 02    A              BITA   #LFCKSW   CHECK
01760A 9C17 26 06 9C1F              BNE    KHZ3D
01761A 9C19 7D 0008  A              TST    STICK
01762A 9C1C 26 01 9C1F              BNE    KHZ3D
01763A 9C1E 5A                      DECB
01764A 9C1F D7 0D    A KHZ3D        STAB   LFCHK     STORE
01765A 9C21 39                      RTS
01766A 9C22 C1 09    A KHZ4         CMPB   #SELPAS   DISPLAY SELECTOR?
01767A 9C24 26 10 9C36              BNE    KHZ5      ROTARTY SWITCH IS
01768A 9C26 84 0F    A              ANDA   #$F       INVERTED INPUTS
01769A 9C28 7D 000B  A              TST    LOCKUP
01770A 9C2B 26 06 9C33              BNE    STODMD
01771A 9C2D 91 4E    A              CMPA   DSPMOD
01772A 9C2F 27 02 9C33              BEQ    STODMD
01773A 9C31 8D 4B 9C7E              BSR    CLRERR
01774A 9C33 97 4E    A STODMD       STAA   DSPMOD    YES, SET DISP MODE
01775A 9C35 39         KHZRTS       RTS
01776A 9C36 D6 52    A KHZ5         LDAB   KEYSW     KEY LOCKED?
01777A 9C38 C1 02    A              CMPB   #2
01778A 9C3A 26 F9 9C35              BNE    KHZRTS    YES, RTS
01779A 9C3C C6 09    A              LDAB   #9
01780A 9C3E D0 51    A              SUBB   CHRSEL
01781A 9C40 54                      LSRB
01782A 9C41 CE 0041  A              LDX    #TWTIMD
01783A 9C44 5A         KHZ6         DECB             STORE IN
01784A 9C45 27 03 9C4A              BEQ    KHZ6A
01785A 9C47 08                      INX
01786A 9C48 20 FA 9C44              BRA    KHZ6
01787A 9C4A 25 1B 9C67 KHZ6A        BCS    STOLOW    STORE LOW NIBBLE IF C=0
01788A 9C4C 48                      ASLA             ELSE, STORE HIGH NIBBLE
01789A 9C4D 48                      ASLA
01790A 9C4E 48                      ASLA
01791A 9C4F 48                      ASLA
01792A 9C50 E6 00    A              LDAB   X         GET BYTE
01793A 9C52 C4 F0    A              ANDB   #$F0      MASK LOW NIBBLE
01794A 9C54 D7 2E    A              STAB   TEMP1
01795A 9C56 91 2E    A              CMPA   TEMP1     SW CHANGED?
01796A 9C58 27 02 9C5C              BEQ    KHZ7      NO.
01797A 9C5A 8D 22 9C7E              BSR    CLRERR    YES, CLEAR ERRO2, 03
01798A 9C5C E6 00    A KHZ7         LDAB   X         OR IN NEW
01799A 9C5E C4 0F    A              ANDB   #$F       SWITCH DATA
01800A 9C60 D7 2E    A              STAB   TEMP1
01801A 9C62 9A 2E    A              ORAA   TEMP1
01802A 9C64 A7 00    A              STAA   X         STORE BUFFER
01803A 9C66 39                      RTS
01804A 9C67 E6 00    A STOLOW       LDAB   X         GET BYTE
01805A 9C69 C4 0F    A              ANDB   #$F       MASK HIGH NIBBLE
01806A 9C6B D7 2E    A              STAB   TEMP1
01807A 9C6D 91 2E    A              CMPA   TEMP1     SW CHANGED?
01808A 9C6F 27 02 9C73              BEQ    KHZ8
```

```
01809A 9C71 8D 0B 9C7E              BSR      CLRERR    YES, CLEAR ERR02,03
01810A 9C73 E6 00      A  KHZ8      LDAB     X         OR IN NEW
01811A 9C75 C4 F0      A            ANDB     #$F0      SW DATA
01812A 9C77 D7 2E      A            STAB     TEMP1
01813A 9C79 9A 2E      A            ORAA     TEMP1
01814A 9C7B A7 00      A            STAA     X         STORE IN BUFFER
01815A 9C7D 39                      RTS
01816A 9C7E 7F 0004    A  CLRERR    CLR      ERR02
01817A 9C81 7F 0007    A            CLR      ERR03
01818A 9C84 7D 0008    A            TST      STICK
01819A 9C87 26 03 9C8C              BNE      NCLRST
01820A 9C89 7F 000A    A            CLR      STATE
01821A 9C8C 39            NCLRST    RTS
01822                               *
01823                               * 8 X 8 UNSIGNED MULTIPLY SUBROUTINE
01824                               * FACTOR 1 IN ACCA
01825                               * FACTOR 2 IN FACTOR
01826                               * MSB QUOTIENT IN ACCB
01827                               * LSB QUOTIENT IN ACCA
01828                               *
01829A 9C8D CE 0009    A  MULT8     LDX      #0009     THIS IS ESSENTIALLY
01830A 9C90 5F                      CLRB               A SHIFT AND ADD ROUTINE,
01831A 9C91 56            M81       RORB               IT WAS CHOSEN BECAUSE
01832A 9C92 46                      RORA               OF ITS RELATIVELY FAST
01833A 9C93 09                      DEX                EXECUTION TIME (LESS
01834A 9C94 27 06 9C9C              BEQ      M82       THAN 300 MICRO-SECONDS)
01835A 9C96 24 F9 9C91              BCC      M81
01836A 9C98 DB 72      A            ADDB     FACTOR
01837A 9C9A 20 F5 9C91              BRA      M81
01838A 9C9C 39            M82       RTS
01839                               *
01840                               * 32 X 8 UNSIGNED DIVISION SUBROUTINE
01841                               *
01842                               * ENTER: DIVIDEND IN MEMORY
01843                               *        DIVISOR IN ACCA
01844                               * EXIT:  QUOTIENT IN 'QUO'.
01845                               *
01846A 9C9D C6 18      A  DIVIDE    LDAB     #24       INT'L S = 24
01847A 9C9F CE 0000    A            LDX      #0        CLEAR QUOTIENT
01848A 9CA2 DF 21      A            STX      QUO       BUFFER
01849A 9CA4 DF 22      A            STX      QUO+1
01850A 9CA6 97 28      A            STAA     DVSR      STORE DIVISOR
01851A 9CA8 27 36 9CEO              BEQ      DVDEND
01852A 9CAA CE 0021    A            LDX      #QUO      INDEXED REFERENCE
01853A 9CAD 5C            DVDLP0    INCB               S = S+1
01854A 9CAE 68 07      A            ASL      7,X       LEFT SHIFT DIVISOR
01855A 9CB0 24 FB 9CAD              BCC      DVDLP0    IF C = 0 DON'T LOOP
01856A 9CB2 D7 29      A            STAB     DSPL      SAVE DISPLACEMENT
01857A 9CB4 66 07      A            ROR      7,X       SHIFT DIVISOR BACK 1
01858A 9CB6 A6 03      A            LDAA     3,X
01859A 9CB8 A1 07      A  DVDLP1    CMPA     7,X       IF DIVIDEND > DIVISOR
01860A 9CBA 25 0D 9CC9              BCS      DVNSUB    DON'T SUBTRACT
01861A 9CBC 0D            DVDLP2    SEC                IF DIVIDEND >= DIVISOR
01862A 9CBD 69 02      A            ROL      2,X
01863A 9CBF 69 01      A            ROL      1,X       SHIFT Q LEFT 1 BIT
01864A 9CC1 69 00      A            ROL      X         W/LSB = 1
01865A 9CC3 90 28      A            SUBA     DVSR      Y(M) = Y(M)-X
01866A 9CC5 97 24      A            STAA     DVND
01867A 9CC7 20 06 9CCF              BRA      DVSHFT
01868A 9CC9 68 02      A  DVNSUB    ASL      2,X       SHIFT Q LEFT
01869A 9CCB 69 01      A            ROL      1,X
01870A 9CCD 69 00      A            ROL      X         W/LSB = 0
01871A 9CCF 5A            DVSHFT    DECB               S = S-1
01872A 9CD0 27 0E 9CEO              BEQ      DVDEND    IF S = 0, DONE
01873A 9CD2 68 06      A            ASL      6,X       IF S = 0, SHIFT
01874A 9CD4 69 05      A            ROL      5,X       DIVIDEND LEFT 1 BIT
01875A 9CD6 69 04      A            ROL      4,X       LSB = 0
01876A 9CD8 69 03      A            ROL      3,X
01877A 9CDA A6 03      A            LDAA     3,X
01878A 9CDC 25 DE 9CBC              BCS      DVDLP2    IF C = 1, GO TO LOOP 2
01879A 9CDE 20 D8 9CB8              BRA      DVDLP1    ELSE: LOOP 1
```

```
01880A 9CE0 39              DVDEND  RTS                     DIVIDE COMPLETE
01881                        *
01882                        *      24 X 8 UNSIGNED MULTIPLY SUBROUTINE
01883                        *      ENTER: MULTIPLICAND IN 'MPCAND'
01884                        *             A HAS 8-BIT MULTIPLIER
01885                        *      EXIT:  PRODUCT IN 'PROD'.
01886                        *
01887A 9CE1 5F               MULT    CLRB                    CLEAR PRODUCT
01888A 9CE2 D7 19    A               STAB    PROD            BUFFER
01889A 9CE4 D7 1A    A               STAB    PROD+1
01890A 9CE6 D7 1B    A               STAB    PROD+2
01891A 9CE8 D7 1C    A               STAB    PROD+3
01892A 9CEA D7 1D    A               STAB    MPCAND
01893A 9CEC C6 08    A       MULTA   LDAB    #8              LOAD COUNTER
01894A 9CEE 44               MPYO    LSRA                    SHIFT A RIGHT
01895A 9CEF 24 1A 9D0B               BCC     MPNADD          DON'T ADD IF LSB(A) = 0
01896A 9CF1 37                       PSHB                    SAVE ACCB
01897A 9CF2 D6 20    A               LDAB    MPCAND+3
01898A 9CF4 DB 1C    A               ADDB    PROD+3
01899A 9CF6 D7 1C    A               STAB    PROD+3
01900A 9CF8 D6 1F    A               LDAB    MPCAND+2        ADD MULTIPLICAND
01901A 9CFA D9 1B    A               ADCB    PROD+2          TO PARTIAL PRODUCT
01902A 9CFC D7 1B    A               STAB    PROD+2
01903A 9CFE D6 1E    A               LDAB    MPCAND+1
01904A 9D00 D9 1A    A               ADCB    PROD+1
01905A 9D02 D7 1A    A               STAB    PROD+1
01906A 9D04 D6 19    A               LDAB    PROD
01907A 9D06 D9 1D    A               ADCB    MPCAND
01908A 9D08 D7 19    A               STAB    PROD
01909A 9D0A 33                       PULB                    RESTORE ACCB
01910A 9D0B 78 0020  A       MPNADD  ASL     MPCAND+3        SHIFT MULTIPLICAND
01911A 9D0E 79 001F  A               ROL     MPCAND+2
01912A 9D11 79 001E  A               ROL     MPCAND+1        LEFT ONE
01913A 9D14 79 001D  A               ROL     MPCAND
01914A 9D17 5A                       DECB                    DONE?
01915A 9D18 26 D4 9CEE               BNE     MPYO            NO, GO AGAIN.
01916A 9D1A 39                       RTS                     YES, RETURN.
01917                        *
01918                        *      16 X 16 UNSIGNED MULTIPLY SUBROUTINE
01919                        *      ENTER: MULTIPLICAND IN MPCN16
01920                        *             MULTIPLIER IN MPYR16
01921                        *      EXIT:  PRODUCT IN PROD
01922                        *      NOTE:  IT CALLS THE 8X24 MULT ROUTINE 2 TIMES
01923                        *
01924A 9D1B DE 2F    A       MULT16  LDX     MPCN16          GET MULTIPLICAND
01925A 9D1D DF 1F    A               STX     MPCAND+2        STORE IN 8-BIT MPY
01926A 9D1F 7F 001E  A               CLR     MPCAND+1        MULTIPLICAND
01927A 9D22 96 32    A               LDAA    MPYR16+1        GET LSB MPYER
01928A 9D24 8D BB 9CE1               BSR     MULT
01929A 9D26 DE 1A    A               LDX     PROD+1
01930A 9D28 DF 25    A               STX     DVND+1          DVND = TEMP
01931A 9D2A 96 1C    A               LDAA    PROD+3          STORAGE
01932A 9D2C 97 27    A               STAA    DVND+3
01933A 9D2E DE 2F    A               LDX     MPCN16          GET MULTIPLICAND
01934A 9D30 DF 1E    A               STX     MPCAND+1        STORE IN 8-BIT
01935A 9D32 7F 0020  A               CLR     MPCAND+3        MPY RAM
01936A 9D35 96 31    A               LDAA    MPYR16
01937A 9D37 8D A8 9CE1               BSR     MULT
01938A 9D39 96 26    A               LDAA    DVND+2          ADD PARTIAL
01939A 9D3B 9B 1B    A               ADDA    PROD+2          PRODUCTS TO
01940A 9D3D 97 26    A               STAA    DVND+2          GIVE FULL
01941A 9D3F 96 25    A               LDAA    DVND+1          PRODUCT
01942A 9D41 99 1A    A               ADCA    PROD+1
01943A 9D43 97 25    A               STAA    DVND+1
01944A 9D45 96 19    A               LDAA    PROD
01945A 9D47 97 24    A               STAA    DVND
01946A 9D49 24 03 9D4E               BCC     MV1
01947A 9D4B 7C 0024  A               INC     DVND
01948A 9D4E DE 24    A       MV1     LDX     DVND
01949A 9D50 DF 19    A               STX     PROD
01950A 9D52 DE 26    A               LDX     DVND+2
01951A 9D54 DF 1B    A               STX     PROD+2
```

```
01952A 9D56 39                    RTS                    RETURN, MPY DONE
01953                *
01954                *  BINARY - TO - BCD CONVERSION SUBROUTINE
01955                *  ENTER WITH BINARY # IN PROD+3,4
01956                *  EXIT WITH BCD # IN PROD --> PROD+2
01957                *
01958A 9D57 CE 0000  A  BINBCD  LDX   #0            CLEAR TOP 3
01959A 9D5A DF 19    A          STX   PROD          BYTES OF BUFFER
01960A 9D5C DF 1A    A          STX   PROD+1
01961A 9D5E 86 10    A          LDAA  #16           LOAD PASS CTR
01962A 9D60 36          BNBCD0  PSHA                SAVE
01963A 9D61 86 03    A          LDAA  #3            LOAD BYTE CTR
01964A 9D63 CE 0019  A          LDX   #PROD
01965A 9D66 E6 00    A  BNBCD1  LDAB  X             TEST EACH DIGIT:
01966A 9D68 C4 F0    A          ANDB  #$F0          IF > 4, ADD 3
01967A 9D6A C1 40    A          CMPB  #$40
01968A 9D6C 23 02 9D70          BLS   BNBCD2
01969A 9D6E CB 30    A          ADDB  #$30
01970A 9D70 D7 5A    A  BNBCD2  STAB  TEMP2         SAVE PARTIAL
01971A 9D72 E6 00    A          LDAB  X
01972A 9D74 C4 0F    A          ANDB  #$F
01973A 9D76 C1 04    A          CMPB  #4
01974A 9D78 23 02 9D7C          BLS   BNBCD3
01975A 9D7A CB 03    A          ADDB  #3
01976A 9D7C DA 5A    A  BNBCD3  ORAB  TEMP2
01977A 9D7E E7 00    A          STAB  X
01978A 9D80 08                  INX                 NEXT BYTE
01979A 9D81 4A                  DECA                DONE PASS?
01980A 9D82 26 E2 9D66          BNE   BNBCD1        NO, GO TO NEXT BYTE
01981A 9D84 CE 0019  A          LDX   #PROD,        YES, SHIFT LEFT
01982A 9D87 68 04    A          ASL   4,X           ONCE
01983A 9D89 69 03    A          ROL   3,X
01984A 9D8B 69 02    A          ROL   2,X
01985A 9D8D 69 01    A          ROL   1,X
01986A 9D8F 69 00    A          ROL   X
01987A 9D91 32                  PULA                GET PASS CTR
01988A 9D92 4A                  DECA                DECREMENT
01989A 9D93 26 CB 9D60          BNE   BNBCD0        IF NOT 16 PASSES, GO
01990A 9D95 39                  RTS                 ELSE, DONE.
01991                *
01992                *  BCD - BINARY CONVERSION ROUTINE
01993                *  ENTER W/ BCD # IN PROD --> PROD+2
01994                *  EXIT BINARY # IN PROD+3,4
01995                *
01996A 9D96 CE 0000  A  BCDBIN  LDX   #0
01997A 9D99 DF 1C    A          STX   PROD+3
01998A 9D9B 86 10    A          LDAA  #16           LOAD PASS CTR
01999A 9D9D CE 0019  A  BCDBN0  LDX   #PROD         SHIFT BUFFER
02000A 9DA0 64 00    A          LSR   X             RIGHT ONCE
02001A 9DA2 66 01    A          ROR   1,X
02002A 9DA4 66 02    A          ROR   2,X
02003A 9DA6 66 03    A          ROR   3,X
02004A 9DA8 66 04    A          ROR   4,X
02005A 9DAA 36                  PSHA                SAVE PASS CTR
02006A 9DAB 86 03    A          LDAA  #3            LOAD BYTE CTR
02007A 9DAD CE 0019  A          LDX   #PROD
02008A 9DB0 E6 00    A  BCDBN2  LDAB  X             GET BYTE
02009A 9DB2 C4 F0    A          ANDB  #$F0          TEST EACH DIGIT
02010A 9DB4 C1 70    A          CMPB  #$70          IF > 7, SUBTRACT 3
02011A 9DB6 23 02 9DBA          BLS   BCDBN3
02012A 9DB8 C0 30    A          SUBB  #$30
02013A 9DBA D7 5A    A  BCDBN3  STAB  TEMP2
02014A 9DBC E6 00    A          LDAB  X
02015A 9DBE C4 0F    A          ANDB  #$F
02016A 9DC0 C1 07    A          CMPB  #7
02017A 9DC2 23 02 9DC6          BLS   BCDBN4
02018A 9DC4 C0 03    A          SUBB  #3
02019A 9DC6 DA 5A    A  BCDBN4  ORAB  TEMP2         GET PARTIAL
02020A 9DC8 E7 00    A          STAB  X
02021A 9DCA 08                  INX
02022A 9DCB 4A                  DECA                BYTE CTR = 0?
02023A 9DCC 26 E2 9DB0          BNE   BCDBN2        NO, NEXT BYTE
```

```
02024A 9DCE 32            PULA              GET PASS CTR
02025A 9DCF 4A            DECA              DECREMENT: = 0?
02026A 9DD0 26 CB 9D9D    BNE   BCDBNO      NO, GO AGAIN
02027A 9DD2 39            RTS               YES, DONE
02028                *
02029A 9DD3 86 55  A TIMTST LDAA #$55        TIMER SELF TEST
02030A 9DD5 4A       TMTSTO DECA             CALLED FROM RESET
02031A 9DD6 27 0A 9DE2    BEQ   TMERR
02032A 9DD8 D5 AC  A      BITB  VIAIFR
02033A 9DDA 27 F9 9DD5    BEQ   TMTSTO
02034A 9DDC 81 0F  A      CMPA  #15
02035A 9DDE 24 02 9DE2    BCC   TMERR
02036A 9DE0 4F            CLRA
02037A 9DE1 39            RTS
02038A 9DE2 86 FF  A TMERR LDAA #$FF
02039A 9DE4 39            RTS
02040                *
02041A 9DE5 86 C7  A WATCH LDAA #$C7         SOFTWARE WATCHDOG
02042A 9DE7 97 AD  A      STAA  VIAPCR       ROUTINE. TOGGLES RETRIGGER
02043A 9DE9 86 E7  A      LDAA  #$E7         ONE SHOT TO VERIFY PROGRAM
02044A 9DEB 97 AD  A      STAA  VIAPCR       IS RUNNING
02045A 9DED 39            RTS
02046                *
02047A 9DEE DE 19  A PRODIV LDX  PROD        TRANSFER ROUTINE
02048A 9DF0 DF 24  A      STX   DVND
02049A 9DF2 DE 1B  A      LDX   PROD+2
02050A 9DF4 DF 26  A      STX   DVND+2
02051A 9DF6 39            RTS
02052                *
02053A 9DF7 DE 21  A QUODIV LDX  QUO         TRANSFER ROUTINE
02054A 9DF9 DF 24  A      STX   DVND
02055A 9DFB DE 23  A      LDX   QUO+2
02056A 9DFD DF 26  A      STX   DVND+2
02057A 9DFF 39            RTS
02058                *
02059A 9E00 AB 01  A UPAVG ADDA 1,X          UPDATE AVERAGE ACCUMULATOR
02060A 9E02 A7 01  A      STAA  1,X          ROUTINE
02061A 9E04 24 02 9E08    BCC   UPRTS
02062A 9E06 6C 00  A      INC   0,X
02063A 9E08 39       UPRTS RTS
02064                *
02065A 9E09 CE 0F00 A INANG LDX  #$F00       SETS INITIAL PHASE
02066A 9E0C DF 2A  A      STX   FIRTIM       ANGLE FOR PILOT ARC
02067A 9E0E 39            RTS                AND OPEN IN STICK MODE
02068                *
02069A 9E0F 96 77  A PADJA LDAA  PACURB
02070A 9E11 8D 0E 9E21    BSR   CADJC
02071A 9E13 B7 012F A     STAA  TPACBI
02072A 9E16 20 26 9E3E    BRA   ANGLE
02073                *
02074A 9E18 96 0E  A WADJA LDAA  TWCURB
02075A 9E1A 8D 05 9E21    BSR   CADJC
02076A 9E1C B7 0130 A     STAA  TTWCBI
02077A 9E1F 20 1D 9E3E    BRA   ANGLE
02078                *
02079A 9E21 97 30  A CADJC STAA  MPCN16+1    INTERPOLATE THE
02080A 9E23 B7 0131 A     STAA  OIDEAL       OFFSET WELD CURRENT
02081A 9E26 97 27  A      STAA  DVND+3       TABLE
02082A 9E28 4F            CLRA
02083A 9E29 97 24  A      STAA  DVND
02084A 9E2B 97 25  A      STAA  DVND+1
02085A 9E2D 97 26  A      STAA  DVND+2
02086A 9E2F 86 0A  A      LDAA  #10
02087A 9E31 BD 9C9D A     JSR   DIVIDE
02088A 9E34 96 23  A      LDAA  QUO+2
02089A 9E36 8B 9A  A      ADDA  #OTAB-OTAB/$100*$100
02090A 9E38 97 6A  A      STAA  TEMP4+1
02091A 9E3A 86 9F  A      LDAA  #OTAB/$100
02092A 9E3C 20 4F 9E8D    BRA   INTER
02093                *
02094A 9E3E 4F       ANGLE CLRA
02095A 9E3F 97 6E  A      STAA  REGAVE       THIS ROUTINE COMPUTES
```

```
02096A 9E41 97 6F    A           STAA    REGAVE+1  THE INITIAL BASE PHASE
02097A 9E43 97 71    A           STAA    REGCNT    ANGLE FOR PILOT ARC
02098A 9E45 D6 08    A           LDAB    STICK     OR MAIN WELD CURRENT
02099A 9E47 26 0A 9E53           BNE     WCANG     AND STORE IT IN TFT
02100A 9E49 96 0A    A           LDAA    STATE
02101A 9E4B 81 00    A           CMPA    #00
02102A 9E4D 27 04 9E53           BEQ     WCANG
02103A 9E4F 96 77    A           LDAA    PACURB
02104A 9E51 20 02 9E55           BRA     PAANG
02105A 9E53 96 0E    A  WCANG    LDAA    TWCURB    THE FORMULA IS:
02106A 9E55 97 30    A  PAANG    STAA    MPCN16+1
02107A 9E57 86 32    A           LDAA    #50       Y = -1.25 * X + 5273
02108A 9E59 97 32    A           STAA    MPYR16+1  WHERE Y IS THE
02109A 9E5B 4F                   CLRA              BASE PHASE ANGLE
02110A 9E5C 97 2F    A           STAA    MPCN16    AND X IS THE DIALED
02111A 9E5E 97 31    A           STAA    MPYR16    IN CURRENT DIVIDED BY 10
02112A 9E60 BD 9D1B  A           JSR     MULT16
02113A 9E63 4F                   CLRA
02114A 9E64 5F                   CLRB
02115A 9E65 D0 1C    A           SUBB    PROD+3
02116A 9E67 92 1B    A           SBCA    PROD+2
02117A 9E69 47                   ASRA
02118A 9E6A 56                   RORB
02119A 9E6B 47                   ASRA
02120A 9E6C 56                   RORB
02121A 9E6D CB 99    A           ADDB    #$99
02122A 9E6F 89 14    A           ADCA    #$14
02123A 9E71 97 0F    A           STAA    TFT
02124A 9E73 D7 10    A           STAB    TFT+1
02125                         *  DELTA T PER 10 AMPS COMPUTATION
02126A 9E75 96 30    A  COMDLT   LDAA    MPCN16+1  THIS ROUTINE
02127A 9E77 97 27    A           STAA    DVND+3    LOOKS UP OR INTERPOLATES
02128A 9E79 4F                   CLRA              THE DELTA T/DELTAI
02129A 9E7A 97 24    A           STAA    DVND      (OR GAIN) FOR THE
02130A 9E7C 97 25    A           STAA    DVND+1    DIALED IN CURRENT.
02131A 9E7E 97 26    A           STAA    DVND+2    DELTAT CONTAINS THE
02132A 9E80 86 0A    A           LDAA    #10       CHANGE IN PHASE ANGLE
02133A 9E82 BD 9C9D  A           JSR     DIVIDE    REQUIRED FOR A 10
02134A 9E85 96 23    A           LDAA    QUO+2     AMP CHANGE IN CURRENT
02135A 9E87 8B E3    A           ADDA    #DTAB-DTAB/$100*$100
02136A 9E89 97 6A    A           STAA    TEMP4+1
02137A 9E8B 86 9F    A           LDAA    #DTAB/$100
02138A 9E8D 89 00    A  INTER    ADCA    #0
02139A 9E8F 97 69    A           STAA    TEMP4
02140A 9E91 DE 69    A           LDX     TEMP4
02141A 9E93 A6 00    A           LDAA    X
02142A 9E95 97 62    A           STAA    DELTAT
02143A 9E97 A0 01    A           SUBA    1,X
02144A 9E99 97 69    A           STAA    TEMP4
02145A 9E9B 96 23    A           LDAA    QUO+2
02146A 9E9D 0F                   SEI
02147A 9E9E 97 72    A           STAA    FACTOR
02148A 9EA0 86 0A    A           LDAA    #10
02149A 9EA2 BD 9C8D  A           JSR     MULT8
02150A 9EA5 0E                   CLI
02151A 9EA6 16                   TAB
02152A 9EA7 96 30    A           LDAA    MPCN16+1
02153A 9EA9 10                   SBA
02154A 9EAA 0F                   SEI
02155A 9EAB 97 72    A           STAA    FACTOR
02156A 9EAD 96 69    A           LDAA    TEMP4
02157A 9EAF 2A 01 9EB2           BPL     D1
02158A 9EB1 40                   NEGA
02159A 9EB2 BD 9C8D  A  D1       JSR     MULT8
02160A 9EB5 0E                   CLI
02161A 9EB6 97 27    A           STAA    DVND+3
02162A 9EB8 D7 26    A           STAB    DVND+2
02163A 9EBA 5F                   CLRB
02164A 9EBB D7 24    A           STAB    DVND
02165A 9EBD D7 25    A           STAB    DVND+1
02166A 9EBF 86 0A    A           LDAA    #10
02167A 9EC1 BD 9C9D  A           JSR     DIVIDE
```

```
02168A 9EC4 96 23     A          LDAA   QUO+2
02169A 9EC6 D6 69     A          LDAB   TEMP4
02170A 9EC8 2B 01 9ECB           BMI    D2
02171A 9ECA 40                   NEGA
02172A 9ECB 9B 62     A   D2     ADDA   DELTAT
02173A 9ECD 97 62     A          STAA   DELTAT
02174A 9ECF 39                   RTS
02175                    *  START CANNOT USE ACCB
02176A 9ED0 DE 7D     A   START  LDX    LMCTR     THIS ROUTINE WILL
02177A 9ED2 08                   INX              START A LINE MONITORING
02178A 9ED3 DF 7D     A          STX    LMCTR     SEQUENCE ONCE PER
02179A 9ED5 8C 0E10   A          CPX    #3600     MINUTE IN IDLE MODE
02180A 9ED8 26 0E 9EE8           BNE    STR1      (CALLED FROM ZERO CROSS,
02181A 9EDA CE 0000   A          LDX    #0000     INTERRUPT ROUTINE)
02182A 9EDD DF 7D     A          STX    LMCTR
02183A 9EDF 86 AD     A          LDAA   #173
02184A 9EE1 97 8C     A          STAA   RIOTIM
02185A 9EE3 97 9D     A          STAA   RIOTBI
02186A 9EE5 4F                   CLRA
02187A 9EE6 97 3F     A          STAA   RIOTMD
02188A 9EE8 39            STR1   RTS
02189                    *
02190A 9EE9 86 05     A   TSTPRT LDAA   #5        READ PRINTER EPROM
02191A 9EEB FE 8800   A   CKPROM LDX    PRTFMT    SOCKET 5 TIMES
02192A 9EEE 8C 8101   A          CPX    #$8101    TO SEE IF IT
02193A 9EF1 26 03 9EF6            BNE   ENDPT     IS THERE
02194A 9EF3 4A                   DECA
02195A 9EF4 26 F5 9EEB           BNE    CKPROM
02196A 9EF6 B7 0135   A   ENDPT  STAA   EPROMP
02197A 9EF9 39                   RTS
02198                    *
02199A 9EFA DF 33     A   MOVWC  STX    AVEWC     COMPUTE CURRENT
02200A 9EFC 96 60     A          LDAA   IDEAL     DISPLACEMENT (IDEAL -
02201A 9EFE B0 0131   A          SUBA   OIDEAL    OIDEAL)
02202A 9F01 97 1A     A          STAA   PROD+1
02203A 9F03 D6 33     A          LDAB   AVEWC
02204A 9F05 96 34     A          LDAA   AVEWC+1
02205A 9F07 7D 001A   A   MW1    TST    PROD+1    AND MULTIPLY IT
02206A 9F0A 27 14 9F20            BEQ   MW3       BY TEN (ADJUSTMENT
02207A 9F0C 2B 09 9F17            BMI   MW2       ROUTINES USE THUMBWHEEL
02208A 9F0E 7A 001A   A          DEC    PROD+1    CURRENT DIVIDED BY TEN
02209A 9F11 80 0A     A          SUBA   #10
02210A 9F13 C2 00     A          SBCB   #0
02211A 9F15 20 F0 9F07           BRA    MW1
02212A 9F17 7C 001A   A   MW2    INC    PROD+1
02213A 9F1A 8B 0A     A          ADDA   #10
02214A 9F1C C9 00     A          ADCB   #0
02215A 9F1E 20 E7 9F07           BRA    MW1
02216A 9F20 D7 33     A   MW3    STAB   AVEWC     STORE IT AS OFFSET
02217A 9F22 97 34     A          STAA   AVEWC+1   WELD CURRENT
02218A 9F24 39                   RTS
02219                    *
02220A 8800                      ORG    $8800
02221A 8800 81 01     A   PRTFMT CMPA   #01       TXFLAG    ACTION
02222A 8802 27 03 8807            BEQ   TX1       BACKGROUND
02223A 8804 7E 888D   A          JMP    TX2
02224A 8807 CE 0105   A   TX1    LDX    #TXBUF    1    INITIALIZE BUFFER
02225A 880A C6 28     A          LDAB   #40            BIN --> BCD
02226A 880C 86 20     A          LDAA   #$20           BCD --> PRINTABLE
02227A 880E A7 00     A   CLRBUF STAA   0,X       TXFLAG <-- 2
02228A 8810 08                   INX
02229A 8811 5A                   DECB             2    REPLACE LEADING 0'S
02230A 8812 26 FA 880E           BNE    CLRBUF         INSERT DP,CR
02231A 8814 96 33     A          LDAA   AVEWC     TXFLAG <-- 3
02232A 8816 D6 34     A          LDAB   AVEWC+1
02233A 8818 CE 0108   A          LDX    #TXBUF+3  3    LOAD LATCHES
02234A 881B 8D 4D 886A           BSR    BINPRT         ENABLE TIMER
02235A 881D D6 35     A          LDAB   AVETV     TXFLAG <-- 4
02236A 881F CE 010D   A          LDX    #TXBUF+8  INITIALIZE BUFFER POINTER
02237A 8822 8D 45 8869           BSR    BPO            TIMER INTERRUPT
02238A 8824 96 36     A          LDAA   ENERGY
02239A 8826 D6 37     A          LDAB   ENERGY+1  4    IF BUSY, WAIT
02240A 8828 CE 0113   A          LDX    #TXBUF+14 ELSE OUTPUT START
```

```
02241A 882B 8D 3D 886A      BSR    BINPRT   BIT
02242A 882D D6 13     A     LDAB   CYCLES   INCREMENT TXFLAG
02243A 882F CE 011B   A     LDX    #TXBUF+22
02244A 8832 8D 35 8869      BSR    BPO
02245A 8834 D6 77     A     LDAB   PACURB
02246A 8836 CE 011F   A     LDX    #TXBUF+26
02247A 8839 8D 2E 8869      BSR    BPO
02248A 883B D6 78     A     LDAB   PACYCB
02249A 883D CE 0127   A     LDX    #TXBUF+34
02250A 8840 8D 27 8869      BSR    BPO
02251A 8842 96 02     A     LDAA   ERRO1    PRINT ERROR
02252A 8844 27 04 884A      BEQ    NE1      NUMBER 1,2,3 OR 7
02253A 8846 86 31     A     LDAA   #'1
02254A 8848 20 14 885E      BRA    GOTERR
02255A 884A 96 04     A NE1 LDAA   ERRO2
02256A 884C 27 04 8852      BEQ    NE2
02257A 884E 86 32     A     LDAA   #'2
02258A 8850 20 0C 885E      BRA    GOTERR
02259A 8852 96 07     A NE2 LDAA   ERRO3
02260A 8854 27 10 8866      BEQ    NE37
02261A 8856 2B 04 885C      BMI    PE7
02262A 8858 86 33     A     LDAA   #'3
02263A 885A 20 02 885E      BRA    GOTERR
02264A 885C 86 37     A PE7 LDAA   #'7
02265A 885E B7 0106   A GOTERR STAA TXBUF+1
02266A 8861 86 45     A     LDAA   #'E
02267A 8863 B7 0105   A     STAA   TXBUF
02268A 8866 7E 88F7   A NE37 JMP   TXEXIT   5 TO 12
02269A 8869 4F          BPO  CLRA            OUTPUT DATA
02270A 886A 97 1C     A BINPRT STAA PROD+3   INCREMENT TXFLAG
02271A 886C D7 1D     A     STAB   PROD+4   13       OUTPUT STOP
02272A 886E DF 69     A     STX    TEMP4    INCREMENT TXFLAG
02273A 8870 BD 9D57   A     JSR    BINBCD
02274A 8873 DE 69     A     LDX    TEMP4    14       INREMENT DATA POINT
02275A 8875 96 1A     A     LDAA   PROD+1   IF NOT DONE,
02276A 8877 8D 04 887D      BSR    DISPAS   TXFLAG <-- 4 & EXIT
02277A 8879 08             INX             ELSE DISABLE
02278A 887A 08             INX             TIMER, CLEAR
02279A 887B 96 1B     A     LDAA   PROD+2   TXFLAG
02280A 887D 16          DISPAS TAB
02281A 887E C4 0F     A     ANDB   #$0F
02282A 8880 44             LSRA
02283A 8881 44             LSRA
02284A 8882 44             LSRA
02285A 8883 44             LSRA
02286A 8884 8A 30     A     ORAA   #$30
02287A 8886 CA 30     A     ORAB   #$30
02288A 8888 A7 00     A     STAA   0,X
02289A 888A E7 01     A     STAB   1,X
02290A 888C 39             RTS
02291A 888D 81 02     A TX2 CMPA   #02
02292A 888F 26 47 88D8      BNE    TX3
02293A 8891 CE 0108   A     LDX    #TXBUF+3
02294A 8894 8D 31 88C7      BSR    RPLO
02295A 8896 CE 010D   A     LDX    #TXBUF+8
02296A 8899 8D 2C 88C7      BSR    RPLO
02297A 889B CE 0113   A     LDX    #TXBUF+14
02298A 889E 8D 27 88C7      BSR    RPLO
02299A 88A0 CE 011B   A     LDX    #TXBUF+22
02300A 88A3 8D 22 88C7      BSR    RPLO
02301A 88A5 CE 011F   A     LDX    #TXBUF+26
02302A 88A8 8D 1D 88C7      BSR    RPLO
02303A 88AA CE 0127   A     LDX    #TXBUF+34
02304A 88AD 8D 18 88C7      BSR    RPLO
02305A 88AF B6 0116   A     LDAA   TXBUF+17
02306A 88B2 B7 0117   A     STAA   TXBUF+18
02307A 88B5 86 2E     A     LDAA   #'.
02308A 88B7 B7 0116   A     STAA   TXBUF+17
02309A 88BA 86 30     A     LDAA   #'0      APPEND 0 FOR PA CURRENT
02310A 88BC B7 0123   A     STAA   TXBUF+30
02311A 88BF CE 0D0A   A     LDX    #$0D0A
02312A 88C2 FF 012B   A     STX    TXBUF+38
```

```
02313A 88C5 20 30 88F7           BRA    TXEXIT
02314A 88C7 C6 03       A RPL0   LDAB   #3
02315A 88C9 A6 00       A RPL1   LDAA   0,X
02316A 88CB 81 30       A        CMPA   #$30
02317A 88CD 26 08 88D7           BNE    RPL2
02318A 88CF 86 20       A        LDAA   #$20
02319A 88D1 A7 00       A        STAA   0,X
02320A 88D3 08                   INX
02321A 88D4 5A                   DECB
02322A 88D5 26 F2 88C9           BNE    RPL1
02323A 88D7 39            RPL2   RTS
02324A 88D8 CE 0105     A TX3    LDX    #TXBUF
02325A 88DB FF 0103     A TX3A   STX    TXPTR
02326A 88DE A6 00       A        LDAA   X
02327A 88E0 B7 0134     A        STAA   CHAR
02328A 88E3 CE 0341     A        LDX    #833
02329A 88E6 96 38       A        LDAA   FREQ
02330A 88E8 81 3C       A        CMPA   #60
02331A 88EA 27 03 88EF           BEQ    SIXTY
02332A 88EC CE 02B6     A        LDX    #694
02333A 88EF DF A6       A SIXTY  STX    TIMER1
02334A 88F1 DF A4       A        STX    TM1CNT
02335A 88F3 86 C0       A        LDAA   #$C0
02336A 88F5 97 AF       A        STAA   VIAIER
02337A 88F7 7C 007F     A TXEXIT INC    TXFLAG
02338A 88FA 39                   RTS
02339A 88FB FE 0103     A TXROU  LDX    TXPTR
02340A 88FE D6 A0       A        LDAB   VIADRA
02341A 8900 81 04       A        CMPA   #04
02342A 8902 26 06 890A           BNE    TXI1
02343A 8904 5D                   TSTB
02344A 8905 2A 0C 8913           BPL    TXI2
02345A 8907 D7 03       A        STAB   ERROB    SET FLAG FOR PRINTER EXCEP
02346A 8909 39                   RTS
02347A 890A 81 0D       A TXI1   CMPA   #13
02348A 890C 24 09 8917           BCC    TXI3
02349A 890E 74 0134     A        LSR    CHAR
02350A 8911 25 06 8919           BCS    TXI4
02351A 8913 C4 BF       A TXI2   ANDB   #$BF
02352A 8915 20 04 891B           BRA    TXI5
02353A 8917 26 08 8921 TXI3      BNE    TXI7
02354A 8919 CA 40       A TXI4   ORAB   #$40
02355A 891B D7 A0       A TXI5   STAB   VIADRA
02356A 891D 4C                   INCA
02357A 891E 97 7F       A TXI6   STAA   TXFLAG
02358A 8920 39            RTSP   RTS
02359A 8921 08            TXI7   INX
02360A 8922 FF 0103     A        STX    TXPTR
02361A 8925 A6 00       A        LDAA   X
02362A 8927 B7 0134     A        STAA   CHAR
02363A 892A 8C 012D     A        CPX    #TXBUF+40
02364A 892D 27 0E 893D           BEQ    TERMTX
02365A 892F 8C 8FFF     A        CPX    #ENDHD
02366A 8932 26 05 8939           BNE    NEOP
02367A 8934 7F 012D     A        CLR    PGFMT
02368A 8937 20 04 893D           BRA    TERMTX
02369A 8939 86 04       A NEOP   LDAA   #04
02370A 893B 20 E1 891E           BRA    TXI6
02371A 893D C6 40       A TERMTX LDAB   #$40
02372A 893F D7 AF       A        STAB   VIAIER
02373A 8941 7C 012D     A        INC    PGFMT
02374A 8944 4F                   CLRA
02375A 8945 20 D7 891E           BRA    TXI6
02376A 8947 7D 007F     A PRTHD  TST    TXFLAG
02377A 894A 26 D4 8920           BNE    RTSP
02378A 894C 7C 012D     A        INC    PGFMT
02379A 894F 86 03       A        LDAA   #03
02380A 8951 97 7F       A        STAA   TXFLAG
02381A 8953 7D 003E     A        TST    SWREAD
02382A 8956 27 05 895D           BEQ    PHEAD
02383A 8958 CE 8F3B     A        LDX    #PQHEAD
02384A 895B 20 03 8960           BRA    JTX3A
```

```
02385A 895D CE 8F61    A PHEAD  LDX    #HEAD
02386A 8960 7E 88DB    A JTX3A  JMP    TX3A
02387                  * LRC ROUTINE FOR USE IN COMPUTING FOR ROM TEST
02388                  *
02389A 8F00                     ORG    $8F00
02390A 8F00 CE 9001    A LRC    LDX    #CHKSUM+1
02391A 8F03 4F                  CLRA
02392A 8F04 A8 00      A LRC0   EORA   X
02393A 8F06 08                  INX
02394A 8F07 8C A000    A        CPX    #$A000
02395A 8F0A 26 F8 8F04          BNE    LRC0
02396A 8F0C B7 9000    A        STAA   CHKSUM
02397A 8F0F CE 8800    A        LDX    #PRTFMT
02398A 8F12 4F                  CLRA
02399A 8F13 A8 00      A LRC1   EORA   X
02400A 8F15 08                  INX
02401A 8F16 8C 8FFF    A        CPX    #CHKSUM-1
02402A 8F19 26 F8 8F13          BNE    LRC1
02403A 8F1B B7 8FFF    A        STAA   CHKSUM-1
02404A 8F1E 0E                  CLI
02405A 8F1F 20 FD 8F1E          BRA    *-1
02406                  *
02407                  * ROM TABLES
02408                  *
02409A 8F38                     ORG    $8F38
02410                  *
02411                  * THIS TABLE OF CHARACTERS IS TRANSMITTED TO
02412                  * THE PRINTER TO CAUSE THE HEADING TO PRINT
02413                  *
02414A 8F38    20      A POHEAD FCC    40,
02415A 8F60    0D      A        FCB    $0D
02416A 8F61    0A      A HEAD   FCB    $0A
02417A 8F62    5F      A        FCC    /_____/
02418A 8F76    5F      A        FCC    /_____/
02419A 8F8A    0D0A    A        FDB    $0D0A
02420A 8F8C    0A      A        FCB    $0A
02421A 8F8D    0A      A        FCB    $0A
02422A 8F8E    0A      A        FCB    $0A
02423A 8F8F    20      A        FCC    /        /
02424A 8F9B    54      A        FCC    /THE MICRO MARK/
02425A 8FA9    0D0A    A        FDB    $0D0A
02426A 8FAB    0A      A        FCB    $0A
02427A 8FAC    20      A        FCC    /        /
02428A 8FBA    20      A        FCC    /        /
02429A 8FC8    50      A        FCC    /PILOT ARC /
02430A 8FD2    0D0A    A        FDB    $0D0A
02431A 8FD4    20      A        FCC    /  AMPS VOLTS /
02432A 8FE1    4B      A        FCC    /KW-SEC CYCLES /
02433A 8FEF    20      A        FCC    / AMPS CYCLES /
02434A 8FFC    0D0A    A        FDB    $0D0A
02435A 8FFE    0A      A        FCB    $0A
02436        8FFF      A ENDHD  EQU    *
02437                  *
02438A 9F9A                     ORG    $9F9A
02439A 9F9A    01      A DTAB   FCB    001,010,021,028,038 TABLE OF
02440A 9F9F    31      A        FCB    049,060,071,080,089 OFFSET IDEAL
02441A 9FA4    63      A        FCB    099,108,117,125,134 CURRENTS (I.E.
02442A 9FA9    8F      A        FCB    143,151,160,167,175 IF 700 IS
02443A 9FAE    B7      A        FCB    183         DIALED IN, USE 710)
02444                  *
02445A 9FAF    91EA    A BKTAB  FDB    STATE0,STATE1,STATE2
02446A 9FB5    929D    A        FDB    STATE3,STATE4,STATE5,STATE6
02447A 9FBD    94EF    A        FDB    STATE7
02448A 9FBF    07      A ERRTAB FCB    7,4,1,8,2,5,6,3
02449                  *
02450                  * SEGMENT TABLE: 0-9 ARE DIGITS
02451                  *               A IS "E"
02452                  *               B IS "R"
02453                  *               F IS BLANK
02454                  *               C,D,E ARE AVAILABLE
02455                  *
02456A 9FC7    3F      A SEGTAB FCB    $3F,$06,$5B,$4F FOR DISPLAY
```

```
02457A 9FCB   66   A           FCB    $66,$6D,$7D,$07 3F LOOKS LIKE 0
02458A 9FCF   7F   A           FCB    $7F,$6F,$79,$50 06 LOOKS LIKE 1
02459A 9FD3   FF   A           FCB    $FF,$FF,$FF,$00 ETC.
02460                   *
02461A 9FD7   C6   A  ACBTAB   FCB    $C6,$D2,$D8,$C9,$E1,$E4 SCR PAIRS
02462A 9FDD   C6   A  ABCTAB   FCB    $C6,$E4,$E1,$C9,$D8,$D2 FOR FIRING
02463                   *
02464A 9FE3   BC   A  DTAB     FCB    188,82,70,58,46 TABLE OF GAINS
02465A 9FE8   20   A           FCB    32,24,16,16,16 100A USES 82
02466A 9FED   10   A           FCB    16,16,16,16,16 MICROSEC/10AMPS
02467A 9FF2   10   A           FCB    16,20,24,28,32,36 600A USES 23,ETC.
02468                   *
02469                   * VECTORS
02470                   *
02471A 9FF8                    ORG    $9FF8
02472A 9FF8   9772 A            FDB    IRQ
02473A 9FFA   907E A            FDB    RESTRT
02474A 9FFC   907E A            FDB    RESTRT
02475A 9FFE   907E A            FDB    RESTRT
02476                           END
TOTAL ERRORS 00000
```

V. Charts

Set out immediately hereinafter are the following charts which have been referred to in the preceding description of the stud/stick welding controller of the present invention.

(1) Error codes;
(2) Table of components;
(3) Calculations carried out by the program and as discussed in reference to the flow charts.

(1) Error Codes

| Error Code | Meaning/Conditions | Clearing Action |
|---|---|---|
| 00 | Self-test failed. This results in a total machine lockup. | None; unconditional and unclearable lockup. Remove and restore power to attempt another self-test. |
| 01 | Less than 50% current detected. This would indicate a major hardware malfunction (e.g. an open SCR). This will result in the display alternating the error code with the current, and disallowing any further welds, unconditionally. | None; unconditional and unclearable lockup. Remove and restore power to weld again. |
| 02 | Total energy not within three percent of the requested total energy. This would occur if the requested current could not be delivered, even though the number of cycles had already been increased by 10% maximum. It will result in the error code and current alternating on the display. It will also optionally lock up the machine until the error is cleared via the key switch (see section I, 9 for details). | Turn key switch if lockup option selected. Change display selector or any system parameter, if no lockup, to remove error code from display. No operator intervention required if no lockup. |
| 03 | Total energy is within three percent, but the number of cycles was increased to achieve this result. It results in an alternating error code and number of cycles on the display. | None; self-clearing. Warning only - no operator intervention required. |
| 04 | One or more phases of the primary are missing. It results in an unconditional machine lockup. | None; unconditional and unclearable lockup. Remove and restore power to attempt to weld again. |
| 05 | Current set out of range. (i.e. below 50 amps or above 500 amps in stick mode, or below 50 amps in stud mode). | Change thumbwheel setting. |
| 06 | Zero cycle firing time set. | Change thumbwheel setting. |
| 07 | Terminal voltage less than 10 v. This condition will be caused by a "shorted" or a hangup in the gun. The weld current will be turned off within 3 phases (8.4 ms). This protects the main SCR bridge from needless excess surge current. The error code and terminal voltage will alternate on the display. | None; self-clearing. Warning only - no operator intervention required. |
| 08 | Gun sense. A cam lock interlock switch is used to determine the presence of a cam lock in the "stick" connector. If the unit is in the "stick" mode, the error will display if the "stick" connector is vacant. If the "stick" connector is mated, the error will display when in the "stud" mode. | Place cable in correct cam lock for either "stick" or "stud" mode. |
| 09 | Printer error. Error will be displayed when the printer is not connected, or out of paper or during printing. | Reconnect printer, replace paper or wait for completion of printing. |

(2) Table of Components

| Reference Character | Component | Model # |
|---|---|---|
| 30 | Microprocessor | MC6802 |
| 31 | VIA | SY6522 |
| 32 | RIOT | SY6532 |
| 33 | ROM | 2716 |
| 34 | Address decoder | See FIG. 5 |
| 35 | A/D converter | ADC0808 |
| 36 | Reset generator | 4093/74LS123 |
| 37 | 50 µs pulse gen. | 74L5123 |

For other components—see details of FIGS. 3-13.

(3) Calculations

The following calculations will be performed:

(1) The initial base phase angle from zero cross to firing the first phase will be computed using the function $$B = 1.25 * I + 5273$$

where
I is the ideal current
B is the initial base phase angle in time (microseconds).

(2) Average terminal voltage

This is a displayed value. The terminal voltage will be measured once per cycle, and the average voltage will be computed at the end of the weld as the arithmetic mean of the voltages.

(3) Average weld current

This is a displayed value, and is also used in the total energy computation. It is computed as the arithmetic mean of all the current readings (one per cycle). The first cycle is not included in the average.

(4) Total energy

This is a displayed value, given by the following equation:

$$E = V(\text{avg}) * I(\text{avg}) * T$$

Where:
E is the energy in watt-seconds
V(avg) is the average terminal voltage
I(avg) is the average weld current
T is the weld time in seconds.
This number is computed at the completion of a weld.

(5) During every phase any running timer is adjusted by $$T(n) - T(n-1)$$

where $$T(n) = G*(I-A) + B$$

G is the gain for the regulated current
I is ideal current
A is actual current
B is the same as in 1
T(n−1) is from the previous cycle.

(6) Every two or sixteen phases, the base phase angle (B) is recomputed using:

$$B(n+1) = G(I-m) + B(n)$$

where
G is same as in 5
I is same as in 5
m is the average current during the previous two cycles in stud mode or sixteen cycles in pilot arc or stick mode
B(n) is the previous base phase angle.

(7) There will be a table of gains (G) for each current from 50 to 2,000 amps in 50 amp increments. Interpolation will be used for values between table entries.

The present invention may be embodied in other specific forms without departing from the spirit or essential attributes thereof and accordingly, reference should be made to the appended claims rather than to the foregoing specification as indicating the scope of the invention.

What is claimed is:

1. In apparatus for stud welding two metallic members by heating by an electric welding arc including a welding current power supply, holding means for holding one of the metallic members through which weld current is passed in creating the welding arc and weld current cable means interconnecting the current power supply and the holding means, the improvements for controlling welding current parameters comprising:
a general purpose digital computer;
programmable weld current reference means accessible by the computer into which the ideal weld current can be set and providing an ideal weld current reference signal;
weld current sensing means accessible by the computer providing an actual weld current signal proportional to the actual weld current;
total energy regulating means under control of the computer capable of initiating, varying and terminating the output of the current power supply upon reaching a predetermined total energy level; and
a program for the general purpose computer to instruct the computer to periodically compare the ideal weld current signal to the actual weld current signal and adjust the total energy regulating means to adjust the actual weld current to equal the ideal weld current.

2. The apparatus of claim 1 wherein the holding means is a stud welding gun for welding a stud to a workpiece and wherein the improvements further include programmable weld cycle reference means accessible by the computer into which a preselected number of weld cycles can be set and providing an ideal weld cycle reference signal;
weld cycle counting means accessible by the computer; and
wherein the program further instructs the computer to compare the ideal weld cycle reference means to the weld cycle counter means and terminates the weld cycle upon a given relationship between the two occurring.

3. The apparatus of claim 2 wherein the welding gun includes a lift solenoid;
lift solenoid control means interfaced to the computer;
programmable pilot arc reference means accessible by the computer and providing an ideal pilot arc current reference signal;
programmable pilot arc cycle reference means accessible by the computer into which a preselected number of pilot arc cycles can be set and providing an ideal pilot arc cycle reference signal; and
wherein the program instructs the computer by means of the lift solenoid control means to initiate lift and plunge in accordance with the pilot arc reference signal and to regulate the total energy regulating means in accordance with the pilot arc current reference signal to initiate the main welding current upon reaching the predetermined number of pilot arc cycles.

4. The apparatus of claim 2 further including a two state lift check switch accessed by the computer; and
wherein the program instructs the computer upon the lift check switch being in a predetermined state 5. The apparatus of claim 4 further including a two state hot/cold plunge switch accessed by the computer; and
wherein the program instructs the computer upon the hot/cold plunge switch being in a predetermined state to increment the ideal weld time reference signal to increase the weld cycle by a predetermined number of cycles to maintain the welding current on until the stud reaches the workpiece.

6. The apparatus of claim 5 wherein the program instructs the computer to ignore the incremented weld cycles in computing average current, average voltage, weld cycle time and total energy.

7. The apparatus of claim 2 further including welding voltage sensing means accessible by the computer providing an actual weld voltage signal proportional to the actual welding terminal voltage;
   wherein the program further instructs the computer to compute and store each of the average welding current, average welding voltage and total welding cycle time and compute and store the total weld cycle energy as the product of the average welding current, average welding voltage and total cycle time;
   alphanumeric display means interfaced with the computer; and
   wherein the program instructs the computer to retrieve and display at the alphanumeric display the values of the average welding voltage, average welding current, number of cycles for the welding cycle and total weld cycle energy.

8. The apparatus of claim 2 further including welding voltage sensing means accessible by the computer providing an actual weld voltage signal proportional to the actual welding terminal voltage;
   wherein the program further instructs the computer to compute and store each of the average welding current, average welding voltage and total welding cycle time and compute and store the total weld cycle energy as the product of the average welding current, average welding voltage and total cycle time; and
   wherein the program instructs the computer to compare the ideal total weld cycle energy to the actual weld cycle energy and to increment the programmable weld cycle reference means proportionally to the difference and to a fixed maximum percentage of the initial programmable weld cycle reference means setting.

9. The apparatus of claim 2 further including welding voltage sensing means accessible by the computer providing an actual weld voltage signal proportional to the actual welding terminal voltage;
   wherein the program further instructs the computer to compute and store each of the average welding current, average welding voltage and total welding cycle time and compute and store the actual total weld cycle energy as the as the product of the average welding current, average welding voltage and total cycle time;
   wherein the program further instructs the computer to compute and compare the ideal total weld cycle energy to the actual total weld cycle energy at the end of the weld cycle and to create differing error signals indicative of the percent of deviation of the actual total weld cycle energy below the ideal total weld cycle energy;
   alphanumeric display means interfaced with the computer; and
   wherein the program instructs the computer to display the generated error signal at the alphanumeric display means.

10. The apparatus of claim 2 further including welding voltage sensing means accessible by the computer providing an actual weld voltage signal proportional to the actual welding terminal voltage;
    wherein the program further instructs the computer to compute and store each of the average welding current, average welding voltage and average welding cycle time and compute and store the actual total weld cycle energy as the product of the average welding current, average welding voltage and total cycle time;
    wherein the program further instructs the computer to compute and compare the ideal total weld cycle energy to the actual weld cycle energy at the end of the weld cycle and to create differing error signals indicative of the percent of deviation of the actual total weld cycle energy below the ideal total weld cycle energy; and
    wherein the program instructs the computer upon the presence of selected error signals to generate a program interrupt causing a program lockup.

* * * * *